(12) United States Patent
Yu et al.

(10) Patent No.: US 10,838,240 B2
(45) Date of Patent: Nov. 17, 2020

(54) ELECTRO-ABSORPTION MODULATOR

(71) Applicant: ROCKLEY PHOTONICS LIMITED, London (GB)

(72) Inventors: Guomin Yu, Glendora, CA (US); Aaron John Zilkie, Pasadena, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 16/286,533

(22) Filed: Feb. 26, 2019

(65) Prior Publication Data

US 2019/0293971 A1 Sep. 26, 2019

Related U.S. Application Data

(63) Continuation-in-part of application No. PCT/EP2018/062269, filed on May 11, 2018, which is a continuation-in-part of application No. PCT/EP2017/080221, filed on Nov. 23, 2017.

(60) Provisional application No. 62/675,050, filed on May 22, 2018, provisional application No. 62/635,955, filed on Feb. 27, 2018, provisional application No. 62/427,132, filed on Nov. 28, 2016, provisional application No. 62/426,117, filed on Nov. 23, 2016.

(51) Int. Cl.
| | |
|---|---|
| *G02F 1/03* | (2006.01) |
| *G02F 1/035* | (2006.01) |
| *G02F 1/017* | (2006.01) |
| *G02F 1/015* | (2006.01) |

(52) U.S. Cl.
CPC ...... *G02F 1/017* (2013.01); *G02F 2001/0151* (2013.01); *G02F 2001/0155* (2013.01); *G02F 2202/108* (2013.01)

(58) Field of Classification Search
CPC ............ G02F 1/017; G02F 2001/0151; G02F 2001/0155; G02F 2202/108
USPC .......................... 359/245, 248; 385/2, 3, 14
See application file for complete search history.

(56) References Cited

U.S. PATENT DOCUMENTS

2018/0373067 A1* 12/2018 Fujikata ................. G02F 1/025

OTHER PUBLICATIONS

Feng, Dazeng et al., "High-Speed GeSi Electroabsorption Modulator on the SOI Waveguide Platform", IEEE Journal of Selected Topics in Quantum Electronics, Nov./Dec. 2013, 10 pages, vol. 19, No. 6, IEEE.

(Continued)

*Primary Examiner* — William Choi
(74) *Attorney, Agent, or Firm* — Lewis Roca Rothgerber Christie LLP

(57) ABSTRACT

An optoelectronic device comprising: a silicon-on-insulator (SOI) substrate, the substrate comprising: a silicon support layer; a buried oxide (BOX) layer on top of the silicon support layer; and a silicon device layer on top of the BOX layer; a waveguide region, where a portion of the silicon device layer and a portion of the BOX layer underneath the portion of the device layer have been removed, the portion of the BOX layer having been replaced with a layer of silicon and a layer of crystalline oxide on top of the silicon; and a waveguide structure located directly on top of the crystalline oxide layer, the waveguide structure including a P doped region, and an N doped region with an intrinsic region in-between, creating a PIN junction across which a bias can be applied to create a modulation region.

17 Claims, 48 Drawing Sheets

(56) References Cited

OTHER PUBLICATIONS

Gottlob, H.D.B. et al., "CMOS integration of epitaxial Gd2O3 high-k gate dielectrics", Solid-State Electronics, Jun. 1, 2006, pp. 979-985, vol. 50, No. 6, Elsevier Ltd.

International Search Report and Written Opinion of the International Searching Authority, dated Jun. 26, 2019, Corresponding to PCT/IB2019/000188, 11 pages.

Osten, H.J., et al., "Introducing crystalline rare-earth oxides into Si technologies", Physica Status Solidi. A: Applications and Materials Science, Apr. 1, 2008, pp. 695-707, vol. 205, No. 4, Wiley-VCH Verlag GmbH & Co.

Dargis, R. et al., "Epitaxial Si and $Gd_2O_3$ Heterostuctures: Distributed Bragg Reflectors with Stress Management Function for GaN on Si Light Emitting Devices", ECS Journal of Solid State Science and Technology, 2012, pp. P246-P249, The Electrochemical Society.

* cited by examiner

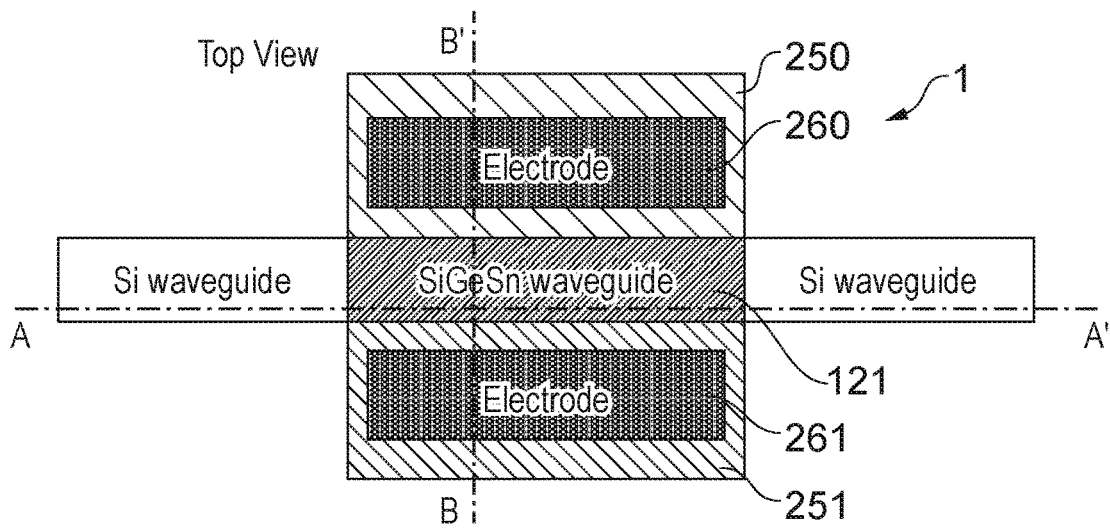
FIG. 1A
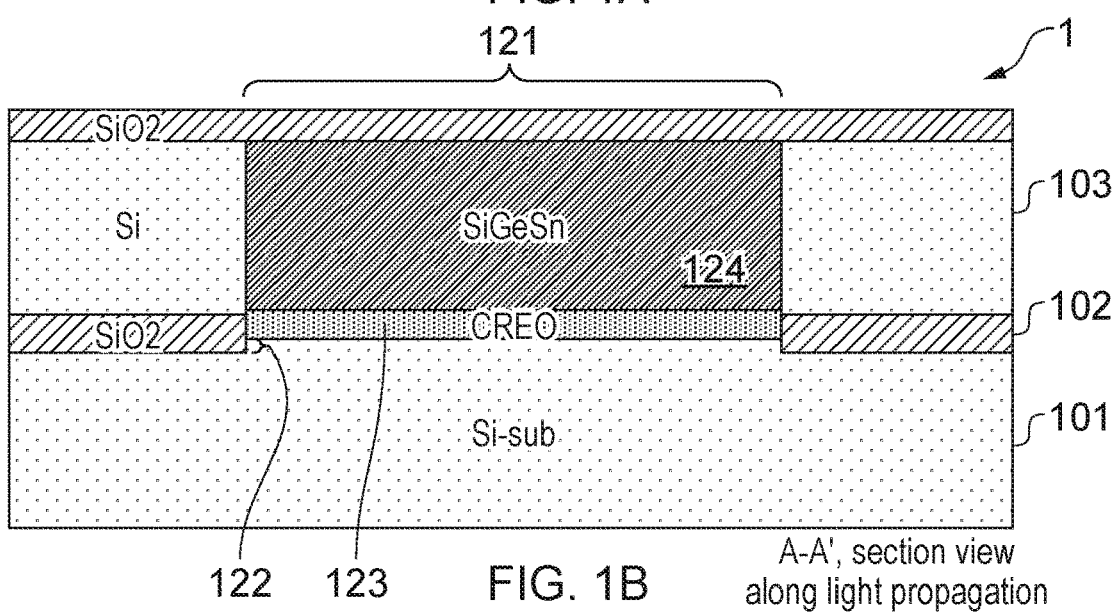
FIG. 1B   A-A', section view along light propagation
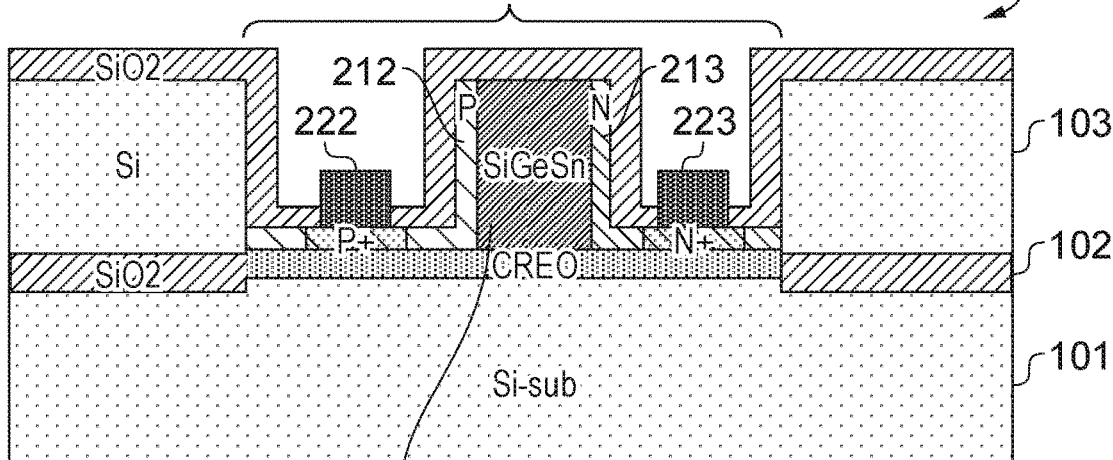
FIG. 1C   B-B', cross section view

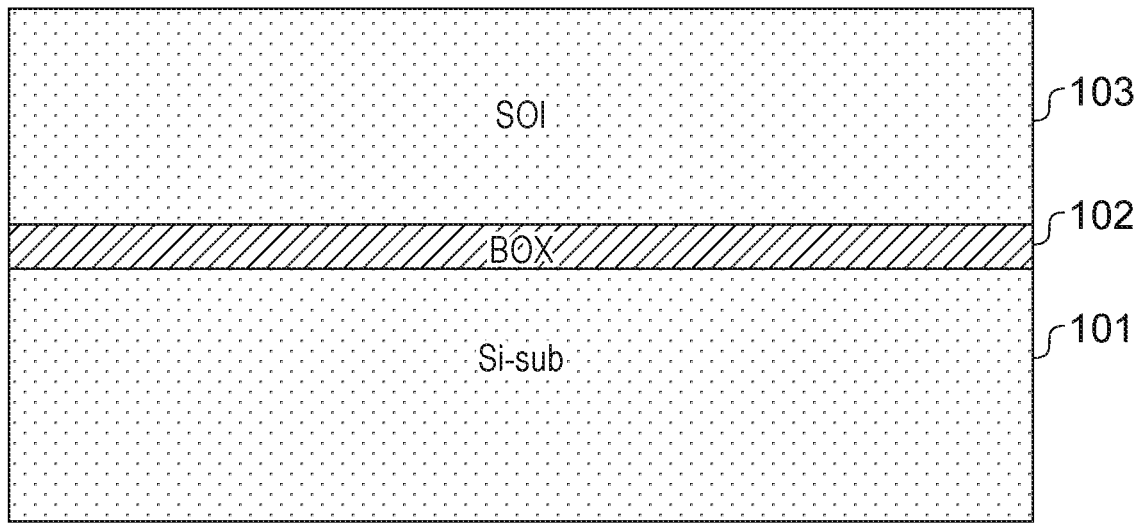
FIG. 2A SOI wafer
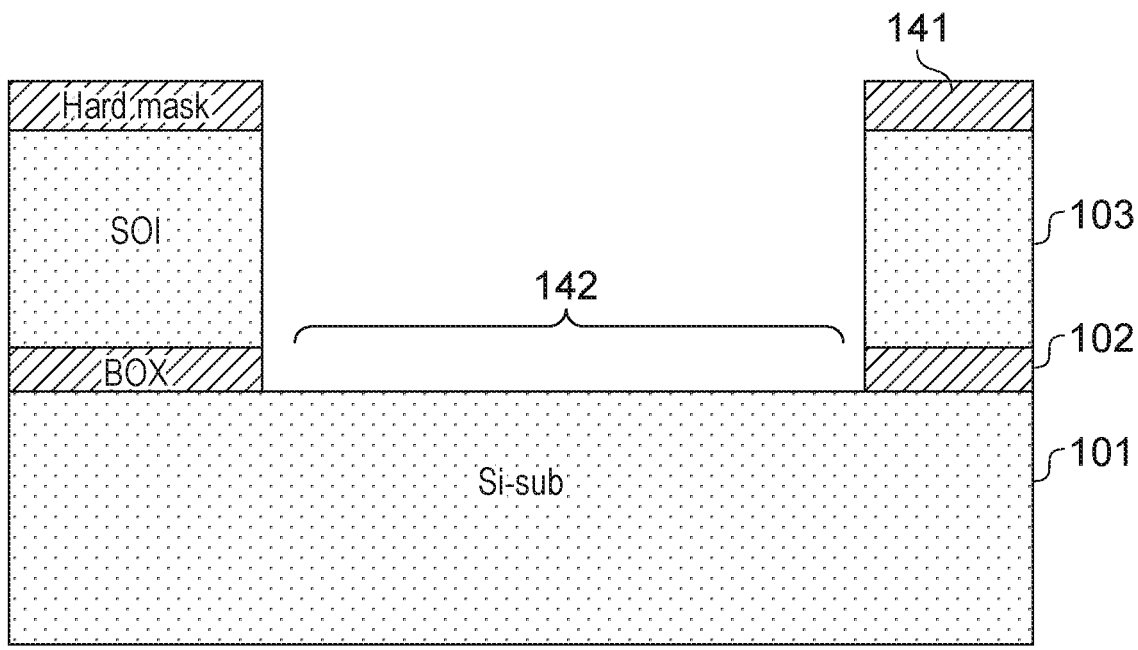
FIG. 2B etch cavity

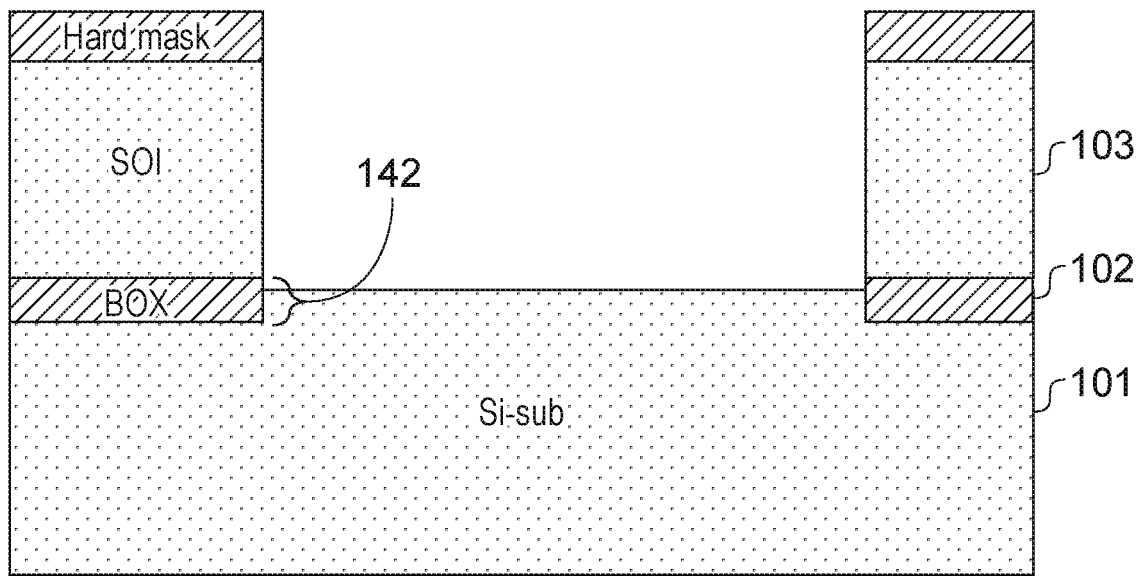
FIG. 2C
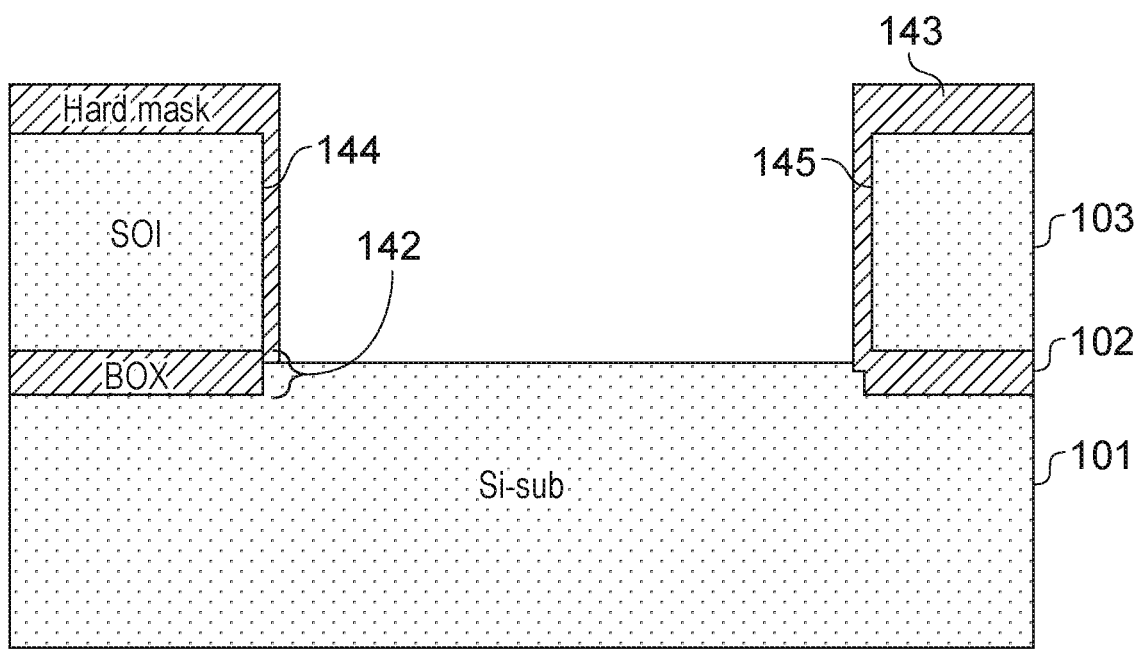
FIG. 2D Silicon growth in cavity

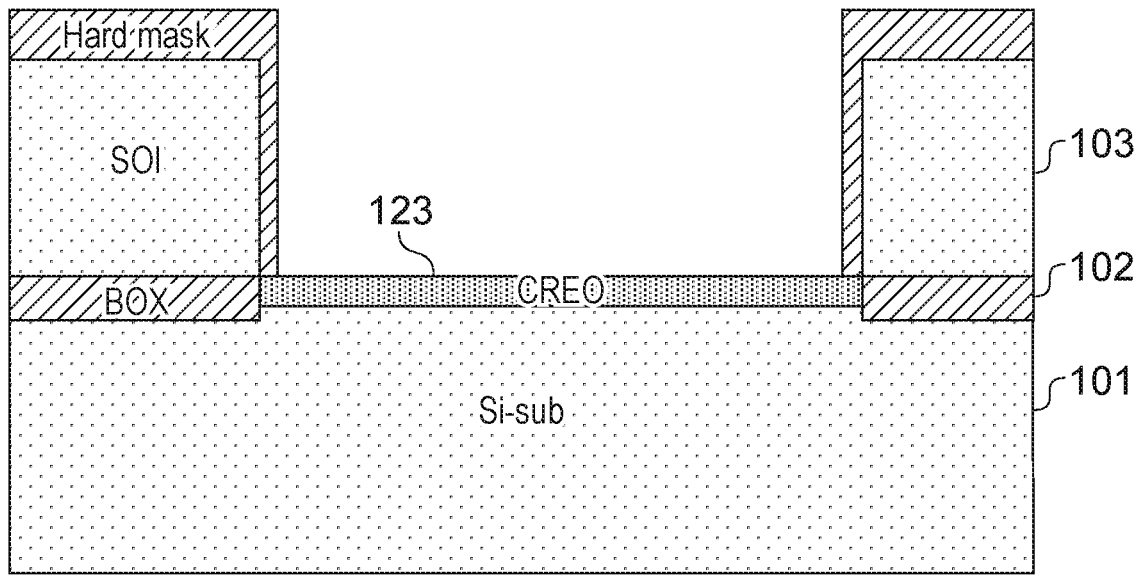
FIG. 2E cREO growth in cavity
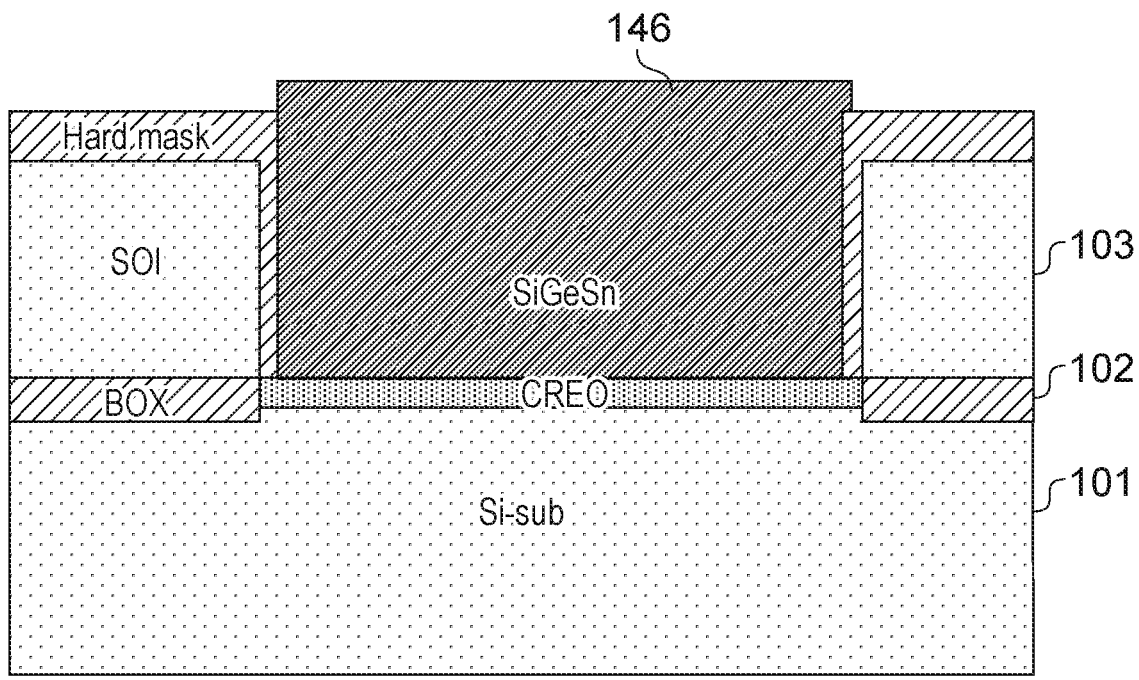
FIG. 2F SiGeSn EPI growth in cavity

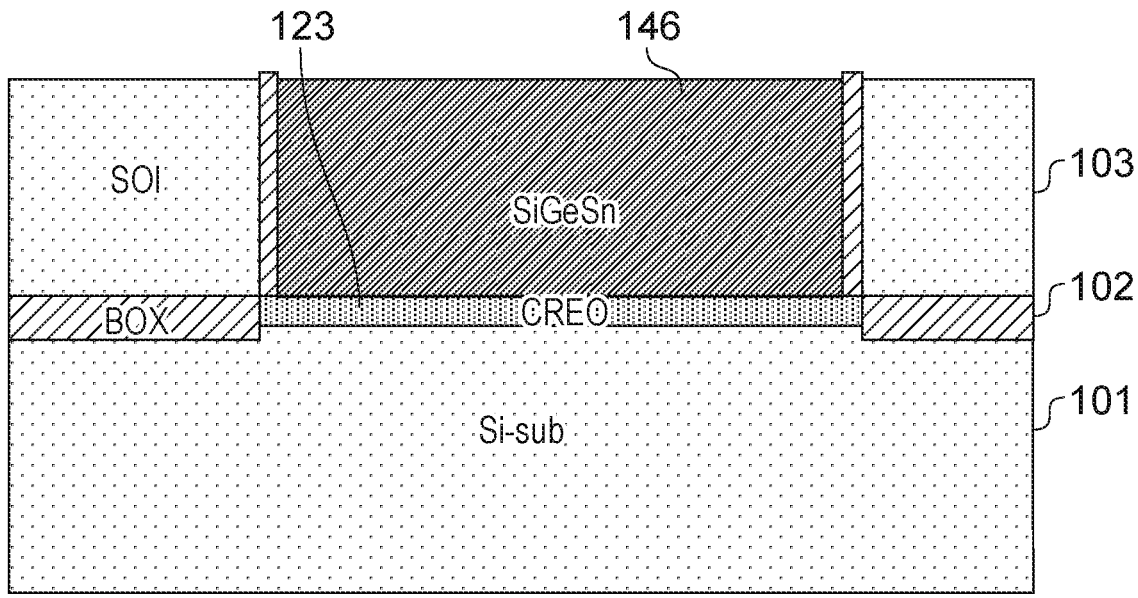
FIG. 2G SiGeSn CMP
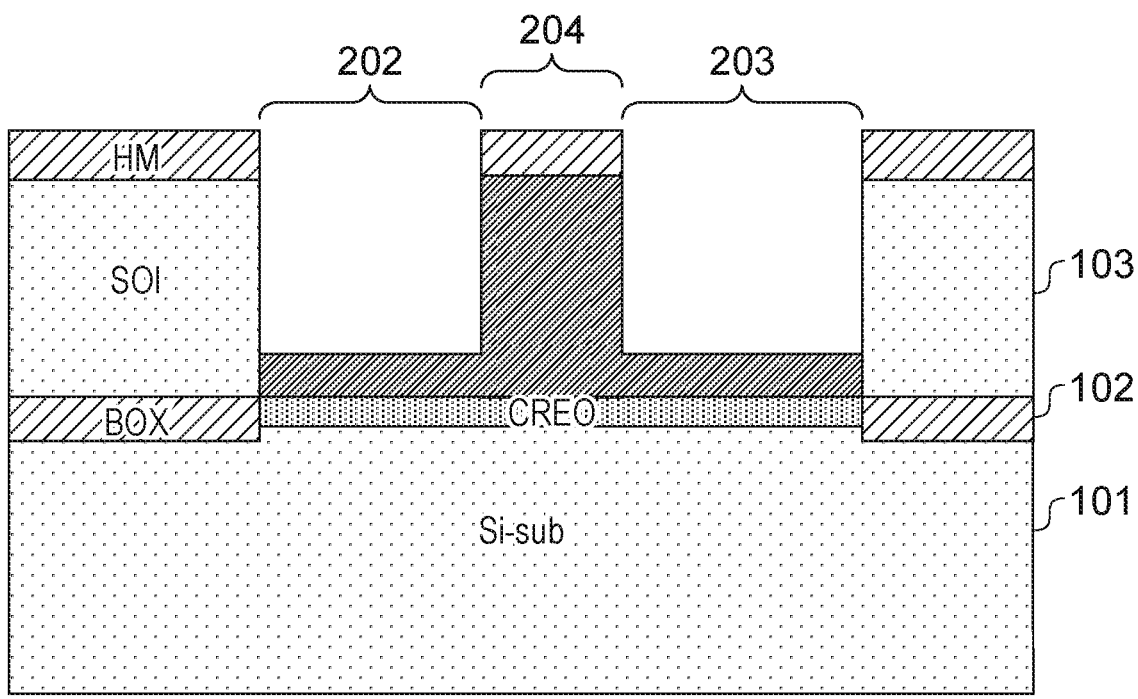
FIG. 2H Etch waveguide

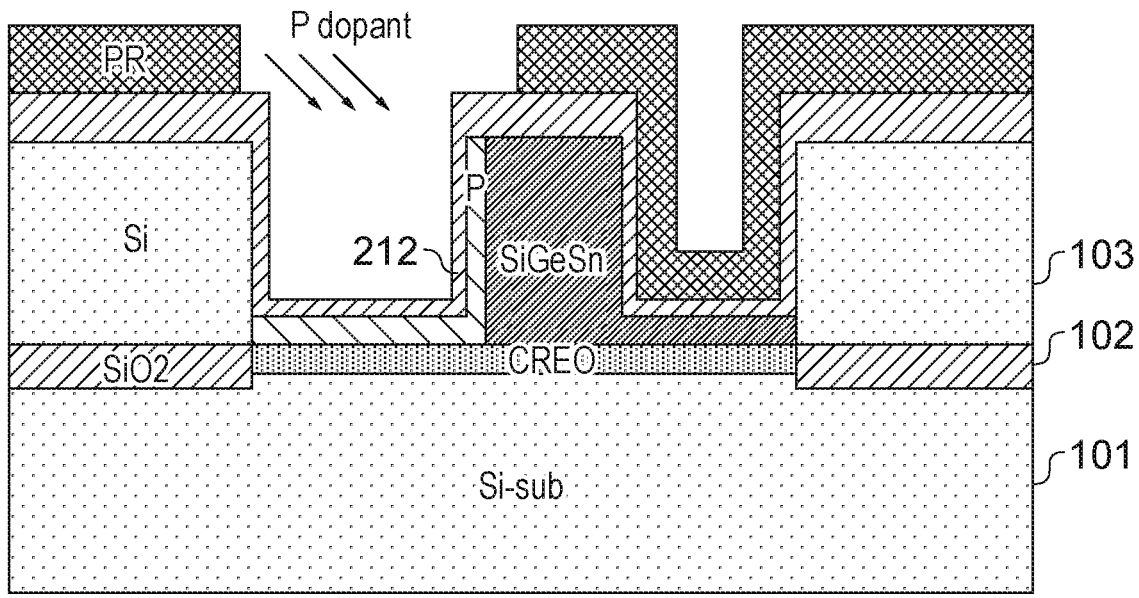
FIG. 2I P-type dopant implantation
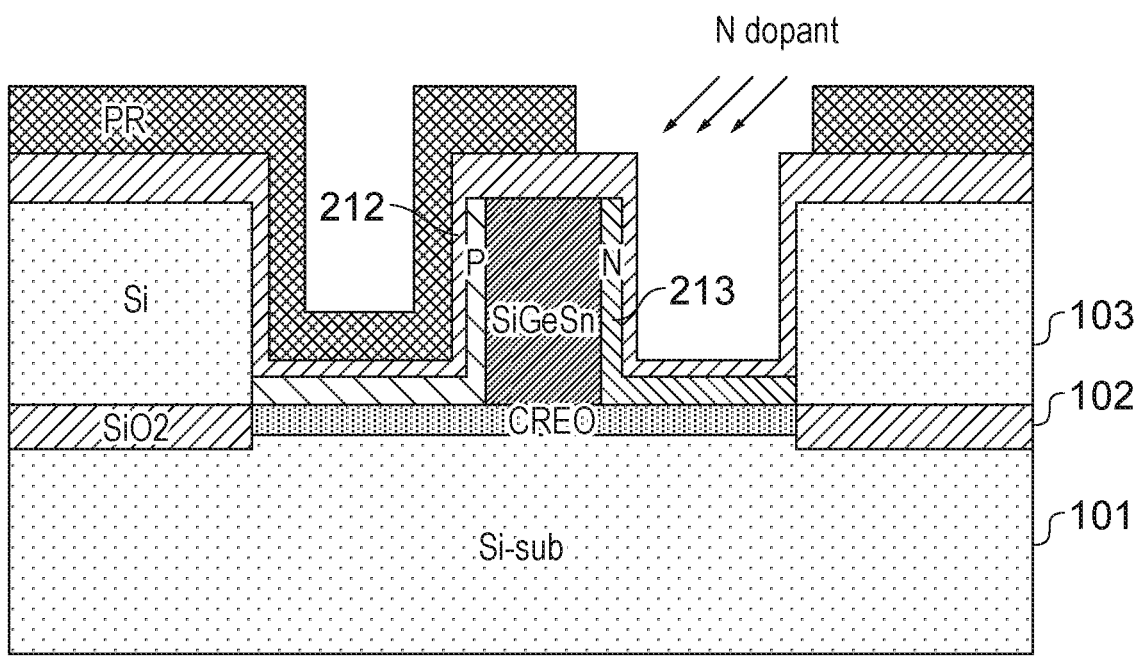
FIG. 2J N-type dopant implantation

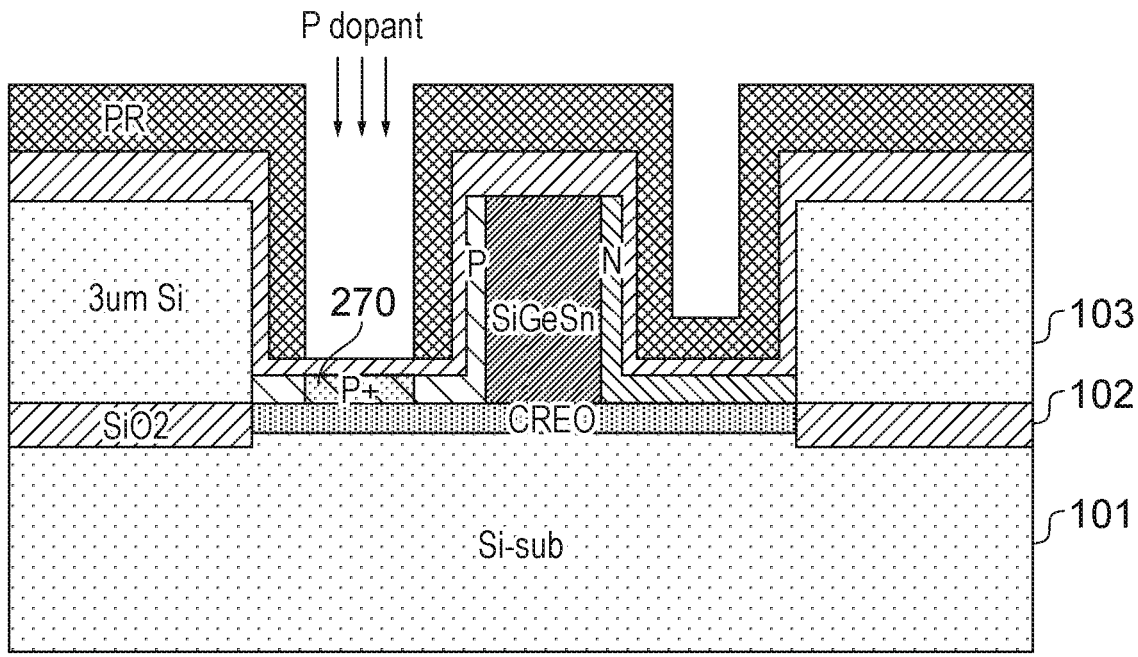
FIG. 2K P+ region implantation
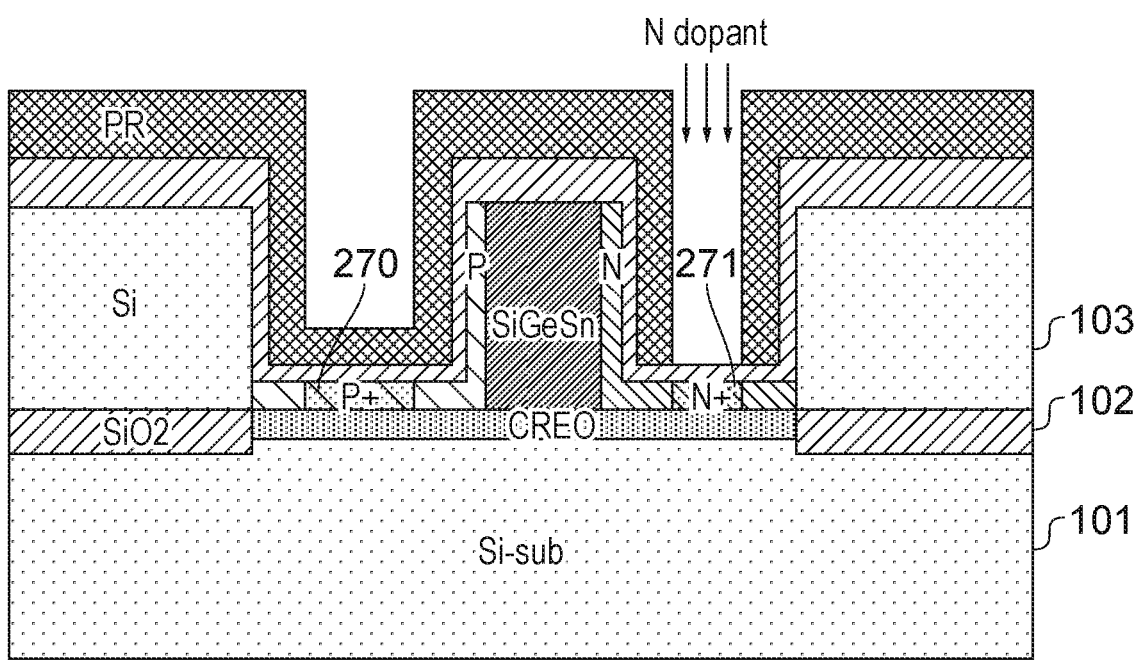
FIG. 2L N+ region implantation

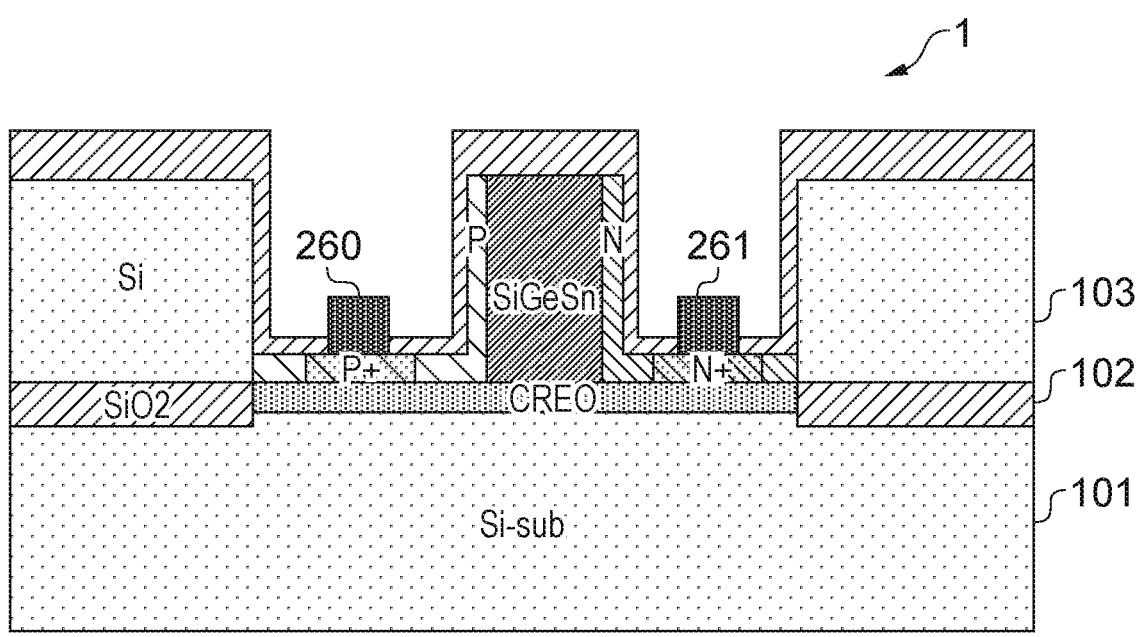
FIG. 2M VIA etching and metallization

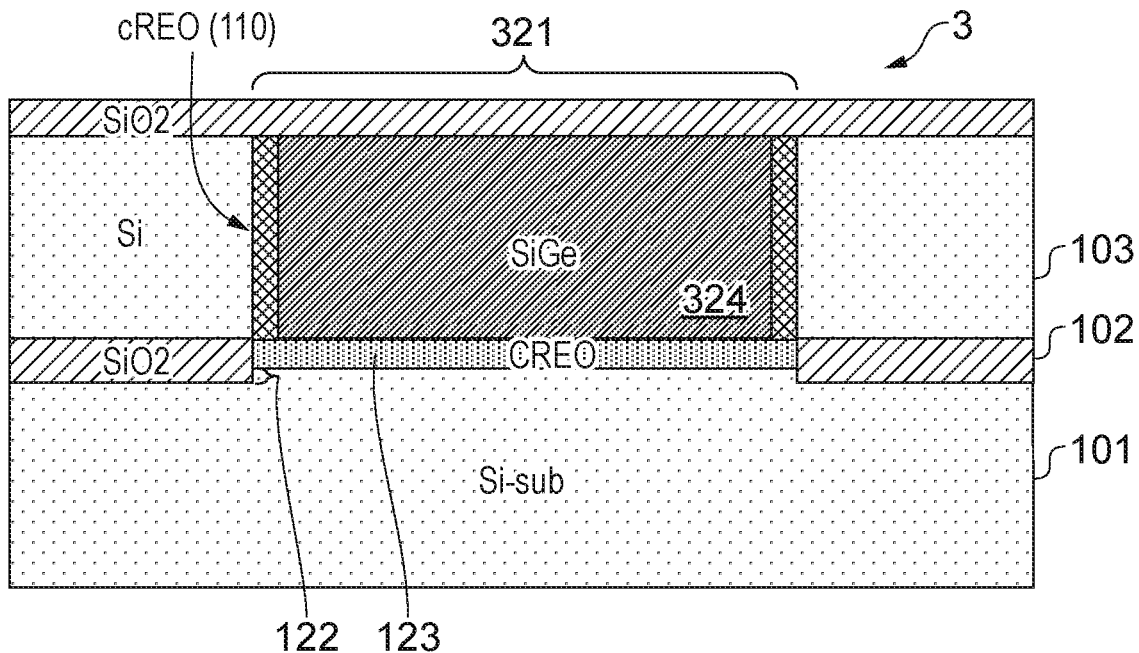
FIG. 3A A-A', section view along light propagation
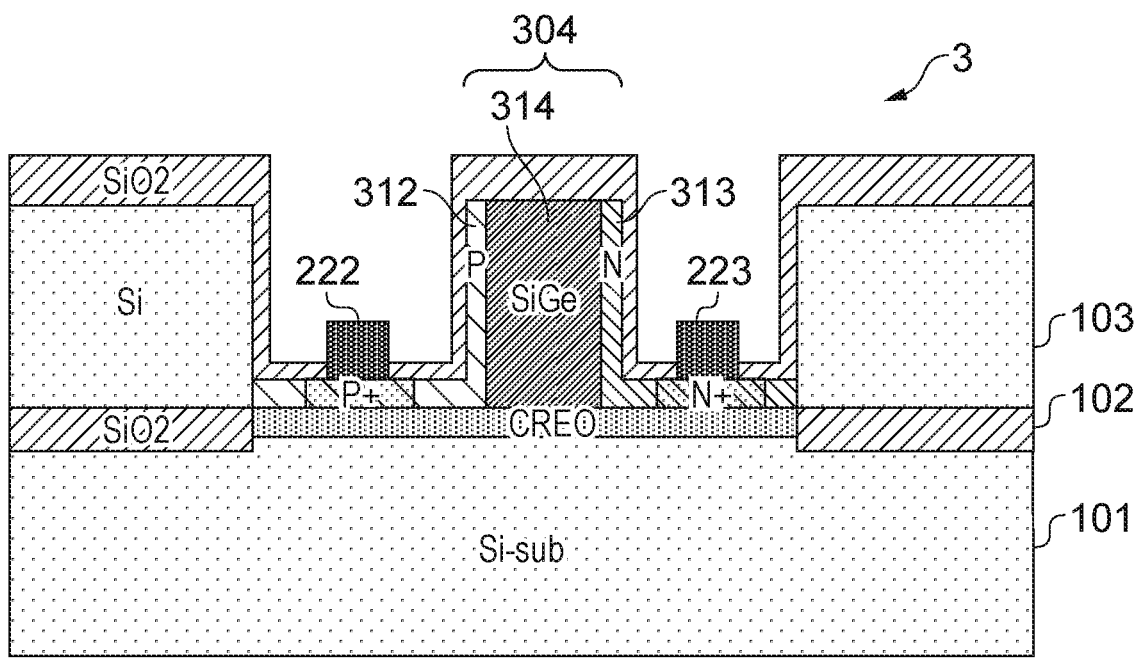
FIG. 3B B-B', cross section view

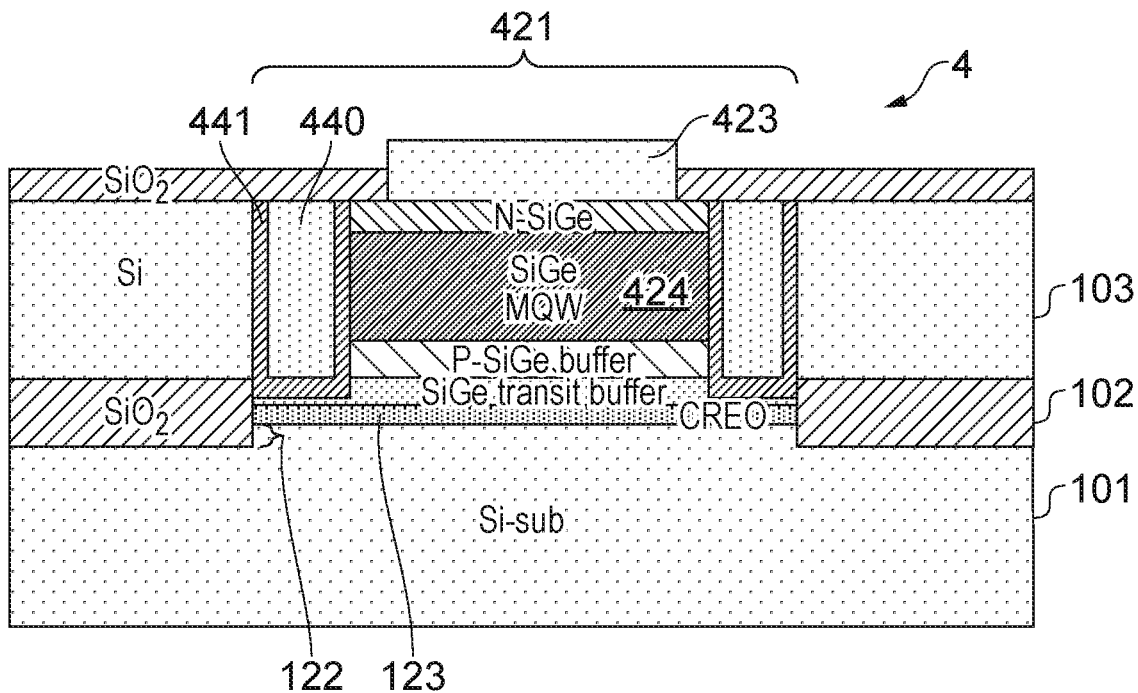
FIG. 4A A-A', section view along light propagation
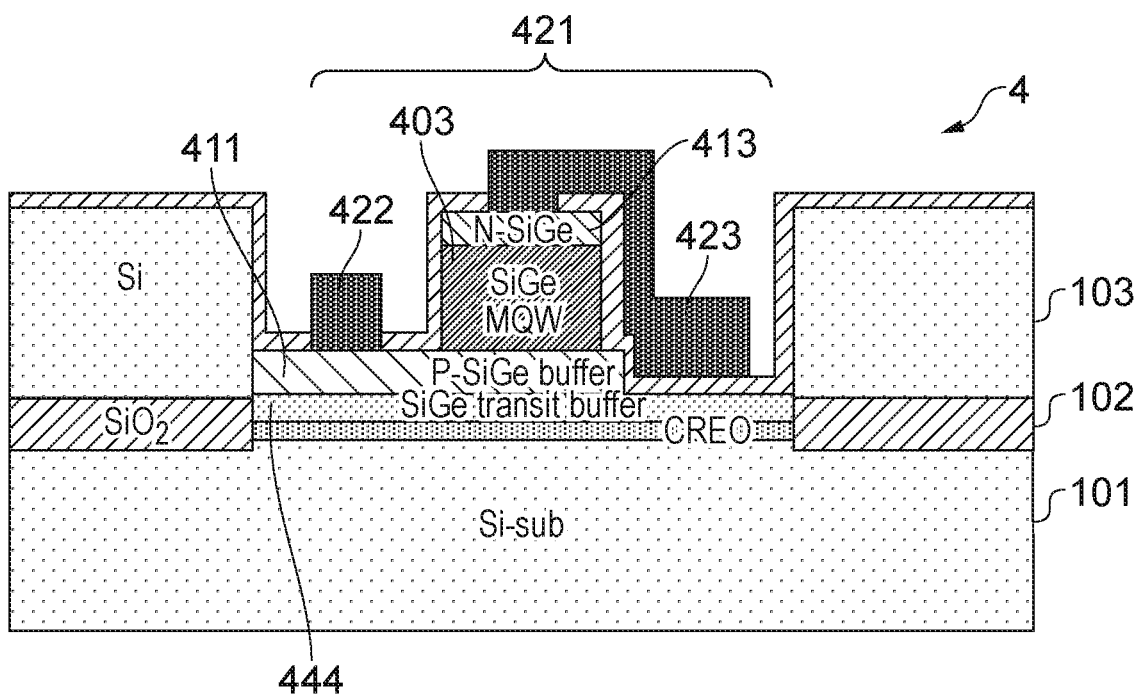
FIG. 4B B-B', cross section view

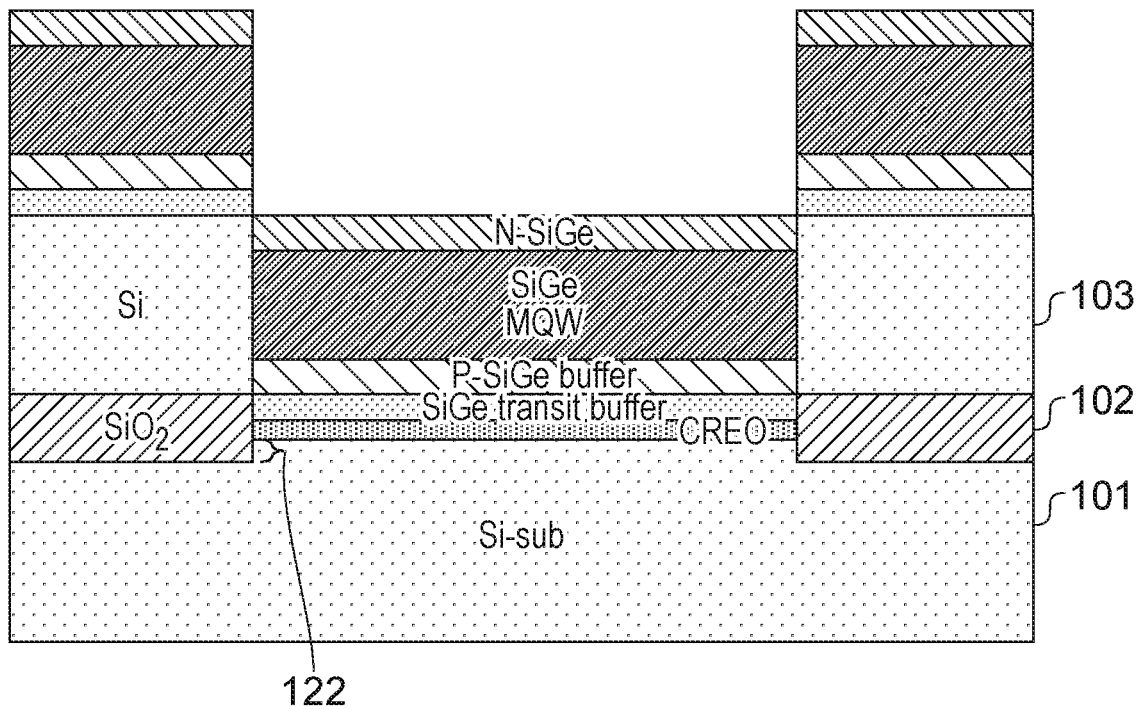
FIG. 5A SiGe MQW EPI growth
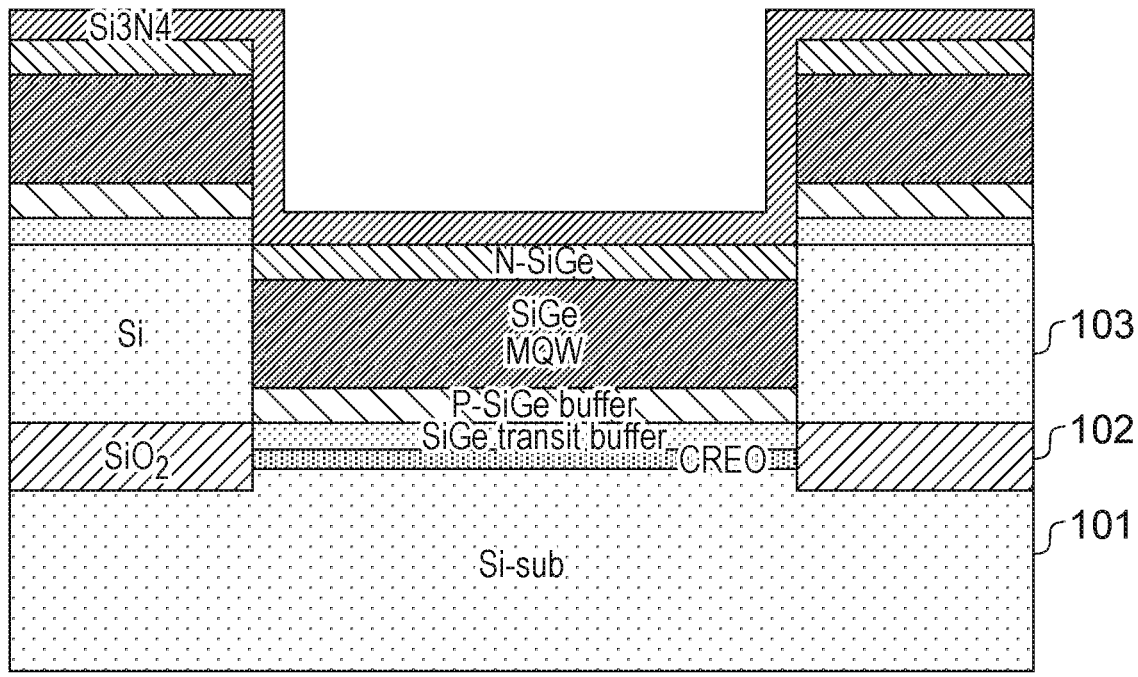
FIG. 5B Deposit $Si_3N_4$ for CMP

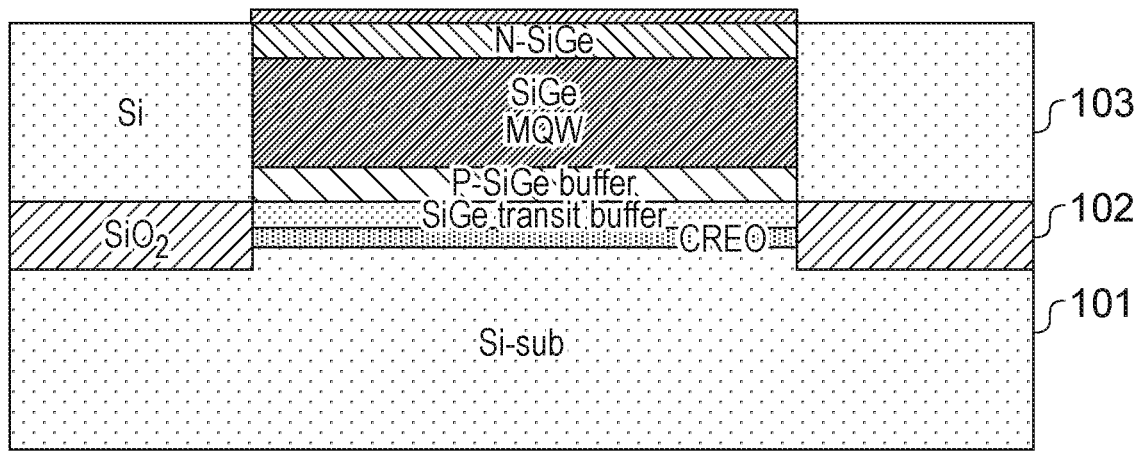
CMP and dry etch to remove SiGe transit buffer on SOI outside of cavity
FIG. 5C
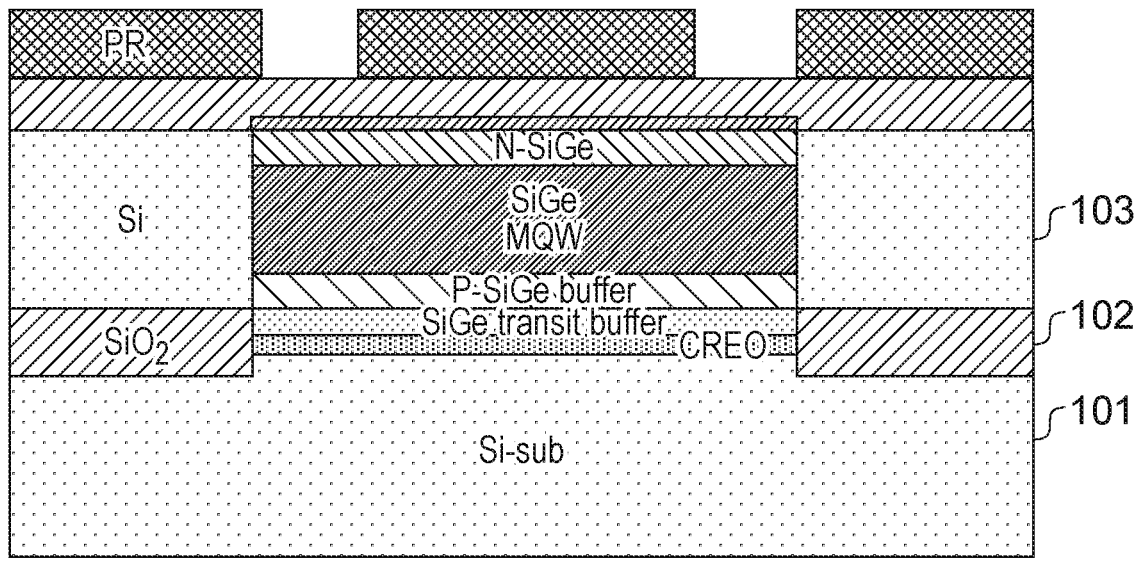
FIG. 5D Deposit $SiO_2$ and pattern trenches

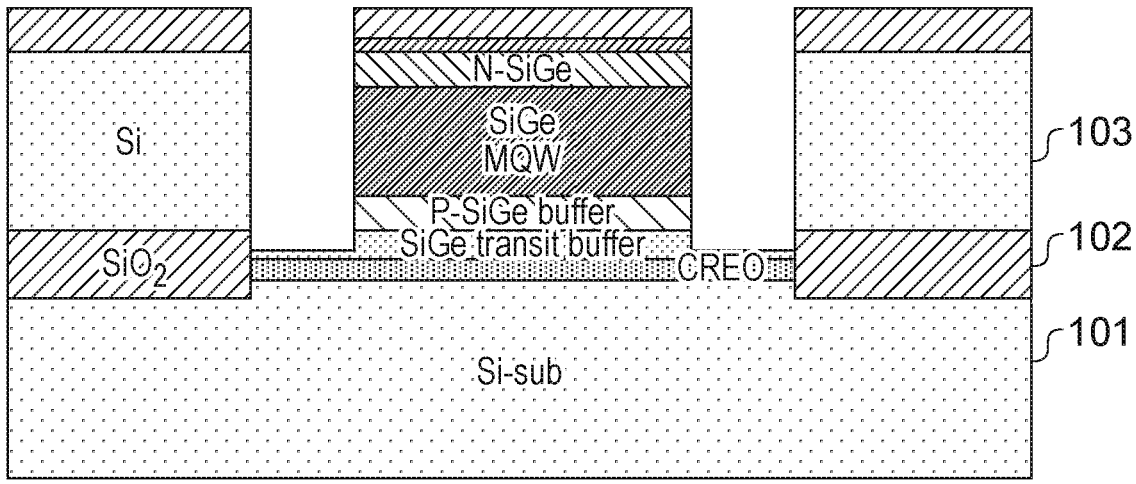
FIG. 5E Trench etching
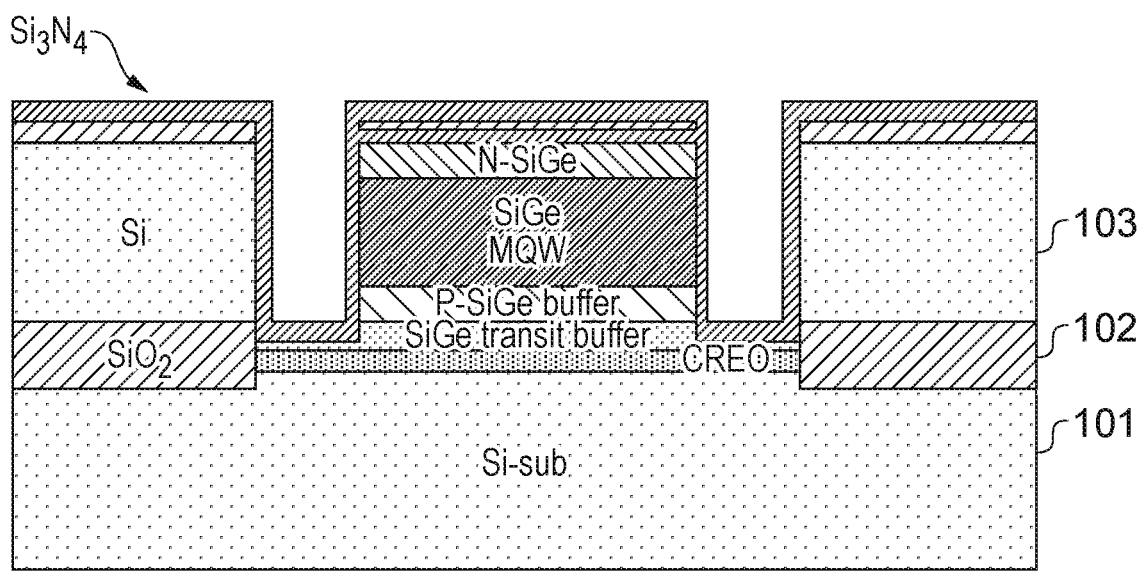
FIG. 5F Sidewall Si₃N₄ deposition

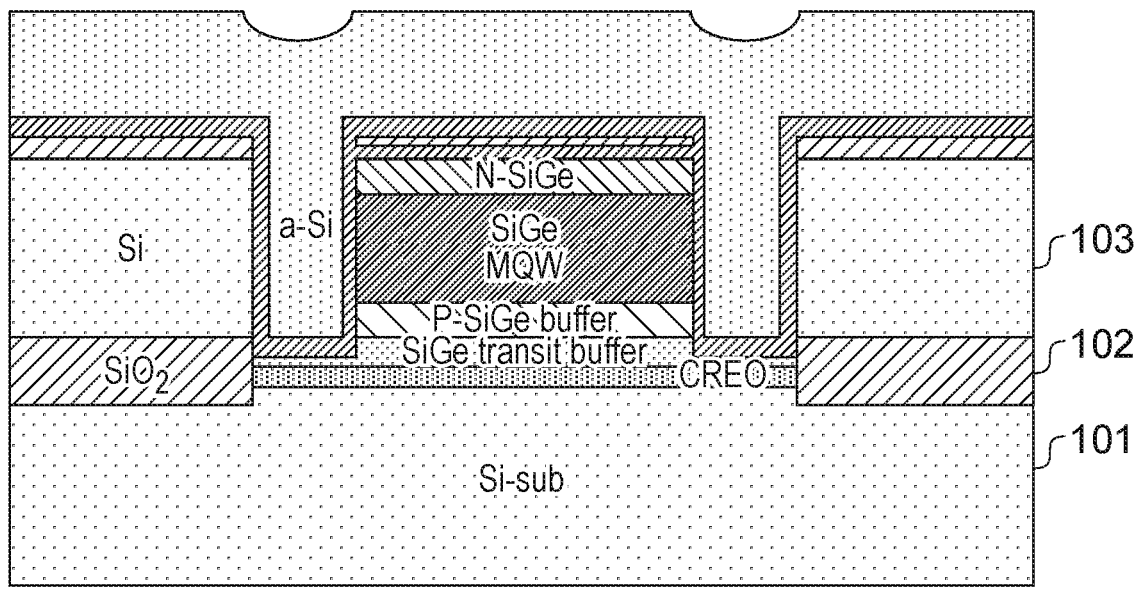
FIG. 5G a-Si deposition
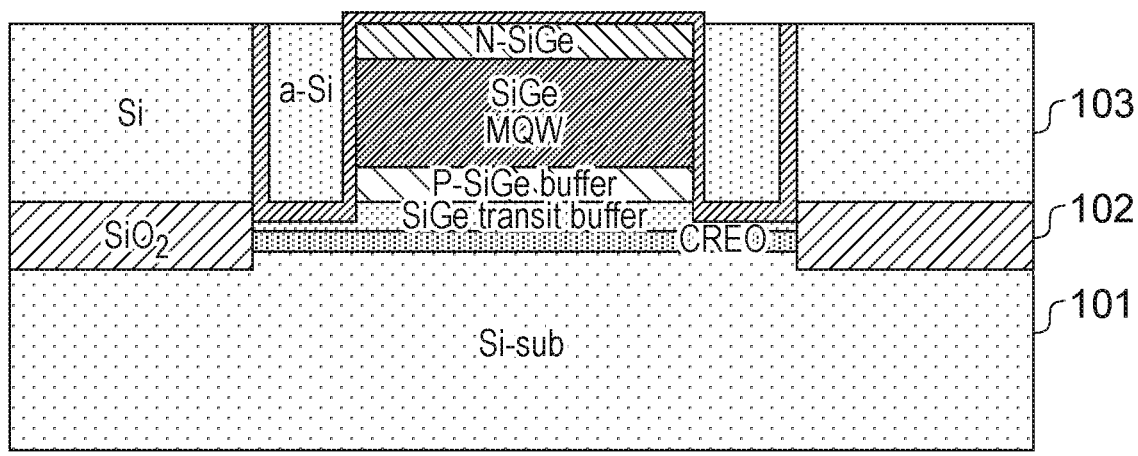
FIG. 5H a-Si CMP and dry etch back

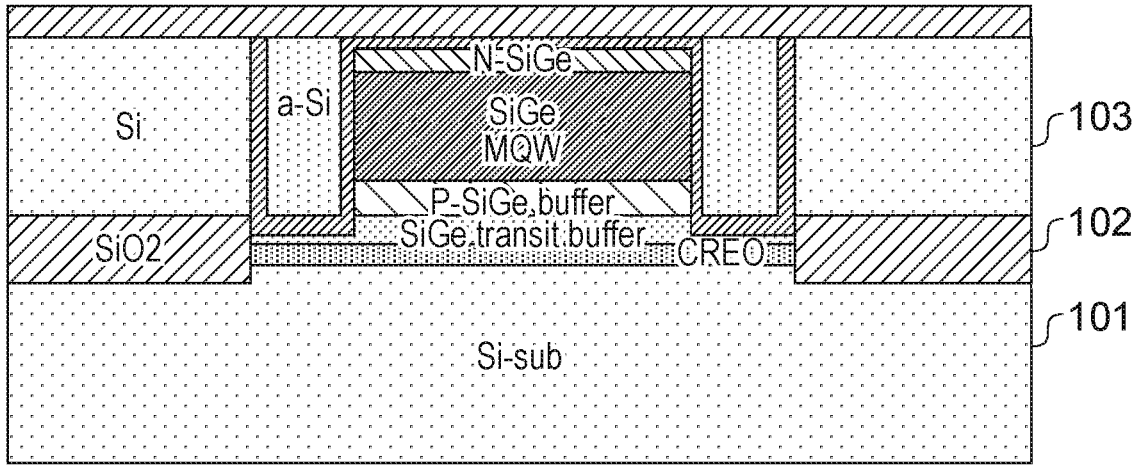
FIG. 5I Deposit SiO2 for waveguide patterning
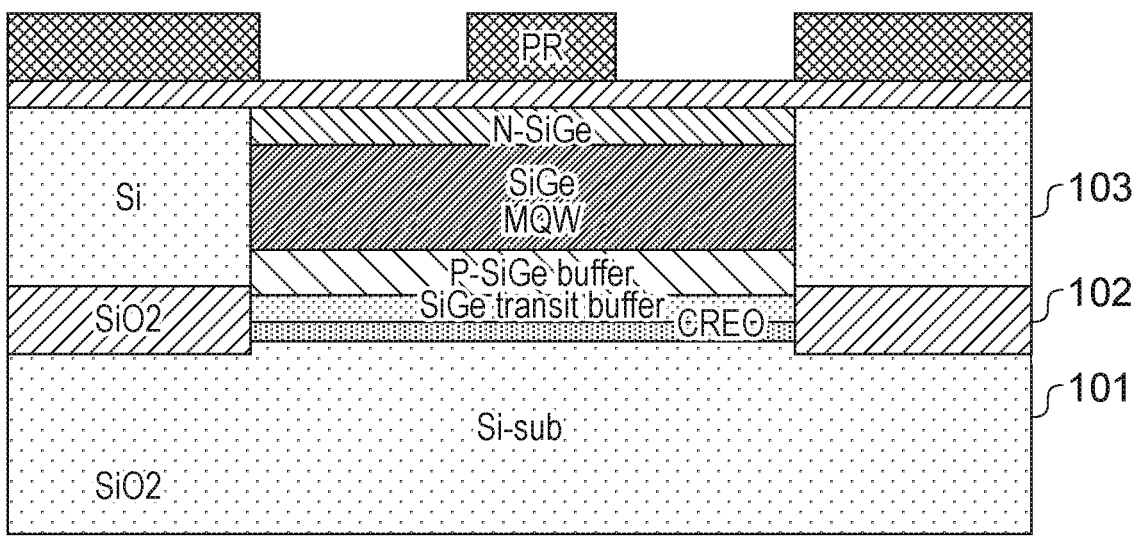
FIG. 5J Waveguide patterning (B-B', cross section view)

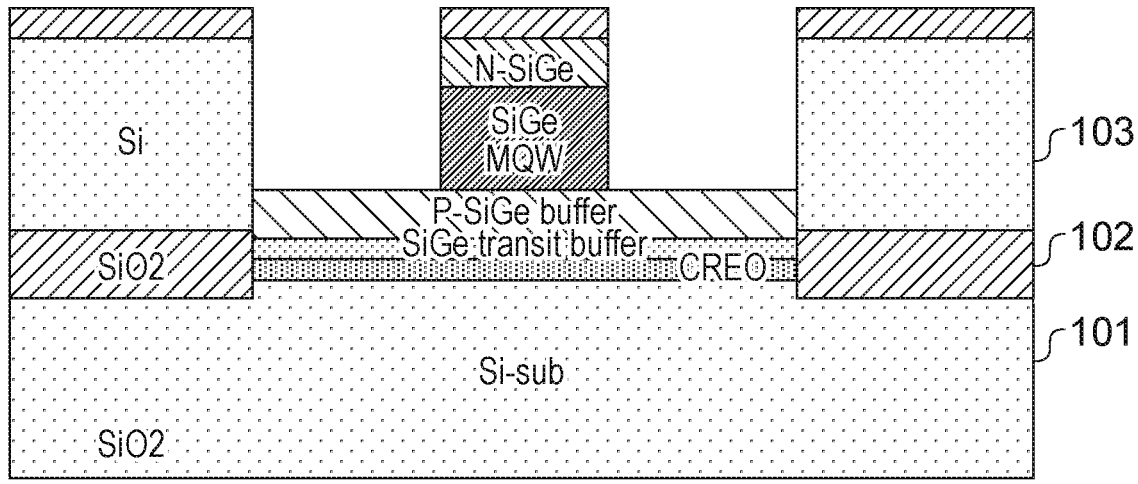
FIG. 5K etch waveguide
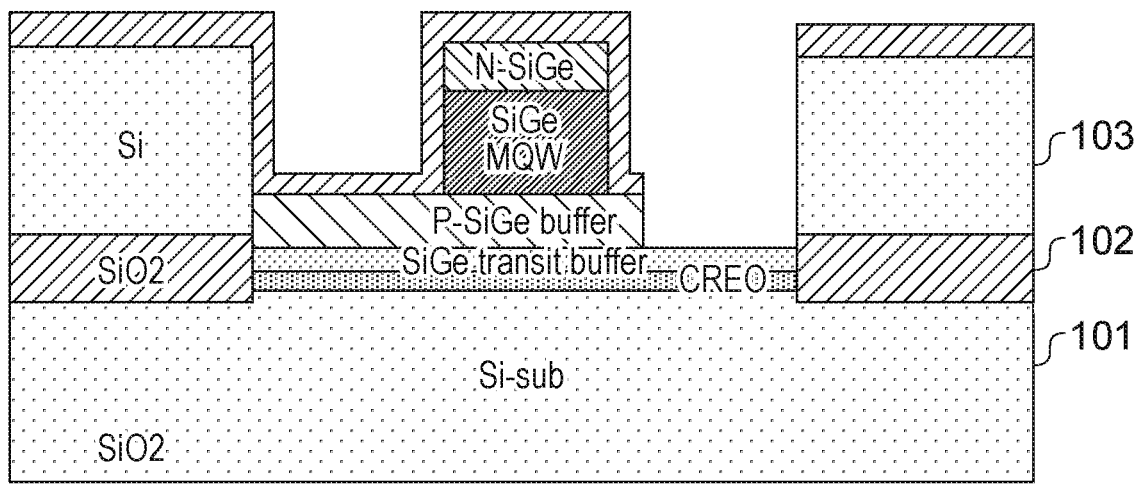
FIG. 5L etch top electrode pad clear area

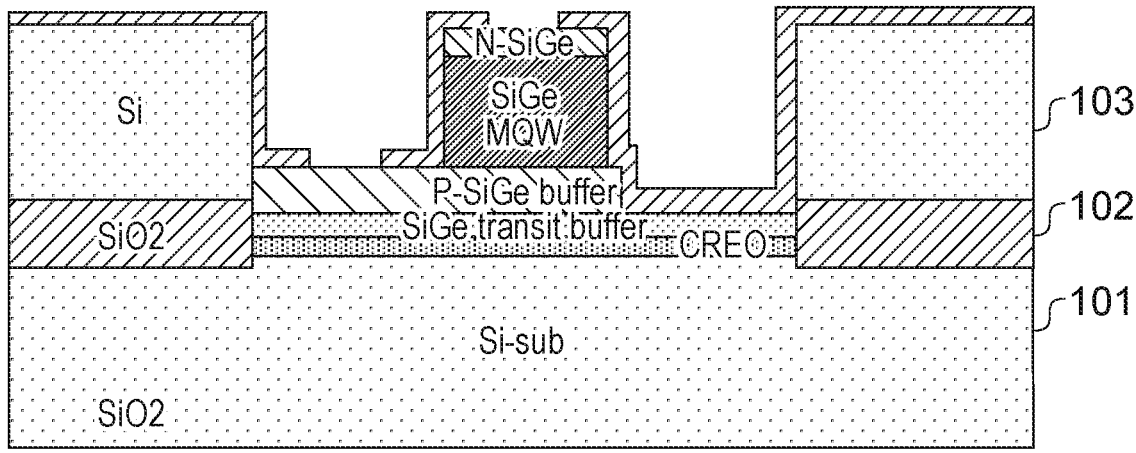
FIG. 5M Open contact VIA
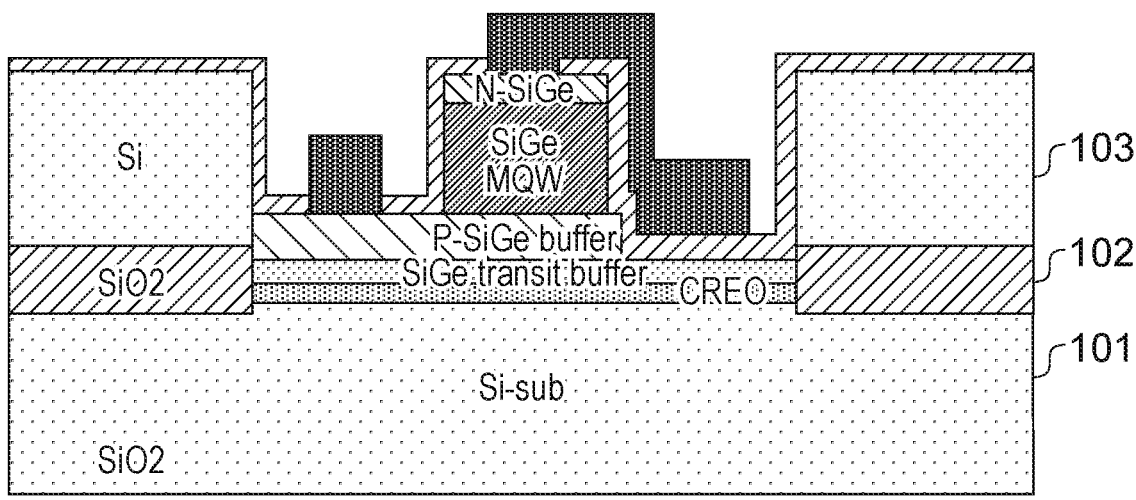
FIG. 5N Metallization

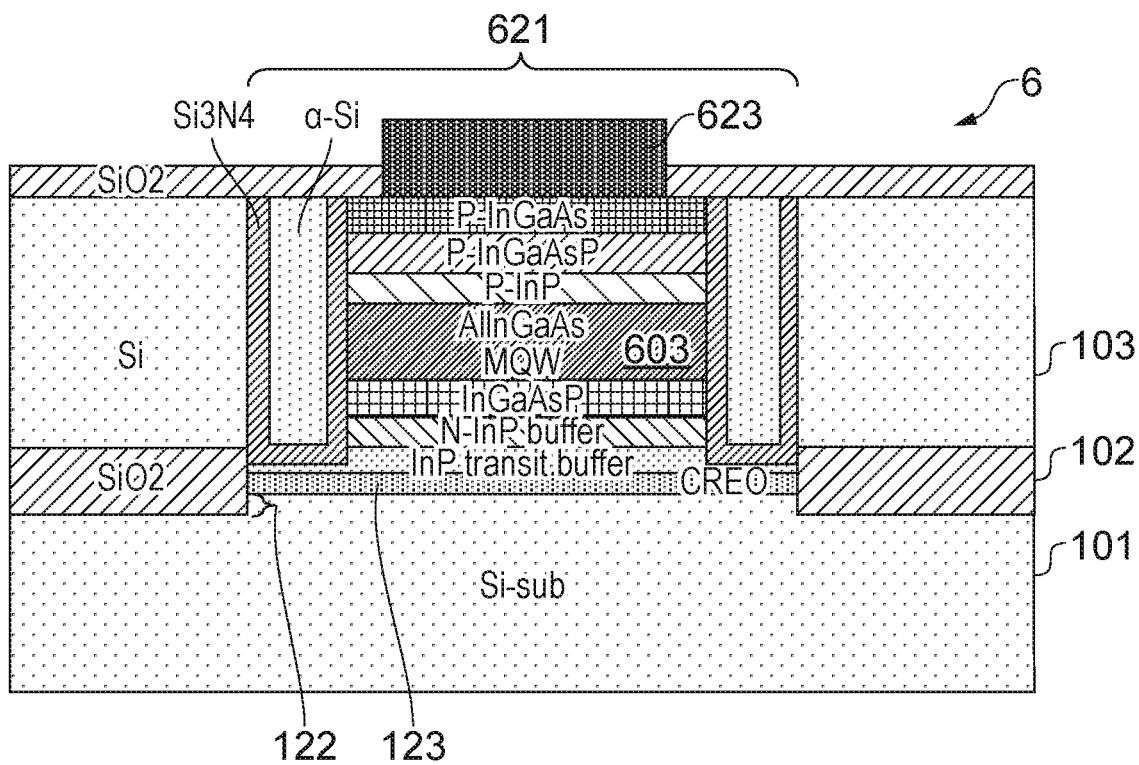
FIG. 6A A-A', section view along light propagation
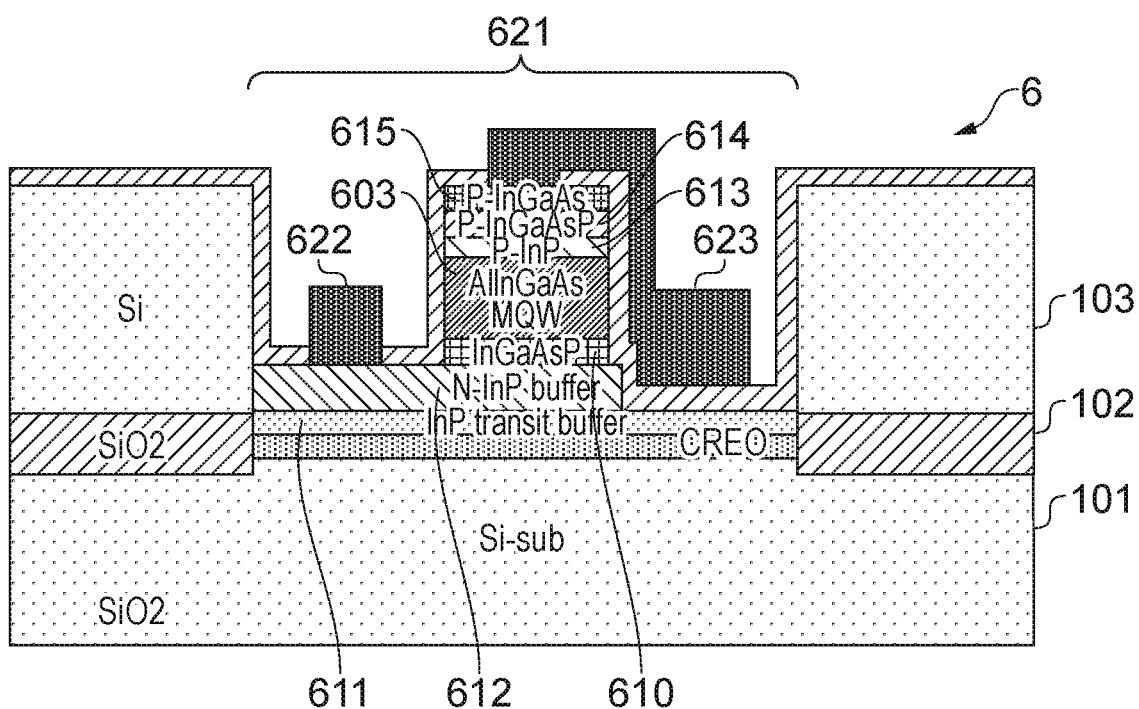
FIG. 6B B-B', cross section view

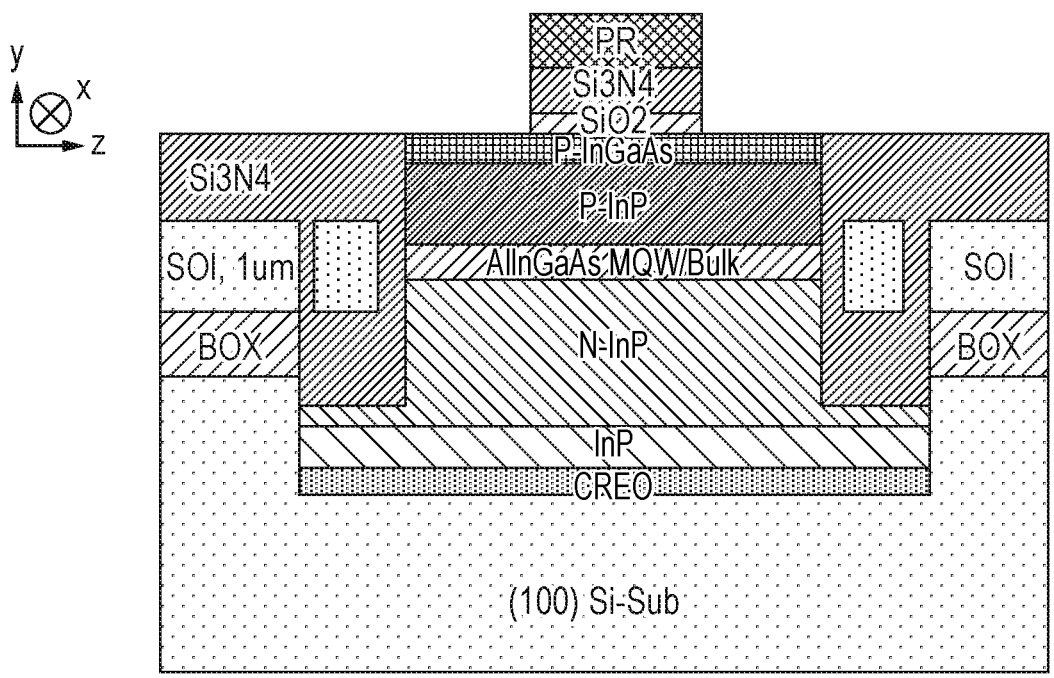
FIG. 9p(i)
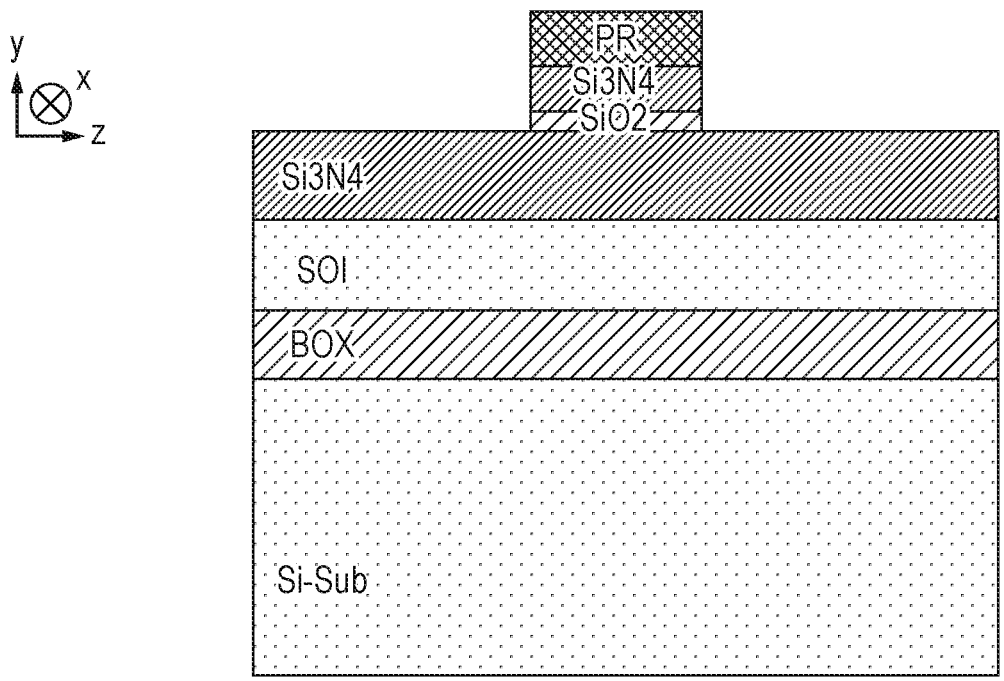
FIG. 9p(ii)

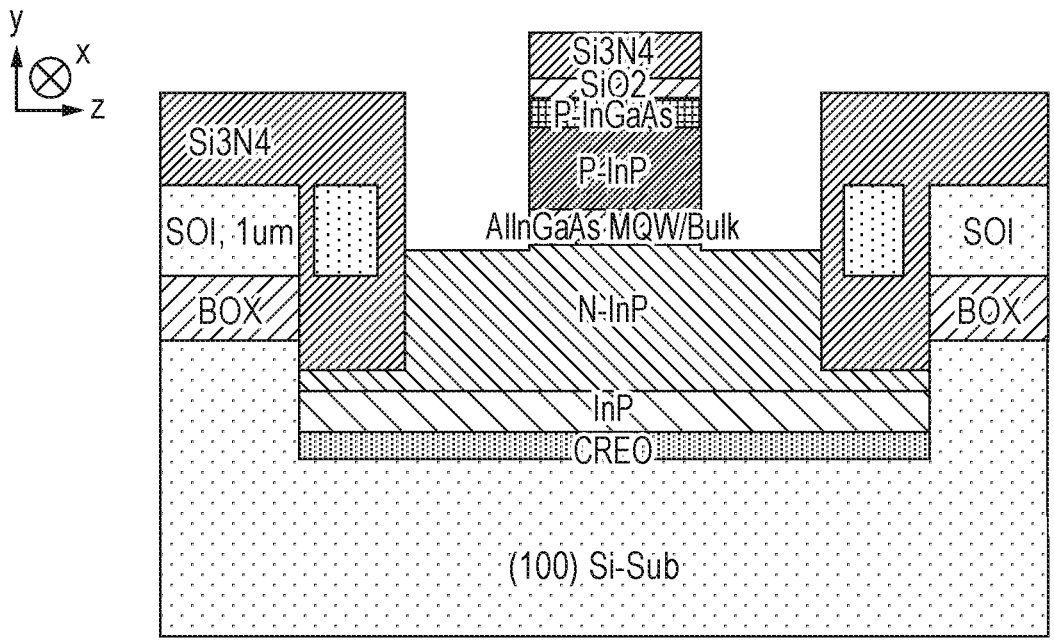
FIG. 9q(i)
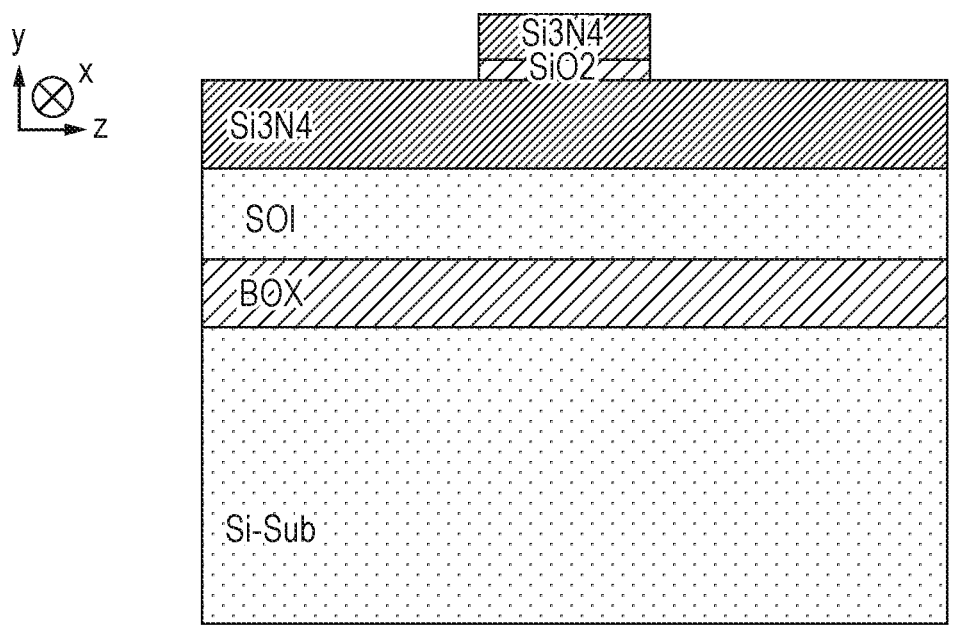
FIG. 9q(ii)

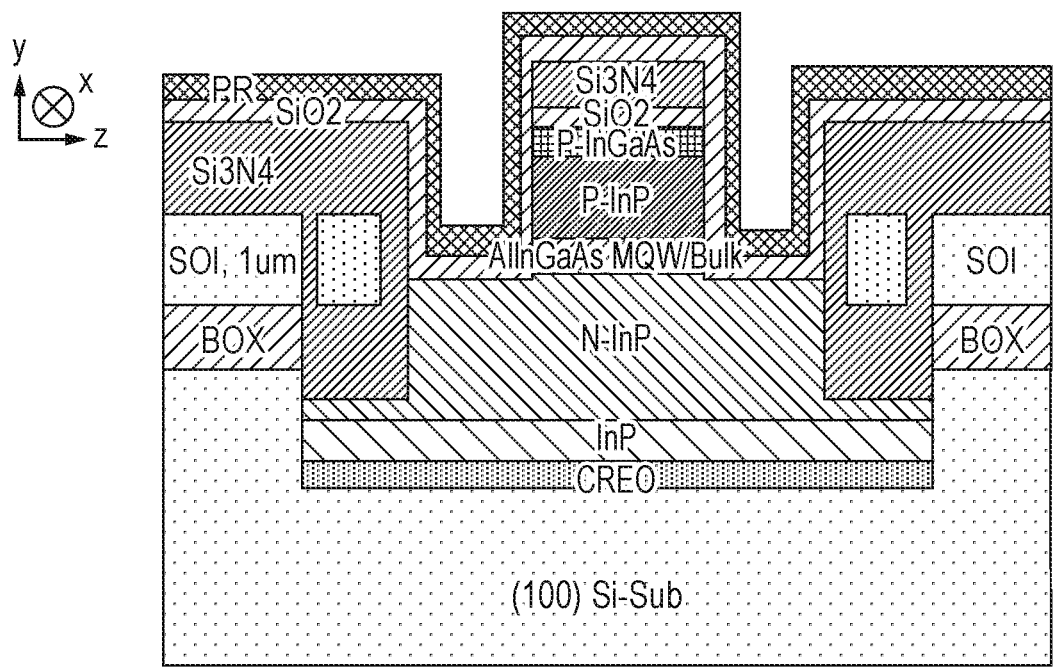
FIG. 9r(i)
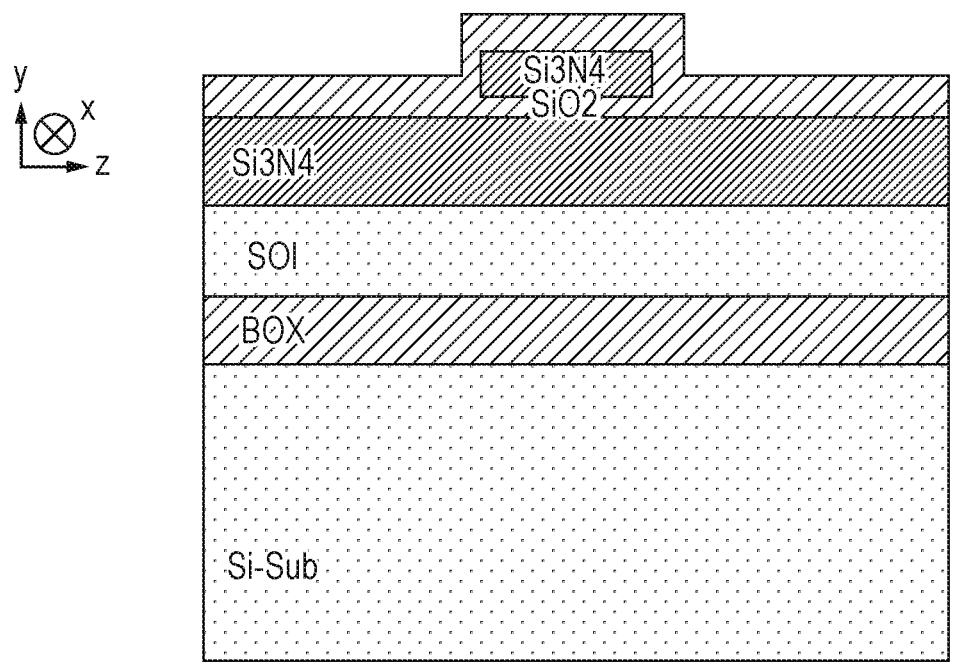
FIG. 9r(ii)

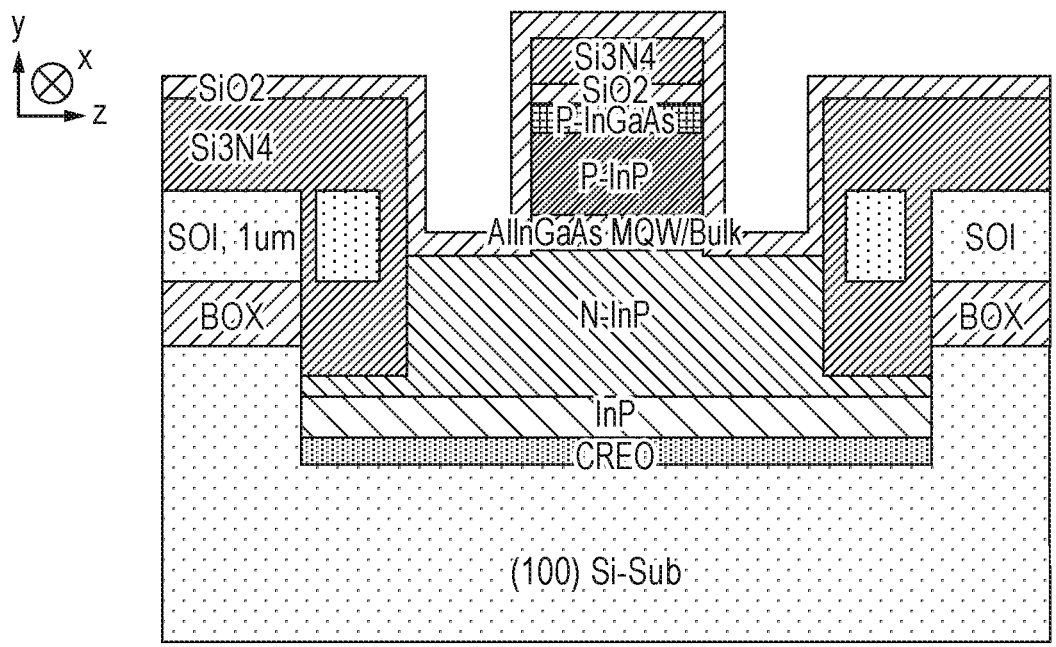
FIG. 9s(i)
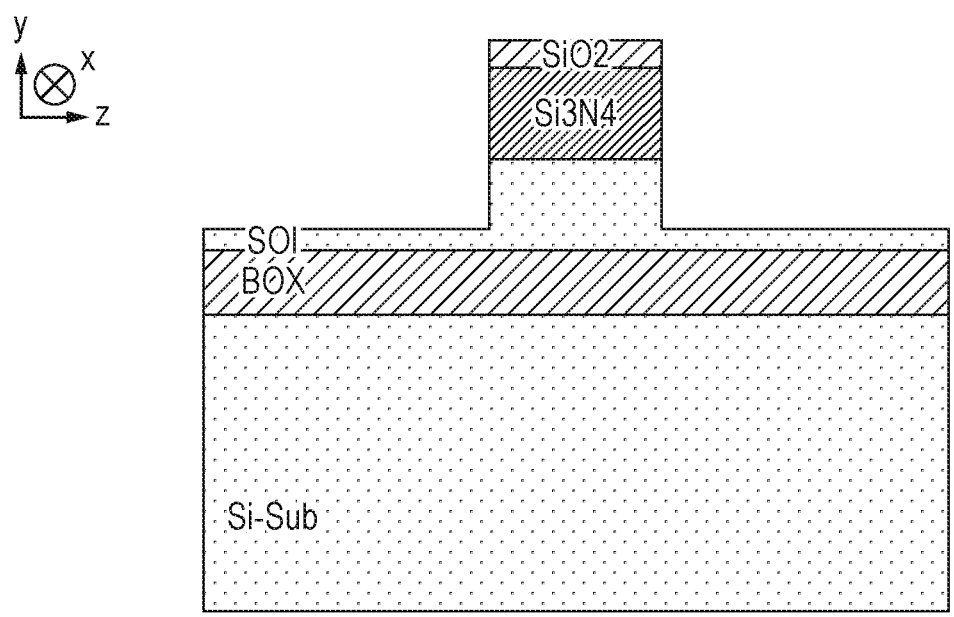
FIG. 9s(ii)

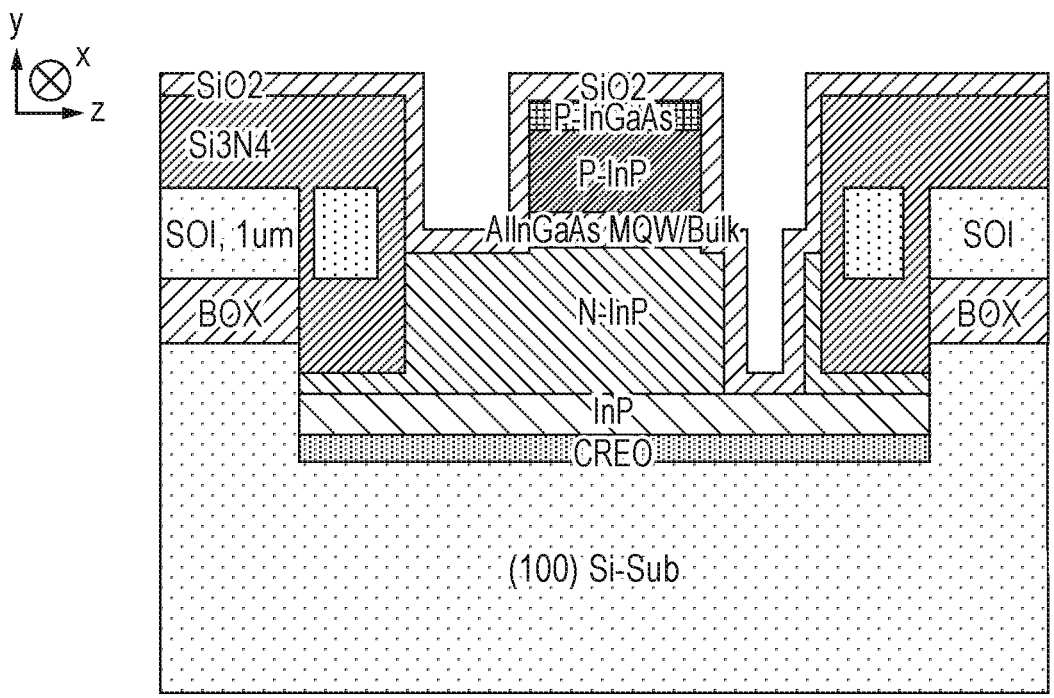
FIG. 9t(i)
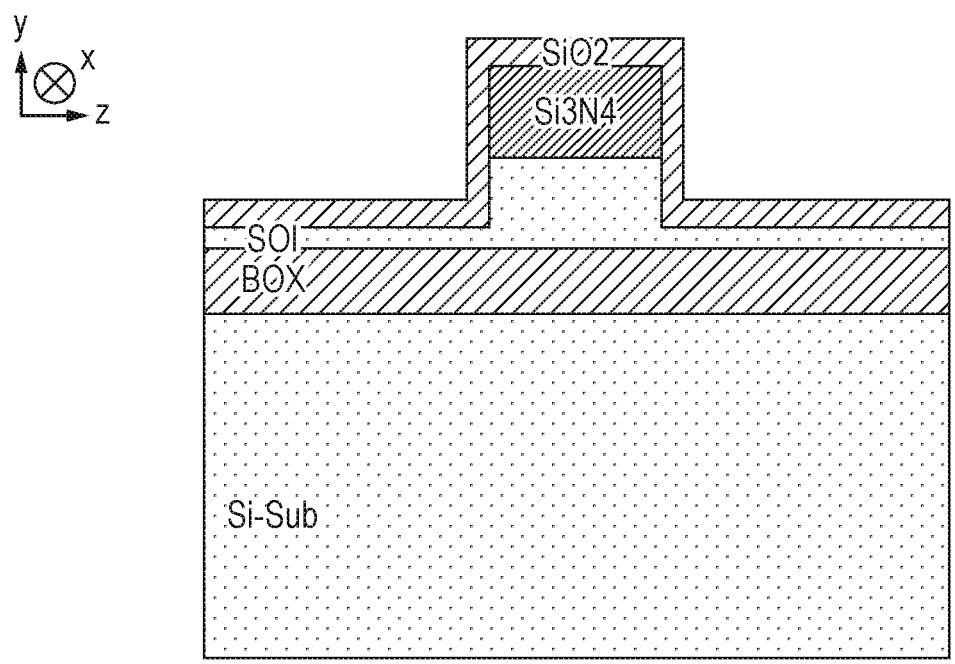
FIG. 9t(ii)

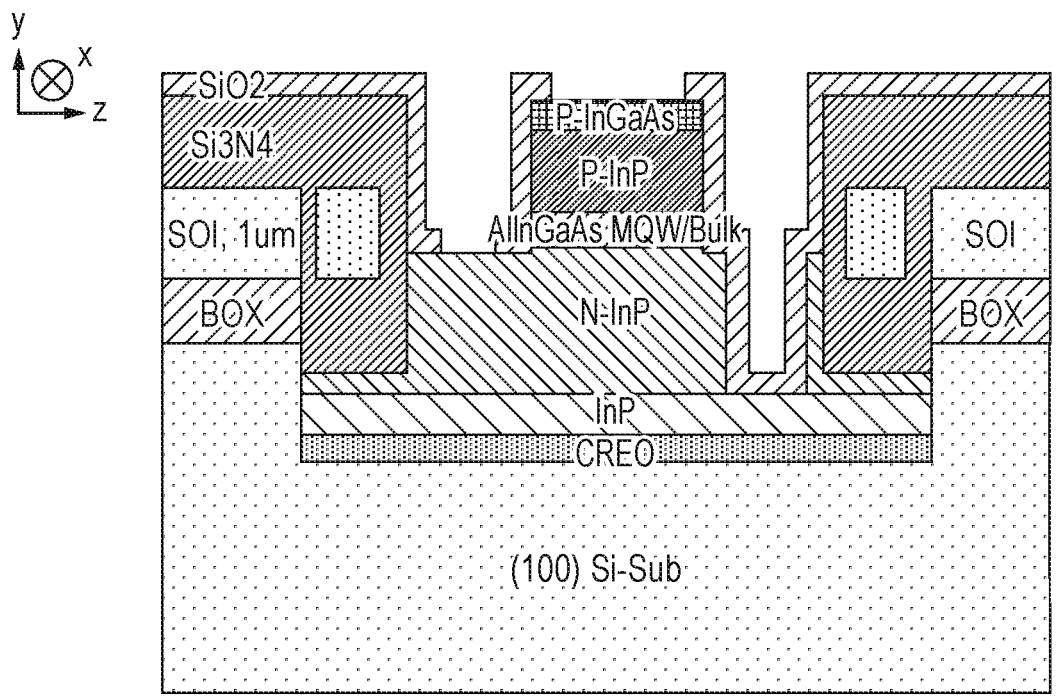
FIG. 9u(i)
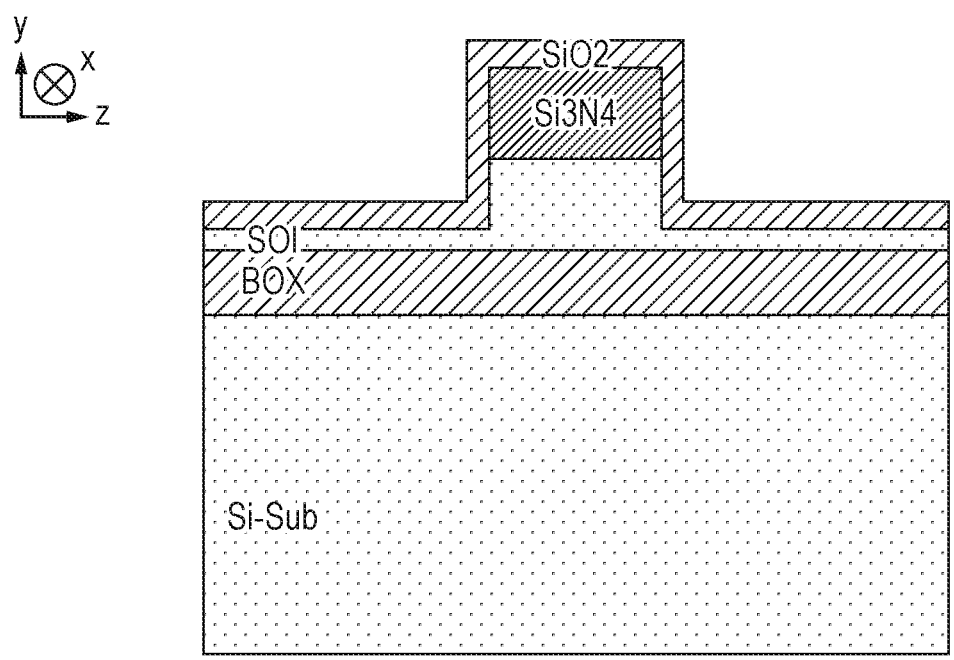
FIG. 9u(ii)

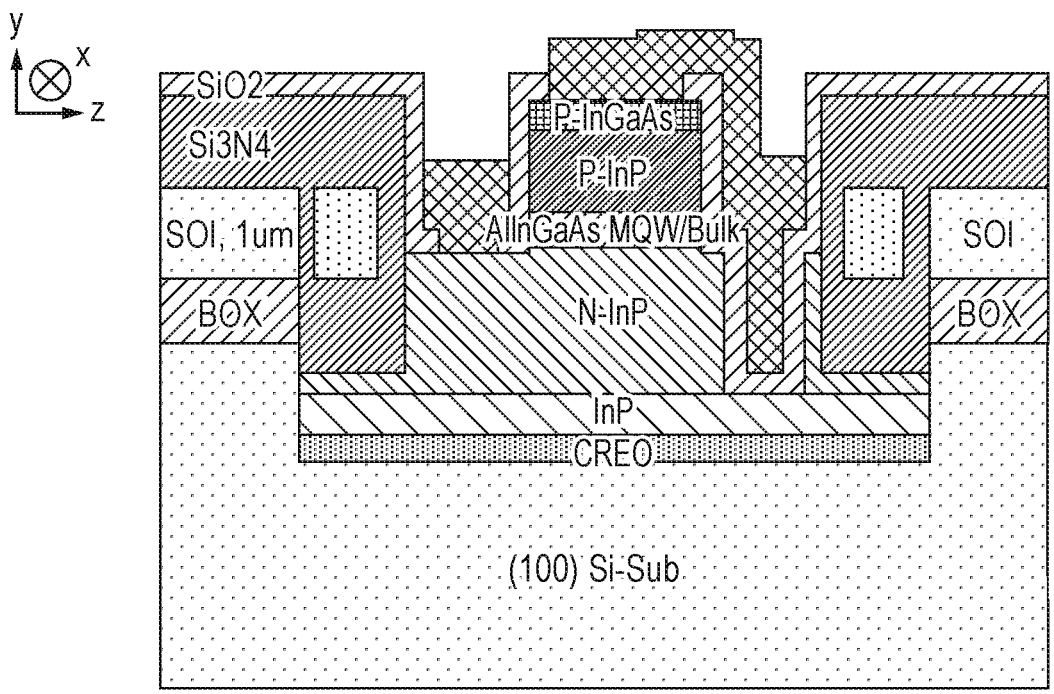
FIG. 9v(i)
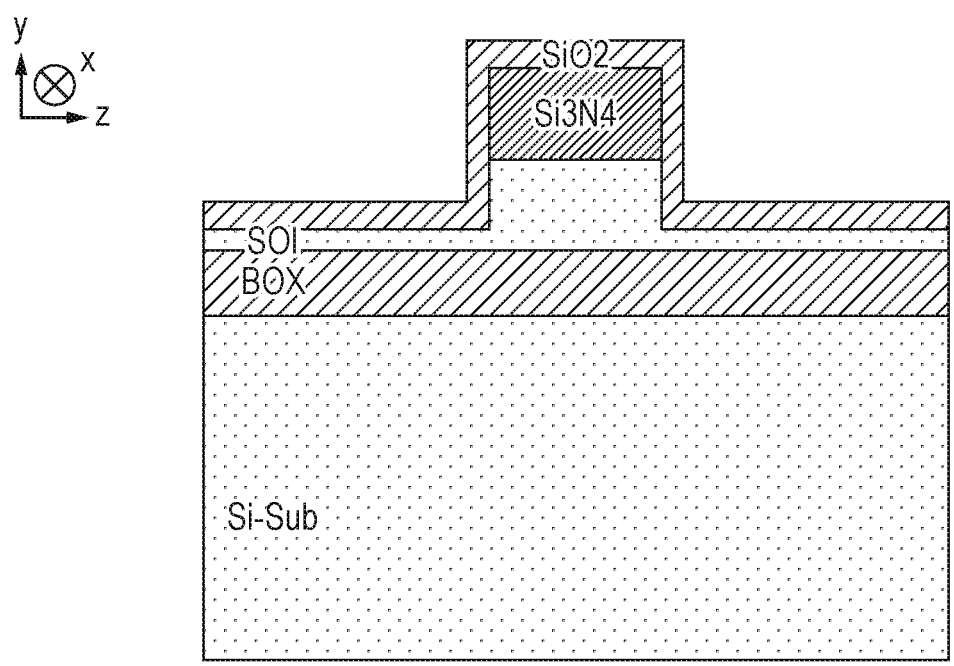
FIG. 9v(ii)

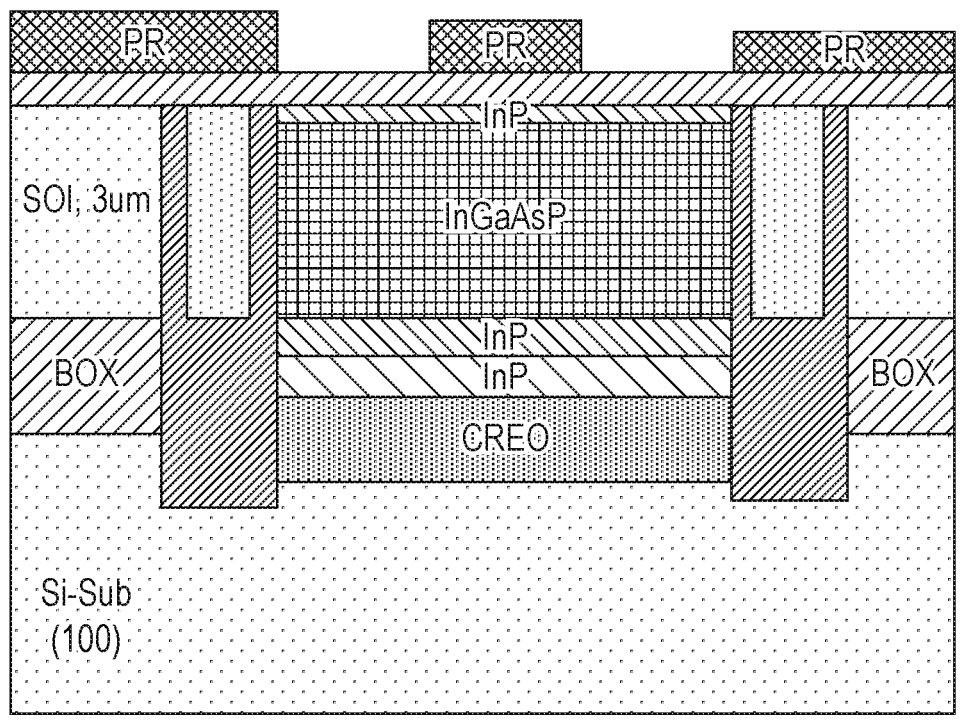
FIG. 10I(i)
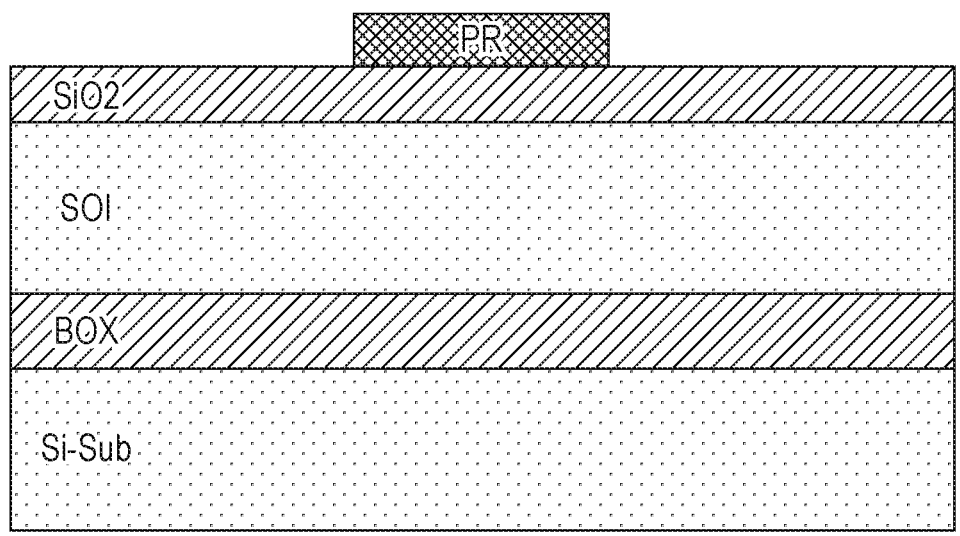
FIG. 10I(ii)

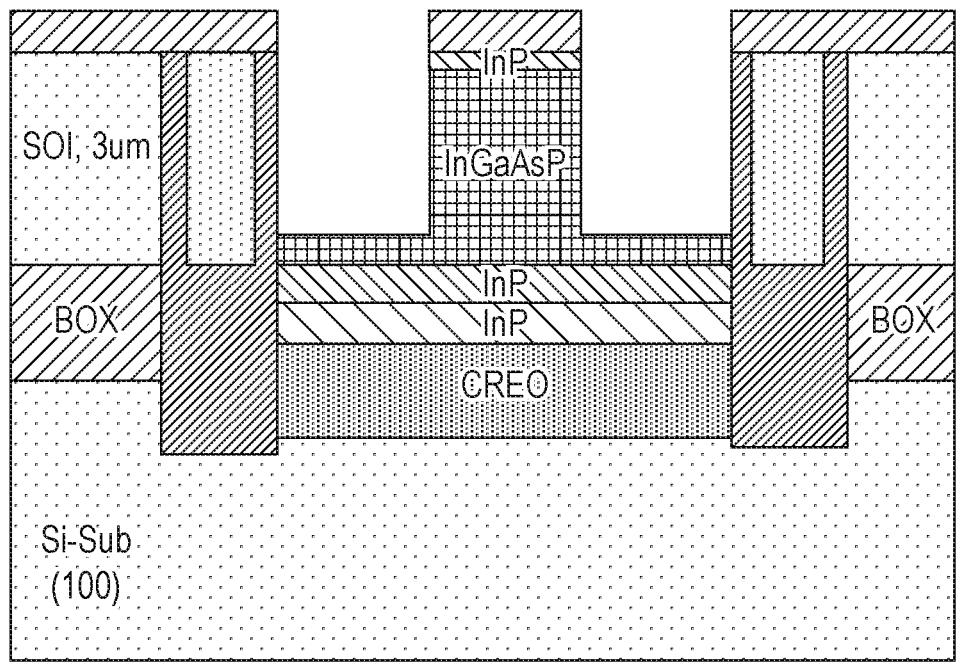
FIG. 10m(i)
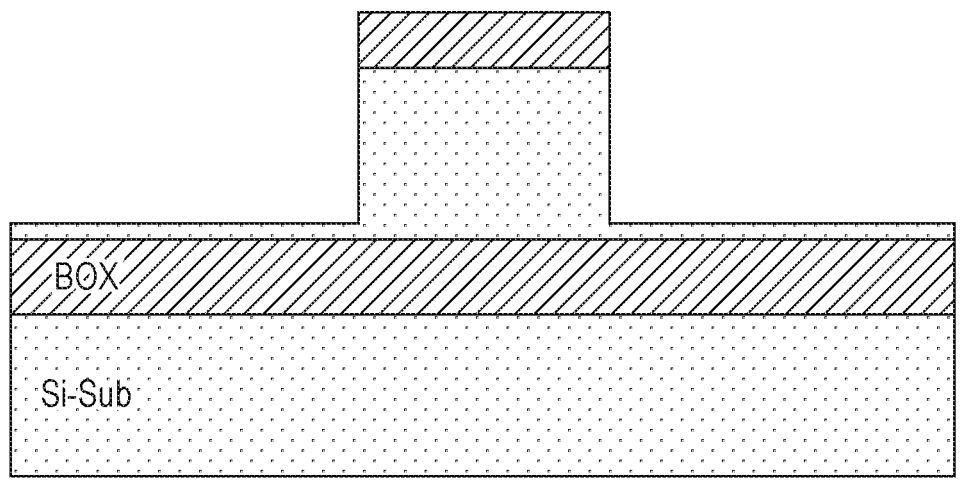
FIG. 10m(ii)

ELECTRO-ABSORPTION MODULATOR

CROSS-REFERENCE TO RELATED APPLICATION(S)

The present application claims the benefit of U.S. Provisional Application No. 62/635,955, filed Feb. 27, 2018, and the benefit of U.S. Provisional Application No. 62/675,050, filed May 22, 2018; the present application claims priority to International Patent Application No. PCT/EP2018/062269, filed May 11, 2018, which claims priority to International Patent Application No. PCT/EP2017/080221, filed Nov. 23, 2017, which claims priority to (i) U.S. Provisional Application No. 62/426,117, filed Nov. 23, 2016, and to (ii) U.S. Provisional Application No. 62/427,132, filed Nov. 28, 2016. The entire contents of all of the applications identified in this paragraph are incorporated herein by reference.

FIELD

The present invention relates to electro-absorption modulators, particularly to electro-absorption modulators for use on a silicon on insulator platform.

BACKGROUND

As the field of silicon photonics grows there is an increased appetite for improvements not only in the function of optoelectronic devices such as electro-absorption modulators, but also in the ease and reliability with which such devices can be fabricated.

SiGeSn is a known material and can be integrated on SOI platform to make an EAM which functions in the O-band (wavelengths of 1260-1360 nm). Typically, a Ge buffer is used to enable the SiGeSn material to be grown on silicon substrate, since SiGeSn cannot be epitaxially grown directly onto a silicon substrate.

It is known that crystalline oxide layers can be grown on Silicon. For example, Gottlob et al., Solid-State Electronics 50 (2006) 979-985 discloses $Gd_2O_3$ grown on a (001) oriented Si by a modified epitaxy process. An example of a crystalline REO multilayer structure grown on Si(111) is shown in ECS Journal of Solid State Science and Technology, 1 (5) P 246-P 249 (2012). Osten et al., phys. stat. sol. (a) 205, No. 4, 695-707 (2008) describes the use of crystalline REOs in silicon structures. The crystalline oxides may include $Er_2O_3$, $Gd_2O_3$ and other rare earth oxide materials, as well as $SrTiO_3$ (STO), $BaTiO_3$ (BTO), $La_2O_3$ (LAO) and other perovskite oxide materials with the general chemical formula $ABO_3$ or $A_2BO_4$.

SUMMARY

Accordingly, in a first aspect, some embodiments of the invention aim to solve the above problems by providing, according to a first aspect, an electro-absorption modulator (EAM), the EAM comprising:
  a silicon-on-insulator (SOI) substrate, the substrate comprising:
    a silicon support layer;
    a buried oxide (BOX) layer on top of the silicon support layer; and
    a silicon device layer on top of the BOX layer;
  a waveguide region, where a portion of the silicon device layer and a portion of the BOX layer underneath the portion of the device layer have been removed, the portion of the BOX layer having been replaced with a layer of silicon and a layer of crystalline oxide on top of the silicon; and
  a waveguide structure located directly on top of the crystalline oxide layer, the waveguide structure including a P doped region, and an N doped region with an intrinsic region in-between, creating a PIN junction across which a bias can be applied to create a modulation region.

The purpose of the re-grown silicon epitaxial layer is to enable the grown crystalline oxide layer to be kept thin (i.e. thinner than the original BOX layer), but still lie level with the top of the adjacent BOX layer.

In this way, an EAM with reduced optical losses is provided since the crystalline oxide layer provides a way to avoid using a Ge buffer layer and therefore incurring the associated optical losses. The EAM is also relatively convenient to fabricate in a manner that is compatible with existing EAM fabrication processes, as described below.

Optionally, the waveguide structure is made of one or more of the following bulk materials: SiGeSn, SiGe, InGaAs, AlInGaAs, and InGaAsP, or following quantum well stack materials: SiGe multiple quantum well (SiGe MQW), AlInGaAs MQW, InGaAsP MQW and InGaNAs MQW. Optionally, the waveguide structure is made of one or more of the following bulk materials: SiGeSn, SiGe, InGaAs, and InGaAsP, or following quantum well stack materials: SiGe multiple quantum well (SiGe MQW), AlInGaAs MQW, InGaAsP MQW and InGaNAs MQW.

In some examples, the crystalline oxide layer is a crystalline rare earth oxide (CREO). The crystalline oxide layer may be, in some examples, a perovskite oxide such as Strontium titanate (STO), Barium titanate (BTO), or Lanthanum aluminate (LAO).

CREO is an isolation material that has little optical absorption and can be epitaxially grown on silicon substrate with (111) orientation. SiGeSn can be epitaxially grown on CREO, as can the other waveguide materials listed above. The layer of CREO therefore acts as a transit layer to epitaxially grow SiGeSn (or other waveguide material) on top of the silicon replacement layer which has replaced the BOX layer.

Since the electro-absorption medium of SiGeSn (or other waveguide material listed above) has a higher refractive index than that of the silicon light-transmitting medium, in conventional EAM structure the uniform and continuous silicon layer above BOX layer and underneath the waveguide material must be thin to keep the coupling efficiency high between the light-transmitting medium and the electro-absorption medium. Usually, the thickness of the silicon layer is 0.2 µm. In practical EAM fabrication with 3 µm SOI platform, to achieve 0.2 µm uniform silicon layer on top of BOX by etching down 3 µm silicon overlay with high yield is very difficult, which makes the integration of EAM with other components on SOI with high density, high yield and low cost very challenging.

Some embodiments of this invention therefore also introduce a new EAM structure which does not have this difficulty in practical device fabrication and is suitable for high density, high yield and low cost photonics integration on SOI platform.

In some embodiments, the structure disclosed is not limited to an EAM, but also covers other optoelectronic devices such as a laser or a photodetector.

Optional features of some embodiments of the invention will now be set out. These are applicable singly or in any combination with any aspect of embodiments of the invention.

Optionally, the crystalline oxide layer has a thickness of 20 nm-400 nm. In some embodiments, the crystalline oxide layer may have a thickness of no more than 50 nm.

Optionally, the silicon support layer is Si(111), the replacement silicon layer is Si(111)

Optionally, the crystalline oxide layer may have an (111) orientation, although other orientations are also envisaged.

Optionally, the waveguide structure is a rib waveguide which comprises: a waveguide ridge on a slab, with a first slab portion on a first side of the ridge, and a second slab portion on a second side of the ridge, wherein the waveguide ridge, first slab portion and second slab portion are all formed of the same material as one another.

The SiGeSn typically has an inverted T-shaped cross section, the cross section taken in a direction perpendicular to, or substantially perpendicular to the longitudinal axis of the ridge waveguide.

Optionally, the waveguide structure is a rib waveguide which comprises:
  a SiGeSn waveguide ridge on a SiGeSn slab, with a first SiGeSn slab portion on a first side of the ridge, and a second SiGeSn slab portion on a second side of the ridge.

The SiGeSn typically has an inverted T-shaped cross section, the cross section taken in a direction perpendicular to, or substantially perpendicular to the longitudinal axis of the ridge waveguide.

Optionally, the P doped region is located at the first slab and the N doped region is located at the second slab.

Optionally, the P doped region extends into a first sidewall of the ridge and/or wherein the N doped region extends into a second sidewall of the ridge.

Optionally, the EAM further comprises a first metal contact at the first slab, in electrical connection with the P doped region and a second metal contact at the second slab portion, in electrical connection with the N doped region.

Optionally, the P doped region and the N doped region are located in layers, one above the other, with the intrinsic layer located between the P doped and N doped regions. For example, the waveguide structure may be a rib waveguide which comprises: a waveguide ridge on a slab, the waveguide ridge being formed from a plurality of layers stacked in a vertical direction (i.e. one away from the silicon substrate), wherein a first layer of the plurality of layers is the N doped region and a second layer of the plurality of layers is the P doped region. In such an example, a first metal contact may connect to the P doped region, and a second metal contact may connect to the N doped region, the second metal contact may extend up a sidewall of the waveguide structure and across an uppermost surface thereof so as to connect to an upper surface of the N doped region. Whilst, in this example, the N doped region is above the P doped region, the reverse is of course possible. Such an arrangement, where one doped layer of the PIN junction is above the other, may be referred to as a vertical PIN junction. In contrast, an arrangement where both doped regions extend up respective sidewalls of the waveguide, may be referred to as a horizontal PIN junction.

Optionally, the SOI substrate is a 3 μm SOI platform.

Optionally, for quantum well stack materials, the waveguide structure is a rib waveguide which comprises: a MQW waveguide ridge on a slab with buffer layer that is P (or N) doped region; N (or P) doped region on top of the MQW waveguide ridge;

The waveguide typically has an inverted T-shaped cross section, the cross section taken in a direction perpendicular to, or substantially perpendicular to the longitudinal axis of the ridge waveguide.

Optionally, the EAM further comprises a first metal contact at the slab, in electrical connection with the P (or N) doped region and a second metal contact at the top of the waveguide, in electrical connection with the N (or P) doped region.

The quantum well material may take the form of a multiple quantum well stack which comprises a vertical PIN structure, the vertical PIN structure being made in-situ during the material epi process.

Optionally, the SOI substrate is a 1 μm SOI platform.

According to a second aspect, some embodiments of the invention provide a method of fabricating an electro-absorption modulator (EAM), the method comprising:
  providing a silicon-on-insulator substrate, the substrate comprising: a silicon support layer; a buried oxide (BOX) layer on top of the silicon support layer; and a silicon device layer on top of the BOX layer;
  etching through a portion of the silicon device layer and the BOX layer to create a cavity in the substrate which exposes a portion of the silicon support layer;
  epitaxially growing a replacement layer of silicon on top of the exposed portion of the silicon support layer;
  epitaxially growing a layer of crystalline oxide on top of the replacement layer of silicon, the replacement layer of silicon and the crystalline oxide layer replacing the portion of the BOX layer that had been etched away;
  epitaxially growing a layer of a first material on top of the crystalline oxide layer; and
  fabricating a waveguide structure within the layer of the first material, the waveguide structure including a P doped region, and an N doped region with an intrinsic region in-between, creating a PIN junction across which a bias can be applied to function as a modulation region.

Optionally, the first material is one or more of the following materials: SiGeSn, SiGe, InGaAs, AlInGaAs, InGaAsP, SiGe multiple quantum well (SiGe MQW), AlInGaAs MQW, InGaAsP MQW and InGaNAs MQW. Optionally, the first material is one or more of the following materials: SiGeSn, SiGe, InGaAs, InGaAsP, SiGe multiple quantum well (SiGe MQW), AlInGaAs MQW, InGaAsP MQW and InGaNAs MQW.

Optionally, the replacement silicon layer will extend so that is no higher than the upper surface of the box layers in the original SOI substrate. The crystalline oxide layer can then be grown so that the upper surface of the crystalline oxide layer is level with the upper surface of the BOX layer in the adjacent portions of the SOI substrate.

In this way, a method is provided which enables crystalline oxide and SiGeSn to be implemented on a SOI platform with process flow that is compatible with existing EAM fabrication process. This is particularly relevant to 3 um or 1 um SOI platforms.

In some examples, the crystalline oxide layer is a crystalline rare earth oxide (CREO). The crystalline oxide layer may be, in some examples, a perovskite oxide such as Strontium titanate (STO), Barium titanate (BTO), or Lanthanum aluminate (LAO).

Optionally, the step of fabricating the waveguide structure comprises:

etching the first material layer to form a rib waveguide including a ridge on a slab, the slab comprising a first slab portion on a first side of the ridge, and a second slab portion on a second side of the ridge.

The SiGeSn rib waveguide will typically have an inverted T-shaped cross section, the cross section taken in a direction perpendicular to, or substantially perpendicular to the longitudinal axis of the rib waveguide.

Optionally, the P doped region is located at the first slab portion and the N doped region is located at the second slab portion.

Optionally, the P doped region extends into a first sidewall of the ridge and/or wherein the N doped region extends into a second sidewall of the ridge.

Optionally, the P doped region and the N doped region are located in layers, one above the other, with the intrinsic layer located between the P doped and N doped regions. For example, the waveguide structure may be a rib waveguide which comprises: a waveguide ridge on a slab, the waveguide ridge being formed from a plurality of layers stacked in a vertical direction (i.e. one away from the silicon substrate), wherein a first layer of the plurality of layers is the N doped region and a second layer of the plurality of layers is the P doped region. In such an example, a first metal contact may connect to the P doped region, and a second metal contact may connect to the N doped region, the second metal contact may extend up a sidewall of the waveguide structure and across an uppermost surface thereof so as to connect to an upper surface of the N doped region. Whilst, in this example, the N doped region is above the P doped region, the reverse is of course possible. Such an arrangement, where one doped layer of the PIN junction is above the other, may be referred to as a vertical PIN junction. In contrast, an arrangement where both doped regions extend up respective sidewalls of the waveguide, may be referred to as a horizontal PIN junction.

Optionally, the silicon support layer is Si(111); and replacement silicon is Si(111), and the crystalline oxide may be (111) orientated.

According to a third aspect, some embodiments of the invention provide an optoelectronic device, the optoelectronic device comprising:
 a silicon-on-insulator (SOI) substrate, the substrate comprising: a silicon support layer; a buried oxide (BOX) layer on top of the silicon support layer; and a silicon device layer on top of the BOX layer;
 a waveguide region, where a portion of the silicon device layer and a portion of the BOX layer underneath the portion of the device layer have been removed, the portion of the BOX layer having been replaced with a layer of silicon and a layer of crystalline oxide on top of the silicon; and
a waveguide structure located directly on top of the crystalline oxide layer, the waveguide structure including a P doped region, and an N doped region with an intrinsic region in-between, creating a PIN junction across which a bias can be applied to create a modulation region.

Optionally, the optoelectronic device is an EAM or a laser, or a photodetector.

Optionally, the waveguide device is an AlInGaAs MQW waveguide structure

Optionally, the AlInGaAs MQW is an InP based AlInGaAs MQW.

According to a fourth aspect, some embodiments of the invention provide a method of fabricating an optoelectronic device, the method comprising:

providing a silicon-on-insulator substrate, the substrate comprising: a silicon support layer; a buried oxide (BOX) layer on top of the silicon support layer; and a silicon device layer on top of the BOX layer;
 etching through a portion of the silicon device layer and the BOX layer to create a cavity in the substrate which exposes a portion of the silicon support layer;
 epitaxially growing a replacement layer of silicon on top of the exposed portion of the silicon support layer;
 epitaxially growing a layer of crystalline oxide on top of the replacement layer of silicon, the replacement layer of silicon and the crystalline oxide layer replacing the portion of the BOX layer that had been etched away;
 epitaxially growing a layer of a first material on top of the crystalline oxide layer; and
 fabricating a waveguide structure within the layer of the first material, the waveguide structure including a P doped region, and an N doped region with an intrinsic region in-between, creating a PIN junction across which a bias can be applied to function as a modulation region.

It should be appreciated that the optional features discussed in relation to the first and second aspect could also be applied to the aspects of the third and fourth aspects.

In a fifth aspect, some embodiments of the invention provide an electro-absorption modulator, EAM, the EAM comprising:
 a silicon-on-insulator, SOI, substrate comprising:
  a silicon support layer;
  a buried oxide, BOX, layer on top of the silicon support layer; and
  a silicon device layer on top of the BOX layer;
 a waveguide region, where a portion of the silicon device layer, a portion of the BOX layer underneath the portion of the device layer, and a portion of the silicon support layer underneath the portion of the BOX layer have been removed, at least a part of the portion of the silicon support layer having been replaced with a layer of crystalline oxide, on top of the remaining silicon support layer; and
 a waveguide structure located directly on top of the crystalline oxide layer, the waveguide structure including a P doped region, and an N doped region with an intrinsic region in-between, creating a PIN junction across which a bias can be applied to create a modulation region.

The portion of the silicon support layer and at least a portion of the BOX layer may have been replaced with a layer of crystalline oxide.

A passive waveguide, provided in the silicon device layer and adjacent to the waveguide region, may be coupled to the waveguide by a bridge-waveguide. The bridge-waveguide may comprise a lined channel filled with a filling material with a refractive index similar to that of a material forming a sidewall adjacent to the bridge-waveguide. The liner may be formed of silicon nitride. A lowermost surface of the sidewalls of the channel and a top surface of a portion of the liner located in the base of the channel may be aligned with a top surface of the buried oxide layer. The liner may have a thickness of at least 200 nm and no more than 280 nm. The filling material may be amorphous silicon.

The waveguide structure may be formed of plural layers, at least one of which may be formed from indium phosphide.

In a sixth aspect, some embodiments of the invention provide a method of fabricating an electro-absorption modulator, EAM, the method comprising:

providing a silicon-on-insulator substrate, the substrate comprising:
  a silicon support layer;
  a buried oxide, BOX, layer on top of the silicon support layer, and a silicon device layer on top of the BOX layer;
etching through a portion of the silicon device layer, the BOX layer, and the silicon support layer, to create a cavity in the substrate which exposes a portion of the silicon support layer;
epitaxially growing a layer of crystalline oxide, on top of the exposed portion of the silicon support layer, the crystalline oxide layer replacing a portion of the silicon support layer that had been etched away;
epitaxially growing a layer of a first material on top of the crystalline layer; and
fabricating a waveguide structure within the layer of the first material, the waveguide structure including a P doped region, and an N doped region with an intrinsic region in-between, creating a PIN junction across which a bias can be applied to function as a modulation region.

The step of fabricating the waveguide structure may include the sub-steps of:
  etching one or more channels adjacent to the first material, thereby removing any edge defects thereof;
  lining the one or more channels with a liner to provide a lined channel; and
  filling the lined channel with a filling material which has a refractive index which is similar to that of a material forming the sidewall so that the filling material forms a bridge-waveguide in the channel between a passive waveguide in the silicon device layer and the waveguide structure.

The liner may be formed from silicon nitride. The liner may have a thickness of at least 200 nm and no more than 280 nm. The filling material that the lined channel is filled with may comprise amorphous silicon.

Further optional features of some embodiments of the invention are set out below.

BRIEF DESCRIPTION OF THE DRAWINGS

Embodiments of the invention will now be described by way of example with reference to the accompanying drawings in which:

FIGS. 1A-1C show schematic views of an EAM including a top view in FIG. 1A; a first section view in 1B taken along the direction of light propagation (shown as line A-A' in FIG. 1A); and a second cross section view taken along a direction perpendicular to, or substantially perpendicular to the direction of propagation (shown as line B-B' in FIG. 1A);

FIGS. 2A-2M show example steps in an embodiment of a method of fabricating an EAM according to some embodiments of the present invention;

FIGS. 3A and 3B show schematic views, along the direction of the propagation of light and in cross section, of an alternative EAM, the top view of the EAM not shown, but having a similar structure to that of FIG. 1A with the exception that SiGeSn has been replaced by SiGe;

FIGS. 4A and 4B show schematic views, along the direction of the propagation of light and in cross section, of a further alternative EAM, the EAM including a quantum well material which exhibits the quantum-confined Stark effect (QCSE).

FIGS. 5A-5N show example steps in an embodiment of a method of fabricating an EAM according to the embodiment of FIGS. 4A and 4B;

FIGS. 6A and 6B show schematic views along the direction of the propagation of light and in cross section, of a further alternative EAM including a quantum well material which exhibits the quantum-confined Stark effect (QCSE);

DETAILED DESCRIPTION

Figure 4C:
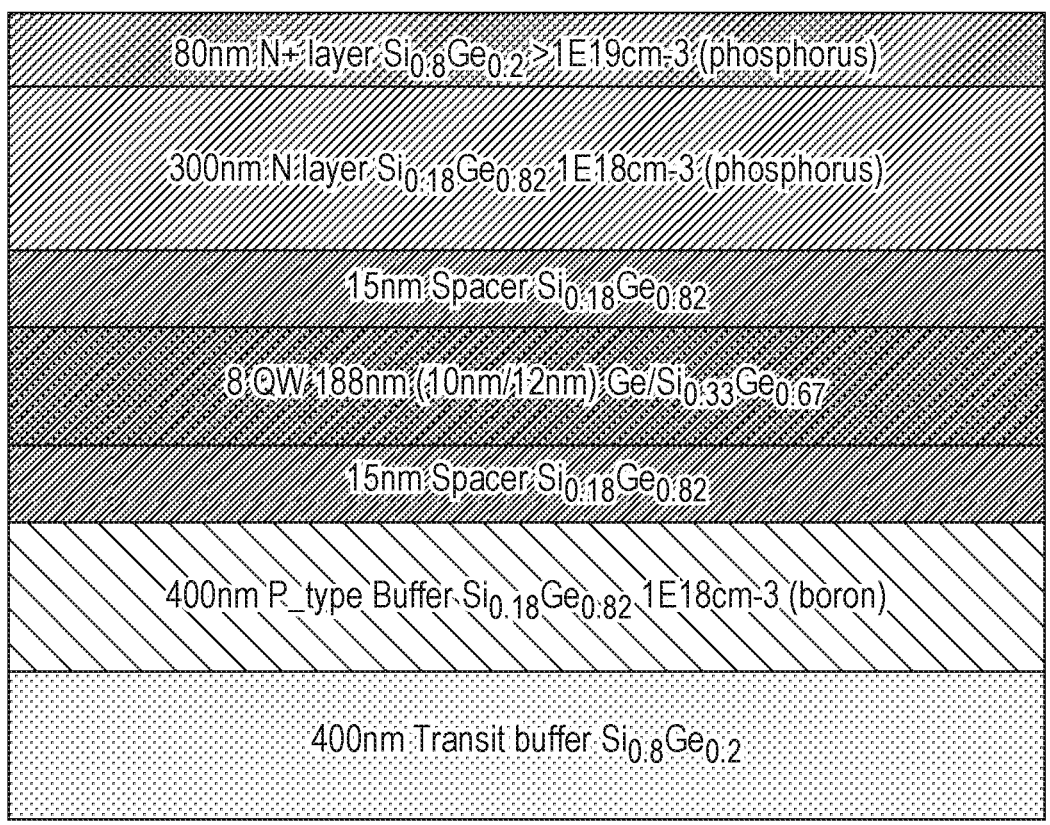
FIG. 4C shows an example of thicknesses of layers in a quantum well material.

An embodiment of an electro-absorption modulator (EAM) according to the present invention is described below with reference to FIGS. 1A-1C.

The EAM is fabricated on a silicon-on-insulator (SOI) substrate, the substrate comprising:
a silicon support layer 101; a buried oxide (BOX) layer 102 on top of the silicon support layer; and a silicon device layer 103 on top of the BOX layer. In the embodiment shown, the silicon support layer 101 is crystalline silicon with a (111) crystal orientation. The silicon device layer 103 may be a 3 µm device layer.

Within a waveguide region 121, a portion of the silicon device layer 103 and a portion of the box layer 102 underneath the portion of the silicon device layer have been removed. The resulting cavity houses a SiGeSn waveguide structure 124, which is located directly on top of a base, the base being made up of epitaxially grown silicon 122 (a "replacement silicon layer") and a thin film of crystalline rare earth oxide (CREO) 123 located directly on top of the epitaxially grown silicon. The replacement layer of silicon has an orientation that is the same as the crystal orientation of the silicon support layer, which in this case is a (111) orientation. The CREO has a lattice constant that is similar to that of Si in (111) orientation, which not only means that it can be epitaxially grown directly onto the replacement silicon layer, but also means that the SiGeSn layer can be epitaxially grown directly onto the CREO layer. The combined height of the replacement silicon layer and the CREO is the same as or similar to the total height of the BOX layer (i.e. the distance from the lower surface which contacts the silicon support layer 101, and the upper surface, which contacts the silicon device layer 103).

The waveguide structure takes the form of a rib waveguide, which means that its cross section perpendicular, or substantially perpendicular to the direction of propagation of light has an inverted T-shape. This can be best seen in FIG. 2H. The rib waveguide is grown in one epitaxial growth stage and etched into shape but can be thought of as being made up of a SiGeSn ridge portion 204 on top of a SiGeSn slab. The resulting shape therefore includes a first slab portion 202 at a first side of the ridge, and a second slab portion 203, opposite the first slab portion, at a second side of the ridge.

A P doped region 250 is located at the first slab portion 202 and extends along a first sidewall 212 of the waveguide ridge, creating an "L-shaped" dopant region. Similarly, an N doped region 251 is located at the second slab portion 203 and extends along a second sidewall 213 of the waveguide ridge, the second sidewall being opposite to and parallel to the first sidewall. An intrinsic region 214 of the SiGeSn waveguide is sandwiched between the first sidewall and the second sidewall which creates a PIN junction across which a bias can be applied, the bias acting to control the optical properties of the SiGeSn and therefore to modulate the optical signal passing through the modulator.

At the first slab portion 202, the P doped region includes a sub-region with a P dopant concentration greater than that of the rest of the P doped region. A first metal contact 222, in the form of a strip electrode is located on top of this highly doped sub-region for application of the bias. Similarly, a sub-region with an N dopant concentration greater than that of the rest of the N doped region is located at the second slab portion 203. A second metal contact 223, in the form of a strip electrode is located on top of this highly doped sub-region. The strip electrodes may be made of any suitable metal, such as aluminium.

Examples of suitable dopants include boron for the P and P+ dopant and phosphorus for the N and N+ dopant. Examples of suitable dopant concentrations include: a P dopant concentration of 1-5E18 $cm^{-3}$, a P+ dopant concentration of >1E19 $cm^{-3}$; and N dopant concentration of 1-5E18 $cm^{-3}$, and an N+ dopant concentration of >1E19 $cm^{-3}$.

The EAM may be easily integrated onto a standard SOI chip, for example with a 3 μm silicon device layer. This embodiment is specifically relevant to a 3 μm silicon on insulator chip with a Si (111) handle wafer. When integrated onto a SOI chip, the waveguide structure 121 couples with an input waveguide and an output waveguide within the silicon device layer of the SOI chip.

An example method for fabricating the EAM described above will now be described with reference to FIGS. 2A-2M.

In an initial step, as shown in FIG. 2A, a silicon-on-insulator substrate, the substrate comprising: a silicon support layer 101; a buried oxide (BOX) layer 102 on top of the silicon support layer; and a silicon device layer 103 on top of the BOX layer.

A hard mask 141 is applied to the SOI, the mask exposing just a portion of the silicon device layer. A suitable etchant, known in the art, is then applied to etch the uncovered portion of the silicon device layer and also a portion of the BOX layer laying directly underneath the BOX layer thereby leaving a cavity, at the base of which a portion of the silicon support layer is left exposed (FIG. 2B).

A replacement layer of silicon 142 is then epitaxially grown (FIG. 2C) from the exposed portion of the silicon support layer at the base of the cavity, such that there is no, or very little lattice mismatch between the original upper surface of the portion of the silicon substrate layer and the replacement silicon layer.

In a subsequent step (FIG. 2D), further lithography is carried out to apply an additional mask 143 that extends over a first and second sidewall 144, 145 of the cavity.

Once the additional mask has been applied, a layer of CREO 123 is grown epitaxially onto the replacement silicon layer (FIG. 2E), the CREO layer having a lattice constant which is similar to the replacement silicon layer. In the embodiment shown, the CREO is grown directly onto the epitaxially grown Si(111) replacement layer.

The cavity is then filled by epitaxially growing SiGeSn 146 directly onto the CREO layer (FIG. 2F). Subsequent polishing is used to create a flat level upper surface of the SiGeSn material with the upper surface of the silicon device layer 103 of the adjacent regions of the SOI chip (FIG. 2G).

In a subsequent step, a further hard mask is applied and the SiGeSn material is etched accordingly to create two channels, separated by a ridge-like structure. The etch does not extend to the full depth of the SiGeSn material, thereby leaving behind a rib waveguide structure with a ridge portion 204, a first slab portion 202 on a first side of the ridge structure 204, and a second slab portion 203 on a second side of the ridge structure (FIG. 2H).

Once the SiGeSn waveguide structure 204 has been fabricated, dopants are applied (FIG. 2I, FIG. 2J) to create the P and N doped regions of the device. The P doped region 250 is created first (FIG. 2I); the initial step of which is the application of a photoresist to all areas other than the first slab portion. The gap left by the patterning of the photoresist purposefully extends over the ridge of the waveguide rather than terminating at the sidewall so that a region at the top of the ridge is left uncovered by the resist for ease of alignment. In this way, in one step, the dopant can be applied to cover a P doped region 250 which extends across the first portion of the slab and also across the first sidewall of the ridge. Typically, this involves applying the dopant at an angle such as 45 degrees to the sidewall of the waveguide ridge.

The process is then repeated (FIG. 2J) at the other side of the waveguide ridge to create the N doped region 251. The previous photoresist is removed, and a subsequent photoresist applied to cover all areas other than the second slab portion. In this case, the gap left by the patterning of the photoresist purposefully extends over the ridge of the second side of the waveguide ridge rather than terminating at the second sidewall of the waveguide, so that a region at the top of the ridge is left uncovered by the resist for ease of alignment. In this way, in one step, the dopant can be applied to cover a P doped region 250 which extends across the first portion of the slab and also across the first sidewall of the ridge. Typically, this involves applying the dopant at an angle such as 45 degrees to the sidewall of the waveguide ridge. At this stage in the method, the waveguide structure exhibits an L-shaped N doped region which extends along the entire length of the first slab portion and up the first sidewall of the ridge as well as an L-shaped P doped region which extends along the entire length of the second slab portion and up the second sidewall of the ridge. An intrinsic region is left between the P and N doped sidewalls, thereby creating a PIN junction.

Subsequent dopant steps are carried out to create more concentrated P+ and N+ doped sub-regions in each of the first slab and the second slab respectively (FIGS. 2K and 2L). Each of the sub-regions are narrower than the lateral dimensions of each of the first slab portion and the second slab portion. Each is created by photoresist patterning and subsequent implantation with the appropriate dopant. This time, dopants are typically applied in a vertical direction, i.e. a direction parallel to the sidewalls of the waveguide ridge. After implantation, annealing is carried out at 630° C. for 10 seconds.

Examples of suitable dopants include boron (P dopant) and phosphorus or arsenic (N dopant).

In a final step of the fabrication process (FIG. 2M), after a via opening step, metal strip electrodes are deposited onto each of the more concentrated doped sub-regions thereby providing electrical contacts for the application of a bias across the PIN junction.

An alternative embodiment of an EAM according to the present invention is described below in relation to FIGS. 3A and 3B where like reference numerals correspond to features described above in relation to earlier embodiments. This embodiment of FIGS. 3A and 3B differs from that of FIGS.

1A-1C in that the rib waveguide is grown from SiGe rather than SiGeSn. In more detail, the rib waveguide comprises a ridge portion 304 on top of a SiGe slab. The resulting shape therefore includes a first slab portion at a first side of the ridge, and a second slab portion, opposite the first slab portion, at a second side of the ridge.

A P doped region is located at the first slab portion and extends along a first sidewall 312 of the waveguide ridge, creating an "L-shaped" dopant region. Similarly, an N doped region is located at the second slab portion and extends along a second sidewall 313 of the waveguide ridge, the second sidewall being opposite to and parallel to the first sidewall. An intrinsic region 314 of the SiGe waveguide is sandwiched between the first sidewall and the second sidewall which creates a PIN junction across which a bias can be applied, the bias acting to control the optical properties of the SiGe and therefore to modulate the optical signal passing through the modulator.

Fabrication of this EAM can be carried out by the steps described in relation to FIGS. 2A-2M, with the exception that the SiGeSn growth steps and fabrication steps are replaced by SiGe growth steps and fabrication steps.

Fabrication of EAM with other bulk materials such as InGaAs and InGaAsP can also be carried out by the steps described in relation to FIGS. 2A-2M, Further embodiments of the present invention involve a quantum well material which exhibits the quantum-confined Stark effect (QCSE). The first of these embodiments is described below with respect to FIGS. 4A and 4B which show schematic views, along the direction of the propagation of light and in cross section respectively, and FIGS. 5A-5N which shows example steps in an embodiment of a method of fabricating the EAM.

In this embodiment, the portion of the BOX layer that has been removed is replaced, not only with a layer of silicon and a layer of crystalline rare earth oxide (CREO) on top of the silicon, but also by a SiGe transit buffer which acts as an interface between the CREO and the waveguide structure. Together the regrown silicon layer, the CREO layer, and the SiGe transit layer have a thickness equal to or substantially equal to that of the BOX layer in the adjacent regions.

The waveguide structure 421 is also different from previous embodiments. It takes the form of a ridge made from a SiGe MQW material, with doped regions above and below the MQW structure. In this way, the PIN junction is vertical rather than horizontal. However, the doped regions are shaped such that the electrodes that contact them are still placed on either side of the ridge. As with previous embodiments, a bias applied across these electrodes (and therefore across the PIN junction) creates a modulation region within the waveguide.

In more detail, in the embodiment shown in FIGS. 4A and 4B, a P doped region is located underneath the SiGe MQW structure, between the SiGe transit buffer layer and the SiGe MQW structure. This P doped region 411 extends out to a first side of the waveguide creating a slab region on top of which a first electrode 422 can be placed to contact the P doped region. The majority of the area underneath the top electrode on the second side of the slab is etched away to minimize the parasitic capacitance for high speed. Not all of the P-SiGe buffer is etched away, so that the P-SiGe buffer extends onto the second side but by a significantly lesser amount as compared to the first side. An N doped region 413 is located at the top of the SiGe MQW material of the ridge, leaving an undoped region 403 of SiGe MQW in-between the P doped and N doped region. A second electrode 423 contacts the top of the waveguide at the N doped region and extends along the side ridge of the waveguide to form a contact point at the opposite side of the waveguide ridge from the first electrode 422.

As shown in FIG. 4A, the waveguide structure may include entry and exit interface structures between the MQW material and the input and output waveguide, each of which are formed from silicon. The purpose of these structures is to minimise losses at the interface regions and maximise the strength of the signal coupled into and out of the MQW waveguide. In the embodiment shown, the interface structures comprise amorphous silicon 440, with an additional layer of $Si_3N_4$ 441 located in-between the amorphous silicon and the silicon and also in-between the amorphous silicon and the MQW waveguide.

In order to fabricate the structure of FIGS. 4A and 4B, a SOI waveguide is first provided and a "no BOX" region created as described above in relation to FIGS. 2A-2E. As shown in FIG. 5A, the SiGe MQW waveguide material is then epitaxially grown inside of the cavity. This step of epitaxially growing the MQW structure involves growing layers of: a SiGe transit layer located on top of the CREO layer; a P doped SiGe buffer layer located on top of the SiGe transit buffer; a SiGe MQW structure located on top of the P doped layer; and an N doped SiGe layer located on top of the MQW layer. An example of a detailed MQW structure is shown in FIG. 4C.

The quantum well material may have a layer thickness of less than 200 nm. Spacer layers are typically located above and below the QW material, in-between the doped regions and the QW layer.

After epitaxial growth, a hard mask of $Si_3N_4$ is deposited on top of the N doped layer and chemical mechanical polishing (CMP) is carried out to create a planar surface (FIG. 5C). Next, a dry etch is performed so that the Si outside of the cavity has the same height as that of the MQW stack in the cavity. This is achieved by a Once the SOI surface has been levelled, a layer of $SiO_2$ is deposited and a photoresist deposited (FIG. 5D), the photoresist exposing a region for etching to create trenches (3-5 um) down through the layers of the MQW material to give rise to regions at the entrance and exit of the MQW waveguide to create interfaces with the silicon input and output waveguides (FIG. 5E).

Once the trenches have been etched, a layer of 240 nm $Si_3N_4$ with a refractive index of 2.6 is deposited to coat the base and sidewalls of the trenches (FIG. 5F) before amorphous silicon is deposited (FIG. 5G) to file the trenches, with any excess amorphous silicon being removed from the SOI surrounding the cavity by way of dry etching and CMP (FIG. 5H). The upper surface of the Si3N4 on the base is levelled with the upper surface of the BOX. FIGS. 5D-5I all depict the section view along the direction of light propagation.

Further steps of depositing $SiO_2$ (FIG. 5I), depositing a photoresist (FIG. 5J) and etching (FIG. 5K) are then carried out to create the waveguide sidewalls. The etch is initially carried out to etch the N doped layer and the MQW layer, but not the P doped layer. A separate etch is then carried out (FIG. 5L) to etch away the area of P doped layer on only one side of the waveguide ridge that is under the top electrode, leaving the underlying SiGe transit layer exposed on that side to minimize the parasitic capacitance.

A silicon oxide layer will be formed over the device and vias created (FIG. 5M) above the P doped and N doped regions to allow metal contacts to be deposited directly on top of the P doped layer and the N doped layers (FIG. 5N). These metal contacts function as electrodes across which the bias is applied to operate the resulting PIN junction.

A further embodiment of an optical device according to the present invention is described with reference to FIGS. 6A and 6B, which show schematic views along the direction of the propagation of light and in cross section respectively of an optoelectronic device including a quantum well material which exhibits the quantum-confined Stark effect (QCSE). The optoelectronic device of this embodiment could take the form part of a laser or may form an EAM.

In this embodiment, the epitaxially grown stack (EPI stack) is based on an AlInGaAs multiple quantum well material 603.

As with the embodiment of FIGS. 4A-C and 5A-N, this embodiment of FIGS. 6A and 6B exhibits a vertical PIN junction. However, in contrast to the embodiments of FIGS. 4 and 5, the N doped region of the embodiment of FIG. 6 is located at the base of the stack, closest to the CREO layer, whilst the P doped region is located at the top of the stack.

Starting from the base of the stack and working upwards towards the top of the stack, the stack includes: an N doped InP buffer layer 612; an InGaAsP layer 610; the AlInGaAs multiple quantum well material 603; a P doped InP layer 613; a P doped InGaAsP layer 614; and a P doped InGaAs layer 615.

The N doped InP layer is located directly on top of on InP transit layer, which in turn is located directly on top of the CREO layer. A first metal electrode 622 contacts the N doped InP buffer layer 612, and a second metal electrode contacts the P doped InGaAs layer at the top of the stack. The second electrode is shaped such that it extends from the top of the stack, also the sidewall of the waveguide and laterally away from the sidewall of the waveguide, so that it is located on the opposite side of the waveguide from the first electrode. In this way, although the PIN junction across the stack is vertical, the electrodes are positioned in a lateral arrangement and both can be accessed from the same side of the SOI.

The fabrication process procedures for the device of FIGS. 6A and 6B are the same as those described above in relation to FIGS. 5A-5N, with the exception that the EPI stack has a more complicated structure.

The fabrication process procedures for the device with InGaNAs MQW are also the same as those described above in relation to FIGS. 5A-5N, with the exception that the EPI stack has a more complicated structure.

Figure 7:
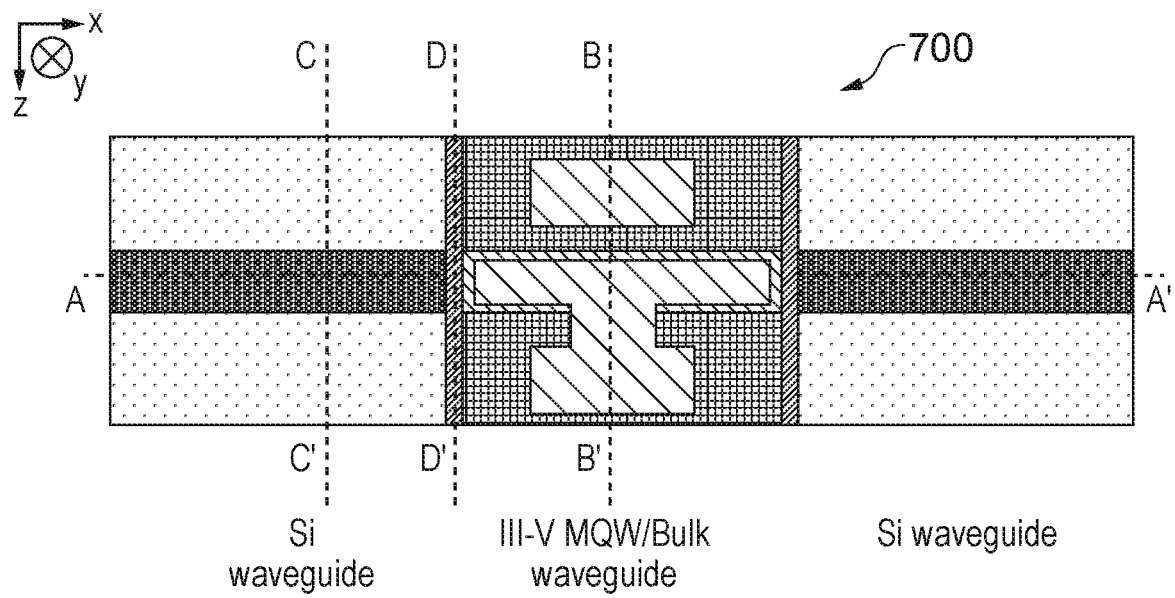
FIG. 7 shows a schematic view of an EAM.

FIG. 7 shows a top-down schematic view of an EAM 700 according to some embodiments of the present invention. Broadly, light enters the device from either the left or right hand side, and proceeds along a silicon waveguide located within a 1 μm silicon device layer before entering the EAM which is located centrally. The EAM includes an optically active stack, which includes a III-V multiple quantum well (MQW), bulk InGaAsP layer, or bulk AlInGaAs layer. FIGS. 8A-8D show various cross-sections of the device shown in FIG. 7.

Figure 8A:
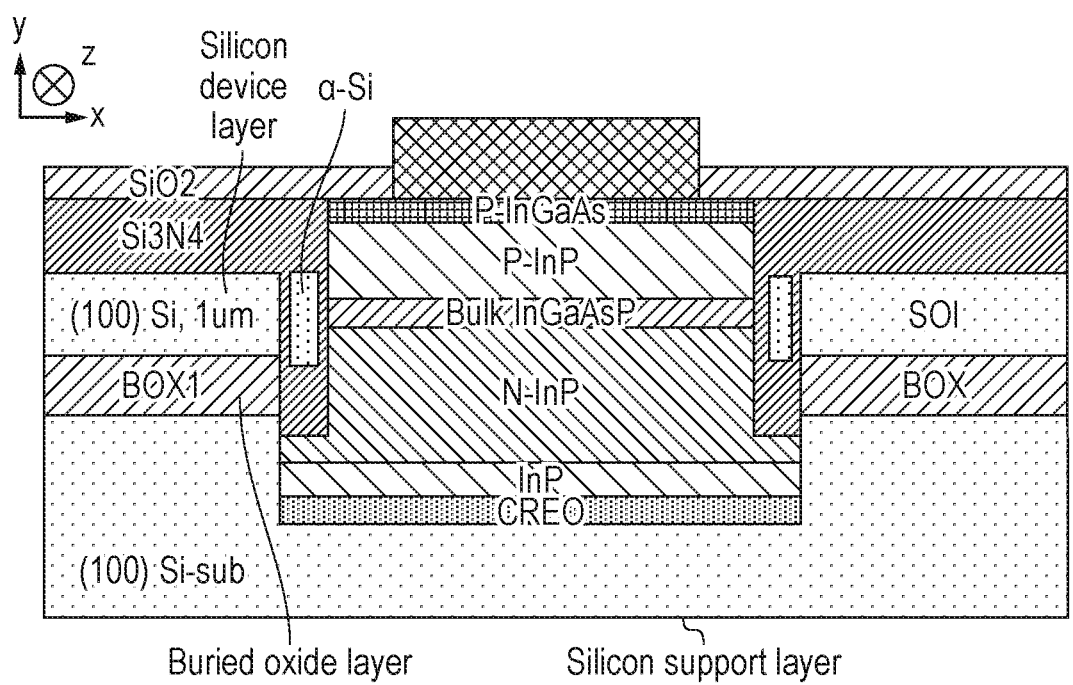
FIG. 8A-8D show various cross-sectional views of the EAM of FIG. 7.

FIG. 8A shows a cross-section taken along the line A-A' in FIG. 7. Here, the silicon waveguides in the silicon device layer either side of the III-V MQW or InGaAsP layer are shown. The III-V layer may be an AlInGaAs layer including multiple quantum wells.

Located between each silicon waveguide and the EAM is a bridge-waveguide, in this example provided by a portion of amorphous silicon (a-Si) sandwiched between liners formed of silicon nitride. The silicon nitride liners function as antireflective coatings.

A p-doped and n-doped region of the optically active stack are connected to respective electrodes, to allow an electric field to be applied across an optically active layer of the optically active stack. The device is capped with a silicon dioxide layer, and had a silicon nitride layer located between this capping layer and the respective silicon waveguides.

Figure 8B:
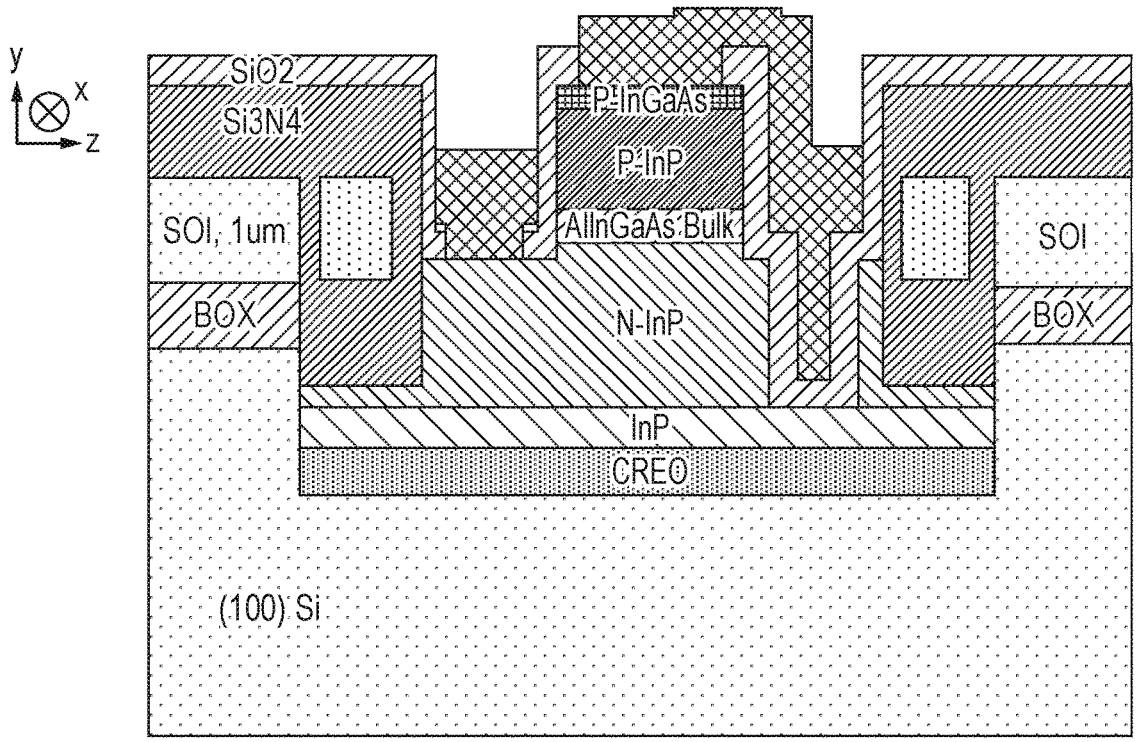

As shown most clearly in FIG. 8B, a first electrode contacts an n-doped region located below the optically active layer, whereas a second electrode contacts a p-doped region located above the optically active layer. Of course these doping polarities may be reversed. The crystalline oxide layer, in this example a crystalline rare earth oxide but which may equally be another crystalline oxide as discussed above, is located between the silicon substrate and the optically active layer. The crystalline oxide layer reduces the degree to which the crystal lattices mismatch within the EAM device.

The optically active stack may comprise the following layers, the layer numbering decreasing from an uppermost layer (16) to a lowermost layer (1) of the optically active stack:

TABLE 1

| Layer | R | n/u/p | Material | Thickness (nm) | Doping ($1 \times 10^{18}$) | Dopant |
|---|---|---|---|---|---|---|
| 16 | 1 | P | InGaAs | 400 | 1 | Zn |
| 15 | 1 | P | InGaAsP | 50 | 1.5 | Zn |
| 14 | 1 | P | InP | 1340 | 1 | Zn |
| 13 | 1 | P | InGaAsP | 20 | 1 | Zn |
| 12 | 1 | P | AlInGaAs | 60 | 1 | C |
| 11 | 1 | uid | AlInGaAs | 70 | — | — |
| 10 | 12x | uid | AlInGaAs | 7 | — | — |
| 9 | 12x | Active | AlInGaAs | 9 | — | — |
| 8 | 1 | uid | AlInGaAs | 7 | — | — |
| 7 | 1 | uid | InGaAsP | 77 | — | — |
| 6 | 1 | n | InP | 80 | 0.2 | I |
| 5 | 1 | n | InP | 70 | 0.5 | I |
| 4 | 1 | n | InP | 920 | 0.8 | Si |
| 3 | 1 | uid | InP | 200 | — | 0 |
| 2 | 1 | uid | CREO | 400-4000 or 20-400 | — | 0 |
| 1 | | | Substrate; (111) Si | | | |

Alternatively, the optically active stack may comprise the following layers, the layer numbering decreasing from an uppermost layer (10) to a lowermost layer (1) of the optically active stack:

TABLE 2

| Layer | R | n/u/p | Material | Thick (nm) | Doping | Dopant |
|---|---|---|---|---|---|---|
| 10 | 1 | p | InGaAs | 400 | 1 | Zn |
| 9 | 1 | p | InGaAsP | 50 | 1.5 | Zn |
| 8 | 1 | p | InP | 1340 | 1 | Zn |
| 7 | 1 | uid | InGaAsP | 500 | — | — |
| 6 | 1 | n | InP | 80 | 0.2 | Si |
| 5 | 1 | n | InP | 70 | 0.5 | Si |
| 4 | 1 | n | InP | 920 | 0.8 | Si |
| 3 | 1 | uid | InP | 200 | — | — |
| 2 | 1 | Uid | CREO | 400-4000 or 20-400 | — | — |
| 1 | | | Substrate: (111) Si | | | |

Figure 8C:
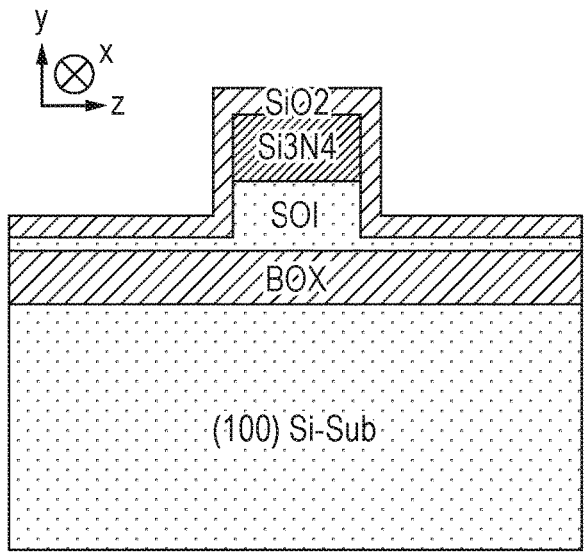

FIG. 8C is a cross-sectional view of the device in FIG. 7 along the line C-C. Here the silicon ridge waveguide can be seen more clearly projecting from an upper surface of a silicon on insulator layer. The silicon waveguide has a silicon nitride layer disposed on top, and on top of the silicon nitride layer is the silicon dioxide capping layer discussed previously.

Figure 8D:
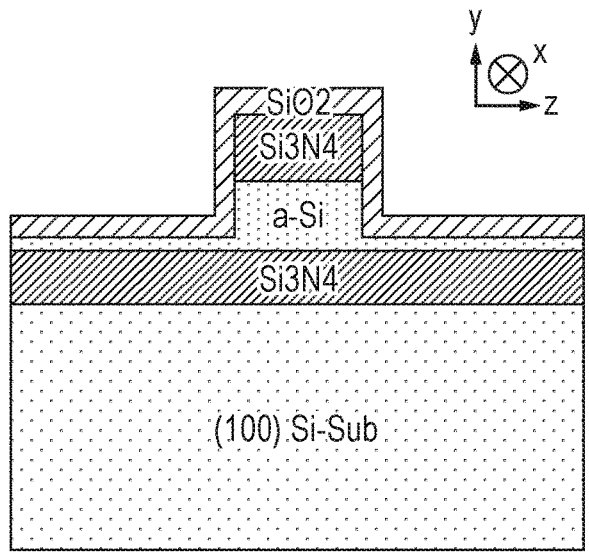

FIG. 8D shows a cross-sectional view of the device in FIG. 7 along the line D-D, i.e. partway through the bridge-waveguide. As can be seen here, the amorphous or a silicon effectively matches the geometry of the silicon waveguide adjacent to it.

Figure 9A:
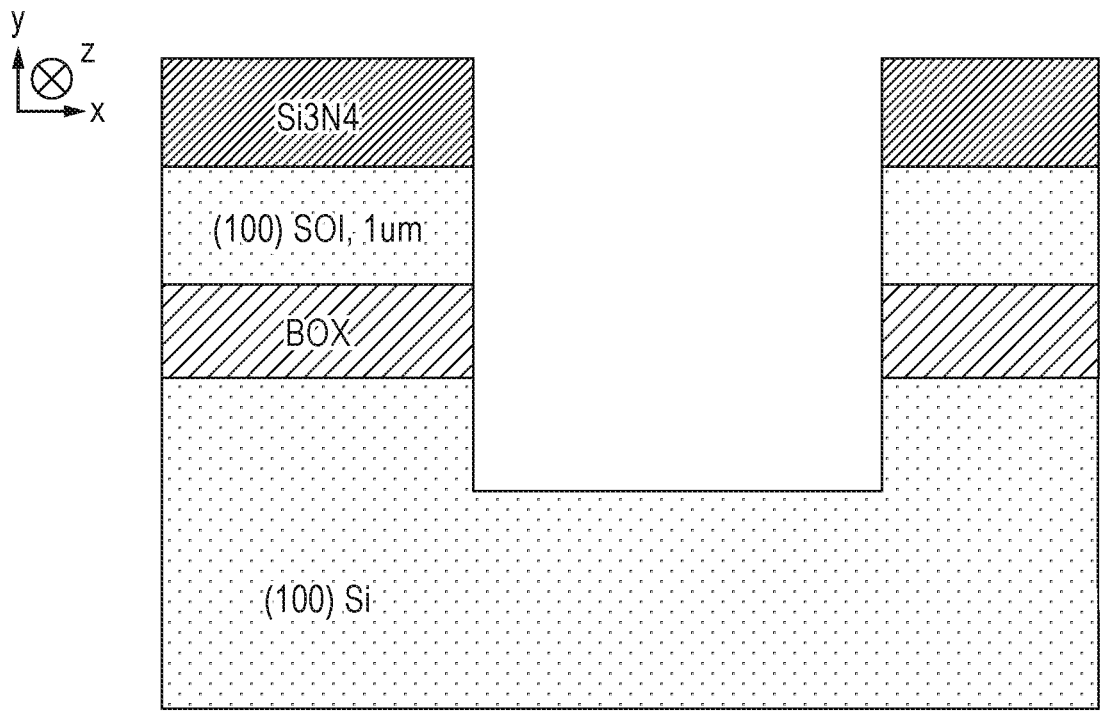
FIGS. 9a-9v(ii) show example steps in an embodiment of a method of fabricating an EAM on a 1 µm SOI platform according to the embodiments of FIGS. 7-8D.

FIGS. 9a-9v(ii) illustrate a method of fabricating an EAM as shown in FIG. 7. In a previous step, not shown, a silicon-on-insulator wafer having a 1 μm device layer is provided. This device layer may optionally be capped by a silicon nitride layer (e.g., a $Si_3N_4$ layer, which is silicon rich and has a refractive index of 2.7).

In a first step, shown in FIG. 9a, a silicon-on-insulator wafer, comprising: a silicon substrate, a buried oxide (BOX) layer directly on top of the silicon substrate, and a silicon-on-insulator or silicon device layer located directly on top of the BOX layer has been etched so as to remove a portion of the silicon device layer, a portion of the BOX layer below the portion of the silicon device layer, and a portion of the silicon substrate below the portion of the BOX layer. The result is a cavity, extending from an uppermost surface of the wafer down into a portion of the silicon substrate. An optional silicon nitride layer is shown capping the silicon device layer, which is also etched in this process.

Figure 9B:
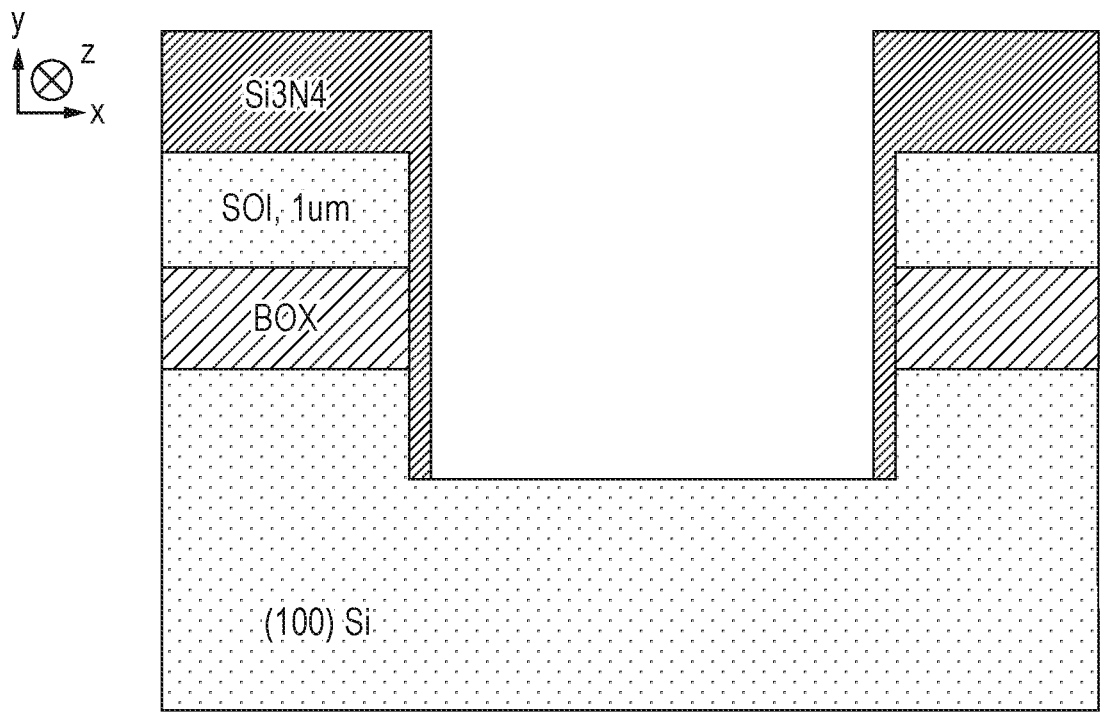
Figure 9C:
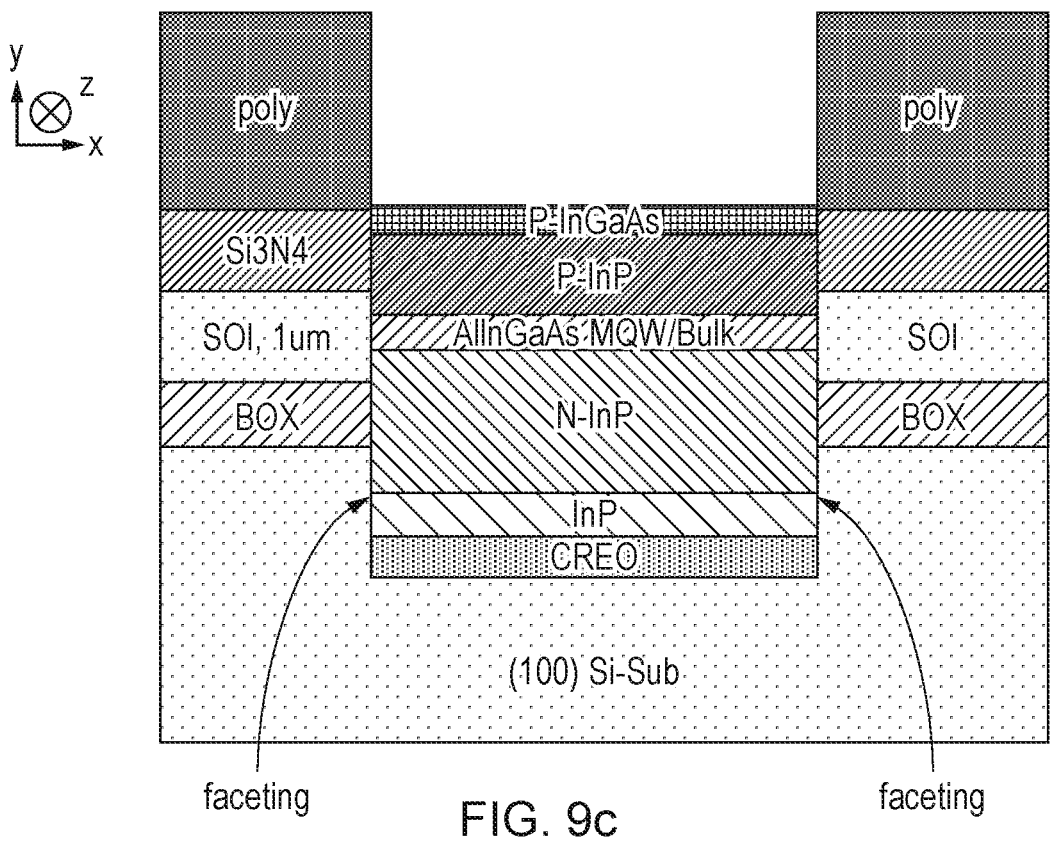
Figure 9D:
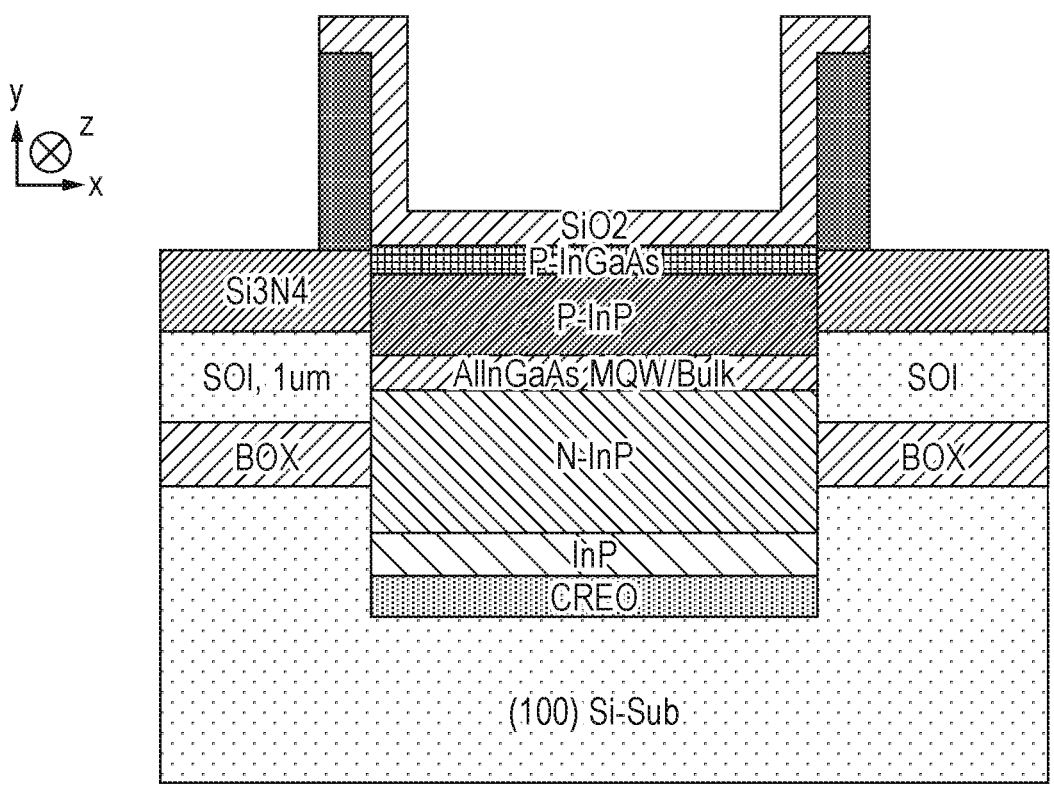

In a subsequent step, shown in FIG. 9b, sidewalls of the cavity are lined with a 20 nm lining of silicon nitride via a non-isotropic etch. After this, as shown in FIG. 9c, an optically active stack is epitaxially grown in the cavity. Due to the nature of the epitaxial growth, faceting will be present in the locations indicated at least. The optically active stack includes, as a layer immediately adjacent to the exposed silicon substrate, a layer of crystalline oxide which is, in some embodiments, crystalline rare earth oxide (CREO). If the epi growth is a blanket growth, a poly layer (e.g. poly-crystalline III-V) is deposited on top of the exposed silicon nitride layer as shown in FIG. 9c; however, if the epi growth is selective, no poly layer is deposited on top of the exposed silicon nitride layer, and so the step in FIG. 9d is skipped. The optically active stack is grown such as to have an uppermost which is aligned with an uppermost surface of the silicon nitride layer above the device layer. Accordingly, a waveguide mode of the silicon device layer waveguide (fabricated later, and discussed below) is aligned with a waveguide mode of the optically active stack waveguide (fabricated later, and discussed below). The next step, as shown in FIG. 9d, is to deposit a silicon dioxide layer on an uppermost layer of the optically active stack as a hard mask and to etch away a portion of the poly located near the cavity. This etching releases wafer stress.

Figure 9E:
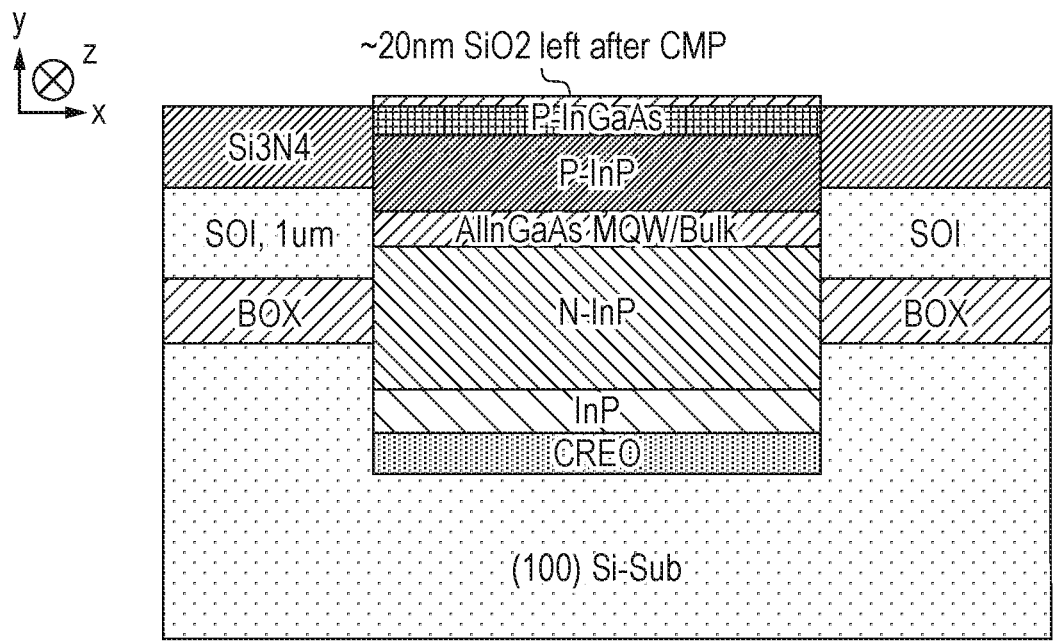
Figure 9F:
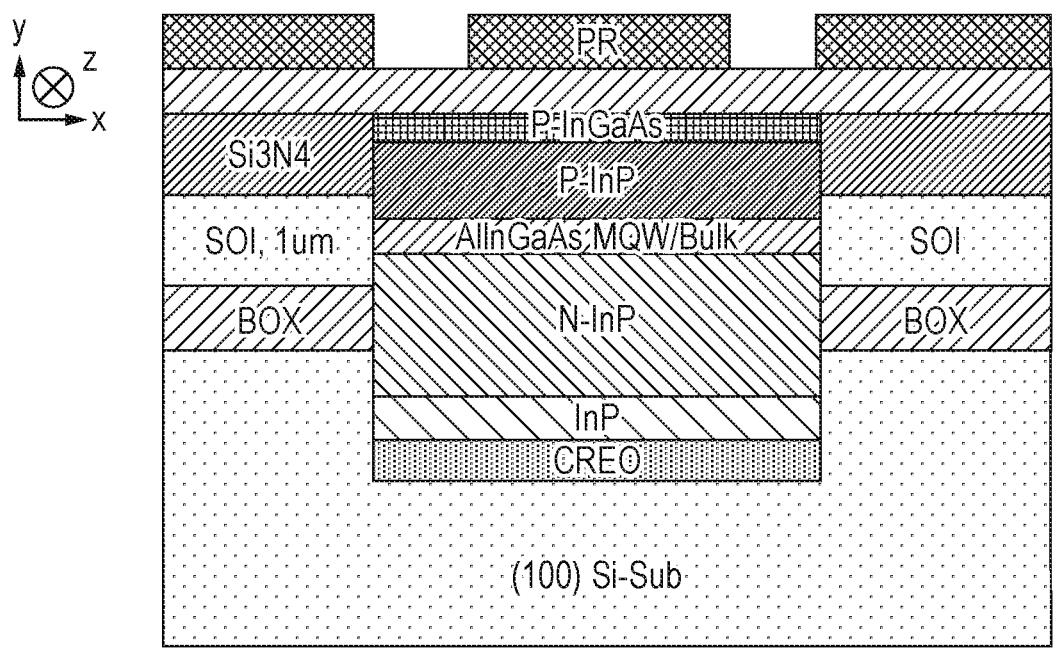

In a step shown in FIG. 9e, the structure shown in FIG. 9d undergoes a chemical-mechanical polishing process, so as to remove the remaining poly and to leave a thinner silicon dioxide layer adjacent the uppermost layer of the optically active stack. This thinner silicon dioxide layer may have a thickness of approximately 20 nm. Following this, shown in FIG. 9f, a silicon dioxide hard mask is deposited and a photoresist is patterned to facilitate the next step of etching the facet area.

Figure 9G:
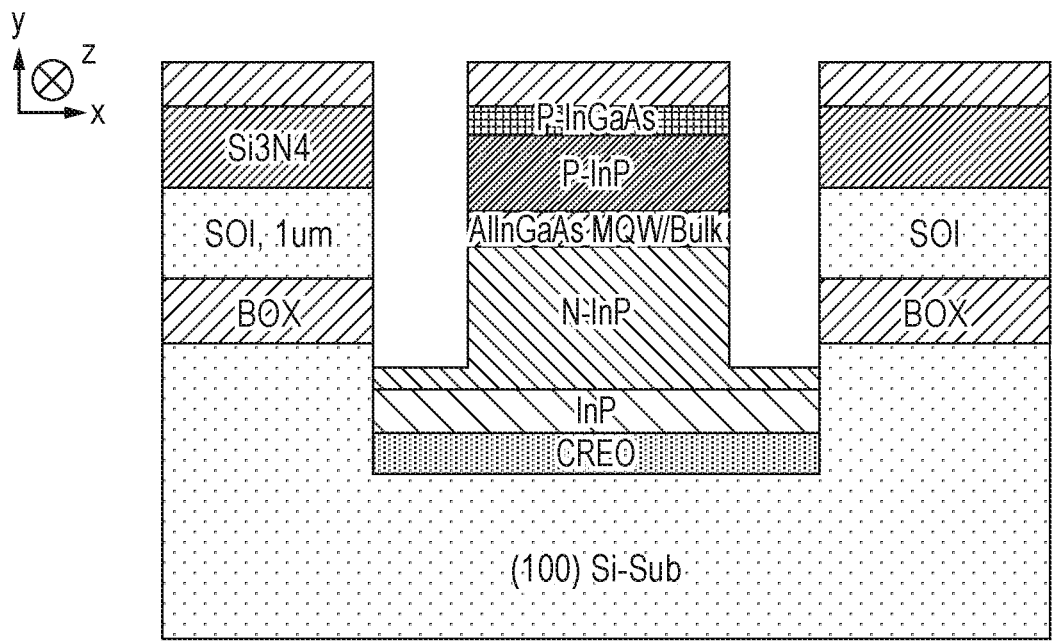
Figure 9H:
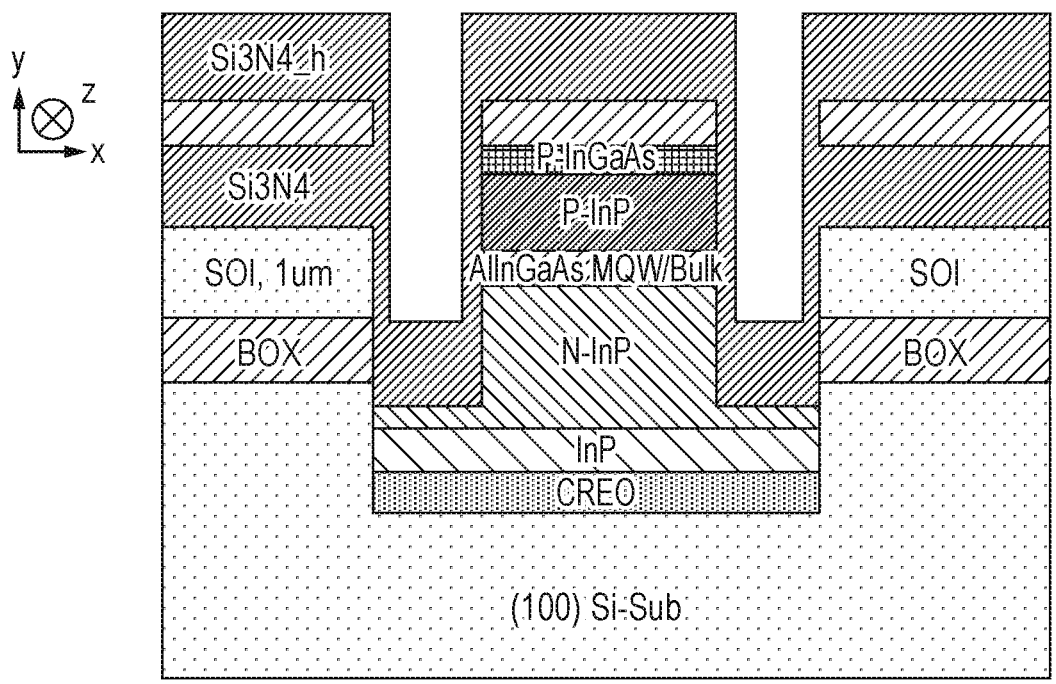

The result of the etching is shown in FIG. 9g, where trenches extend from either side of the optically active stack. The etching removes most if not all of the facet defects discussed previously. The etching stops part way through an n-doped layer of the optically active stack, as shown. Next, as illustrated in FIG. 9h, silicon rich silicon nitride (e.g. $Si_3N_4$) is deposited on the exposed surfaces of the structure. The silicon rich silicon nitride may have a refractive index of around 2.7. The sidewalls of the trenches are coated with silicon nitride to a thickness of between 230 nm and 260 nm. The beds of the trenches are coated with silicon nitride such that an uppermost portion of each silicon nitride bed is aligned with a top surface of the respective adjacent BOX layer, as shown in FIG. 9h.

Figure 9I:
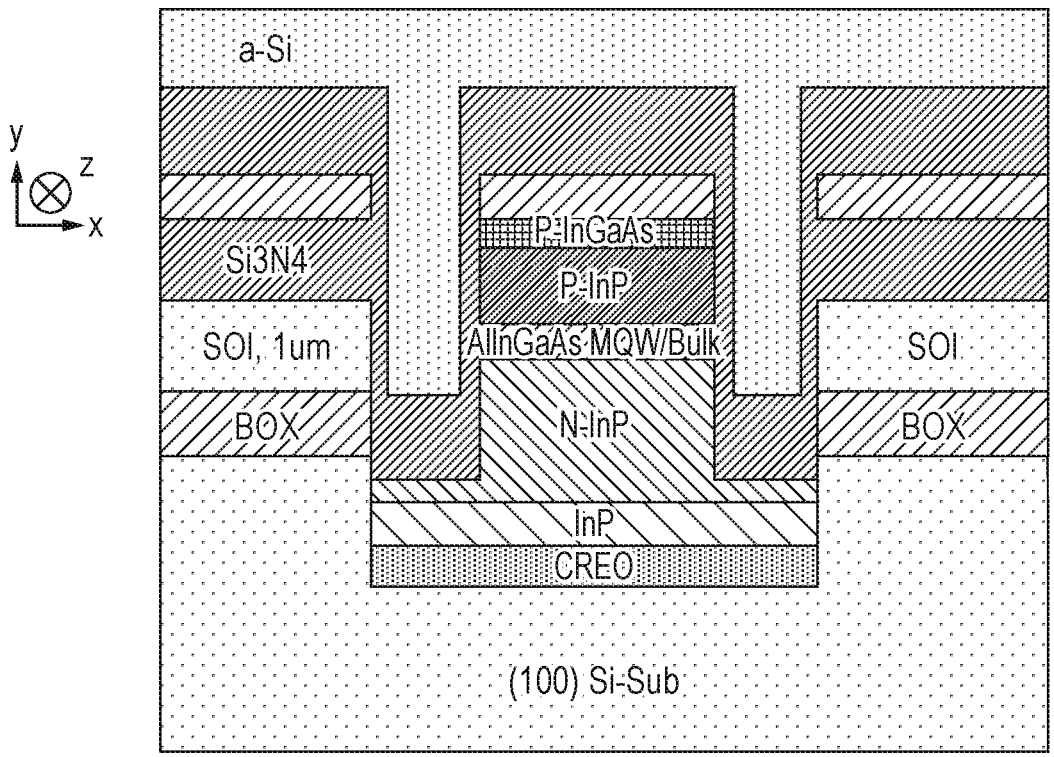
Figure 9J:
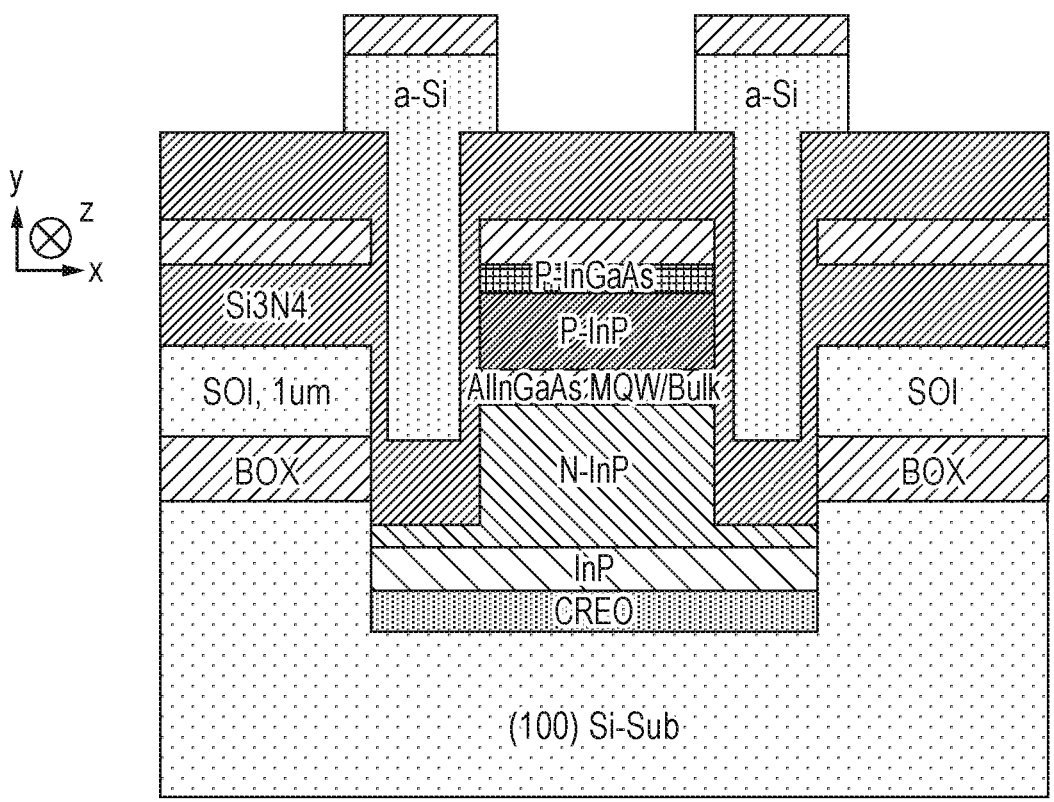

In a next step, shown in FIG. 9i, amorphous silicon is bulk deposited over the structure thereby filling the cavity and providing a layer on top of the silicon nitride layer above the device layer. This amorphous silicon layer is then etched, as shown in FIG. 9j, to leave two discrete regions of amorphous silicon located above and within the now filled trenches, which releases the wafer stress caused by the amorphous silicon layer.

Figure 9K:
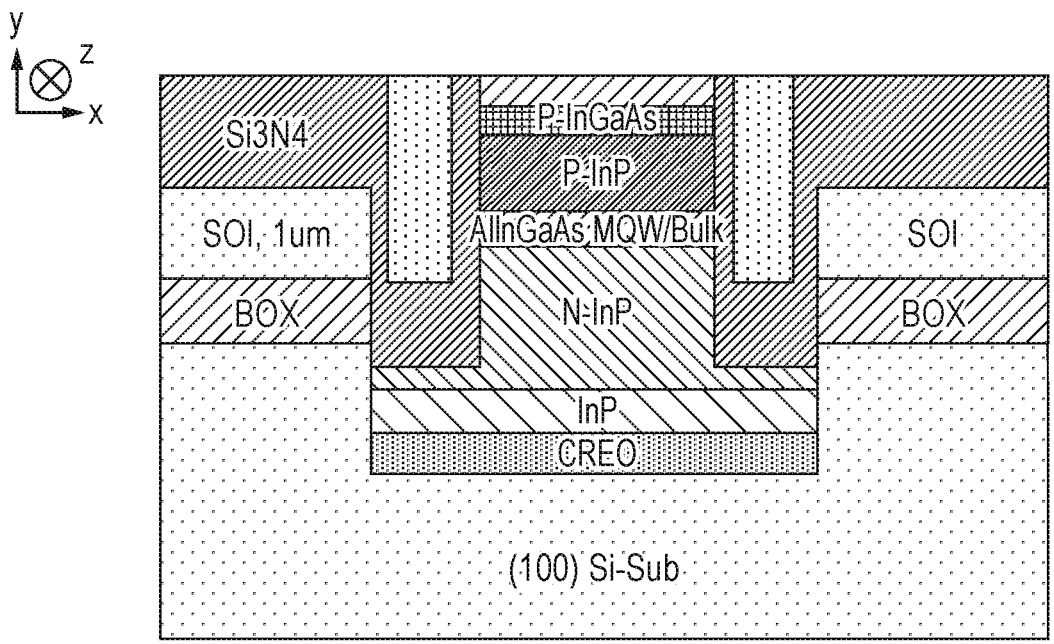

Next, as shown in FIG. 9k, the structure undergoes a chemical-mechanical polishing process, to leave an approximately 100 nm tall silicon dioxide layer on top of the uppermost layer of the optically active stack. This etch also removes the upper of the two uppermost silicon nitride layers. In a further step, shown in FIG. 9l, the amorphous silicon is etched back, so that the resulting structure has an upper surface which is level with an upper surface of the 1 μm silicon device layer. Said another way, as the silicon nitride layer in the bed of the trench has an upper surface aligned with an upper surface of the BOX layer, and the amorphous silicon is deposited on top of this silicon nitride layer, the amorphous silicon has a height which extends from the uppermost surface of the BOX layer to an uppermost surface of the silicon device layer i.e. it has the same height as the silicon device layer.

Figure 9L:
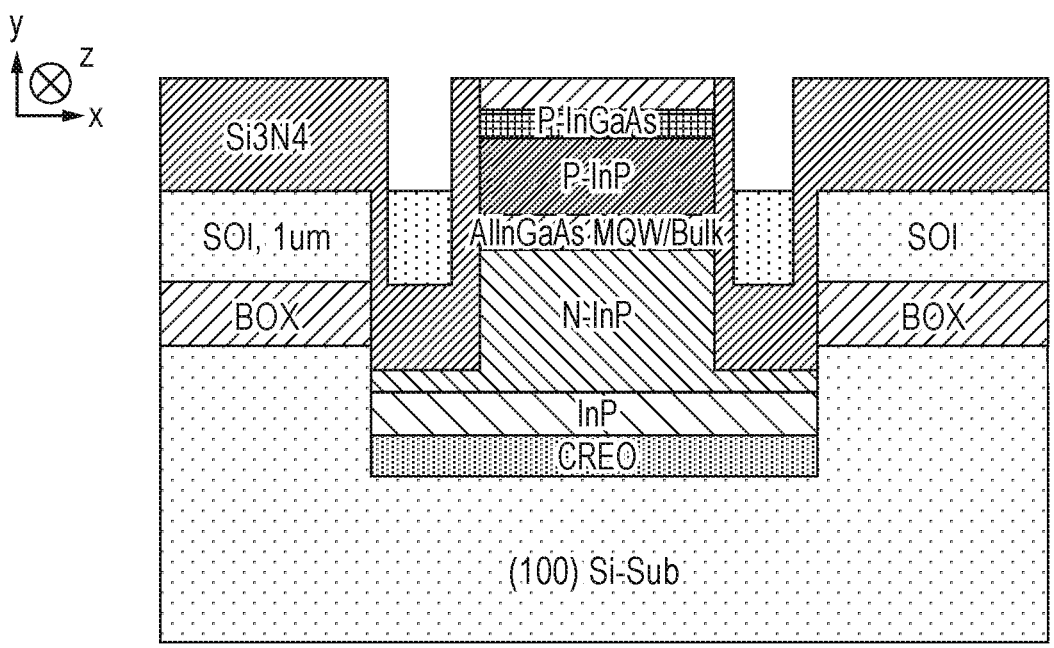
Figure 9M:
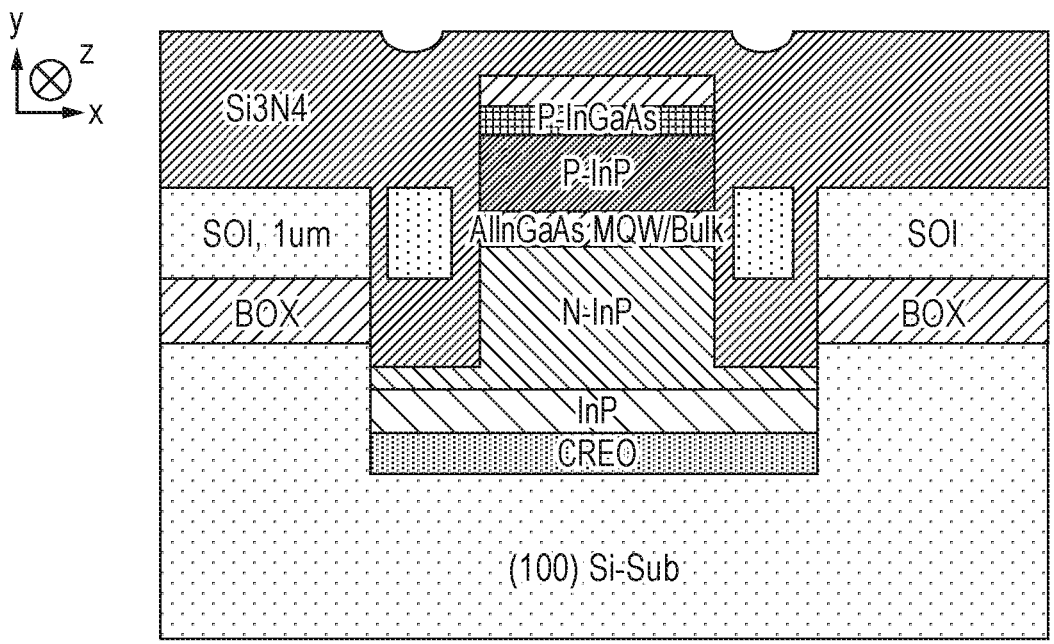

After the step shown in FIG. 9l, further silicon nitride is deposited to fill the space previous occupied by the now etched amorphous silicon. The result of this is shown in FIG. 9m. Due to the nature of this deposition, defect regions result located above each trench. Therefore, as shown in FIG. 9n, the structure undergoes a further chemical-mechanical polishing process so that the defects are removed.

Figure 9N:
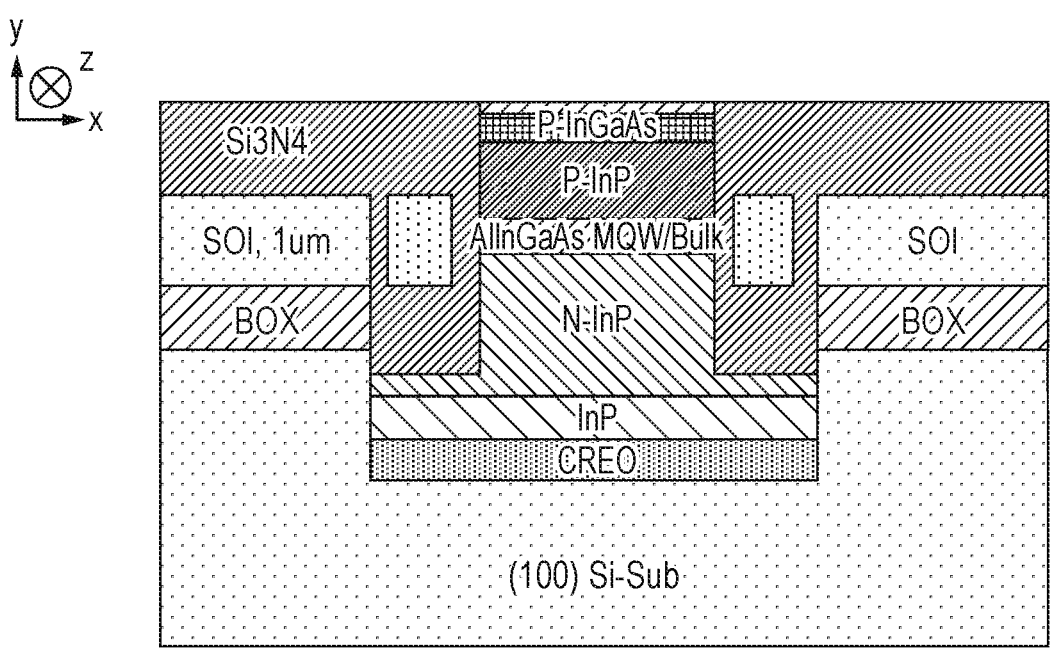
Figure 9O:
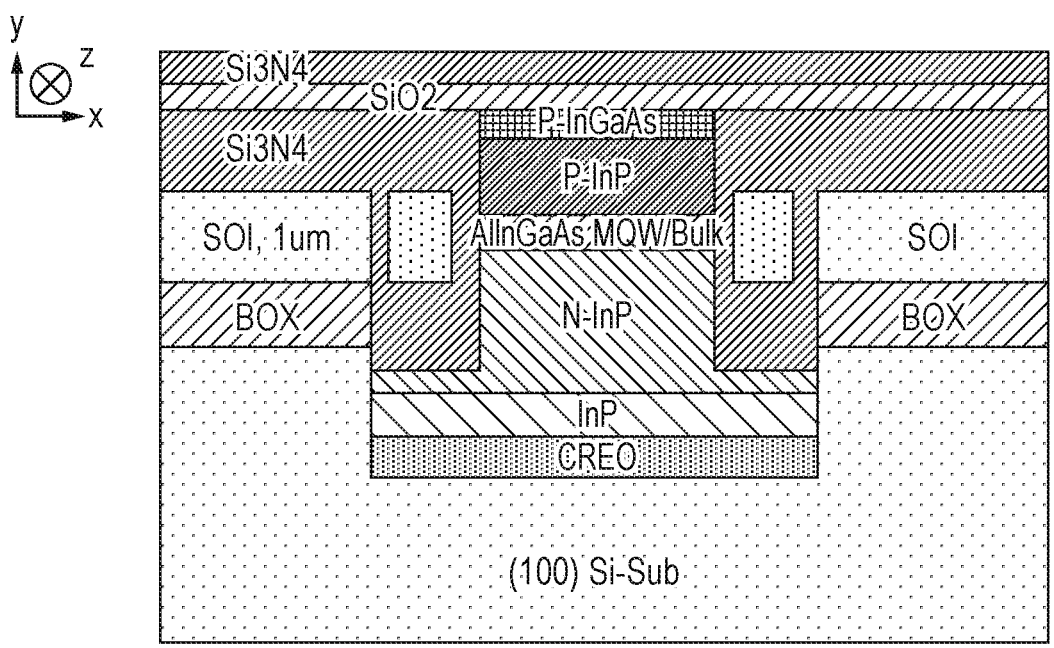

Subsequent to the step shown in FIG. 9n, a silicon dioxide capping layer is deposited over the structure and a silicon nitride hard mask is disposed over this silicon dioxide layer. These are used in subsequent steps to fabricate the waveguide.

FIGS. 9p(i) and 9p(ii) show, respectively, a further manufacturing step along the cross-sections B-B' and C-C' shown in FIG. 7. A photoresist is provided over a portion of the silicon nitride layer located above the optically active stack, and the silicon nitride and silicon dioxide layers are etched so that the uppermost layer of the optically active stack is exposed (in this instance, a P-doped InGaAs layer). Further etching is then performed, as shown in FIGS. 9q(i) and 9q(ii) (also, respectively cross-sections along B-B' and C-C') such that an n-doped layer of the optically active stack is exposed. This etching provides the ridge waveguide which will ultimately be provided within the optically active stack. Of note, is that the silicon nitride layers located above the silicon device layer are not etched.

Next, as shown in FIGS. 9r(i) and 9r(ii) (also cross-sections along B-B' and C-C') a silicon dioxide layer is deposited and a photoresist is provided which covers the waveguide structure within the optically active stack but not the silicon nitride and device layers located adjacent to the optically active stack in a guiding direction. This is most clearly seen by comparing the B-B' and C-C' cross-sections, where the photoresist is not seen in the C-C' cross-section.

Following the deposition of this photoresist, the unmasked portions are then etched, removing the upper silicon dioxide layer above the silicon device layer and exposing the silicon nitride waveguide, resulting in the structure shown in FIG. 9s(ii) (a cross-section along C-C'). Notably, the structure as seen along the cross-section B-B' and as illustrated in FIG. 9s(i) does not change from that shown in FIG. 9r(i) asides from the removal of the photoresist. This etching provides the SOI waveguide, which includes an upper silicon nitride layer and a silicon dioxide capping layer. The light is chiefly confined to the silicon device layer, and the silicon nitride layer on top of this device layer functions as an upper cladding layer.

The photoresist is then removed, and a further silicon dioxide layer is deposited over all upper exposed surfaces of the structure. Next, as shown in FIGS. 9t(i) and 9t(ii) (B-B' and C-C' cross-sections respectively), a further etch is performed to provide a trench and a clear area for a top electrode as well as to remove the silicon nitride layer above uppermost layer of the optically active stack. By performing this etch, the parasitic capacitance within the ultimate device is reduced. A layer of silicon dioxide is provided between the trench and a layer of the optically active stack above the crystalline oxide layer such that the electrode is insulated from this layer of the optically active stack when placed.

Next, as shown in FIG. 9u(i) which is a cross-section along B-B', contact vias are opened for both an n-doped and p-doped region of the optically active stack so that upper surfaces of these regions are exposed. Subsequently, as shown in FIG. 9v(i) which is a cross-section along B-B', a metallization process is performed so as to provide the first and second electrodes. The first electrode contacting the p-doped region and the second electrode contacting the n-doped region. FIG. 9v(ii), the cross-section along C-C' mirrors FIG. 9u(ii) and FIG. 9t(ii) in that this region of the structure is unchanged during these steps of the fabrication process.

Figure 10A:
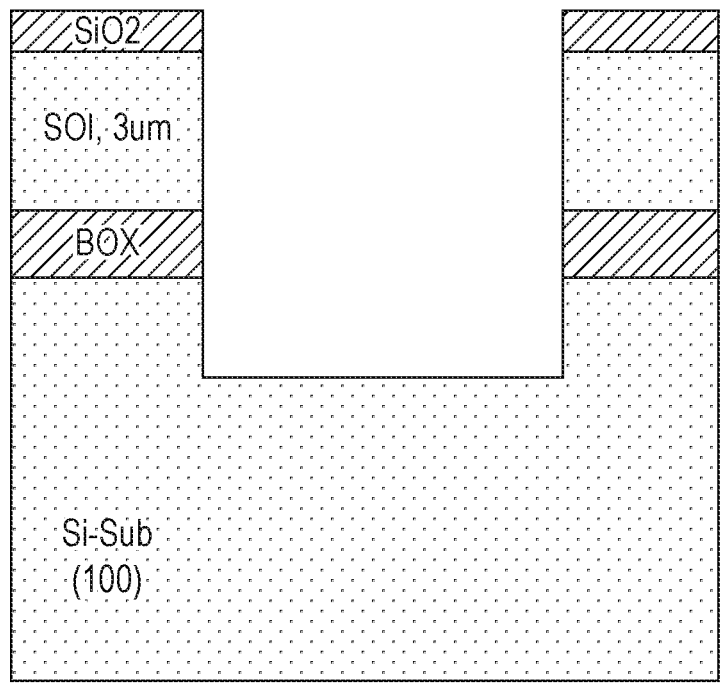
FIGS. 10a-10u show example steps in an embodiment of a method of fabricating a variant EAM on a 3 µm SOI platform according to the embodiments of FIGS. 7-8D.
Figure 10B:
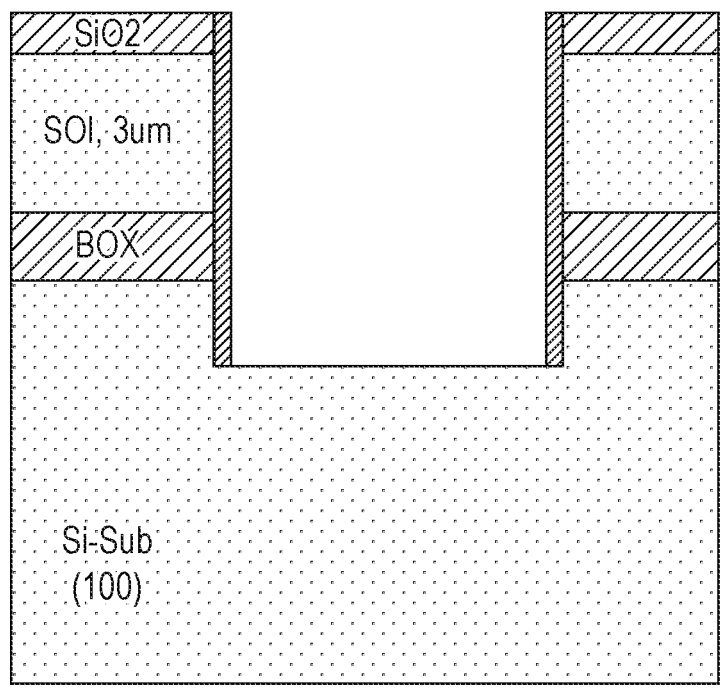
Figure 10C:
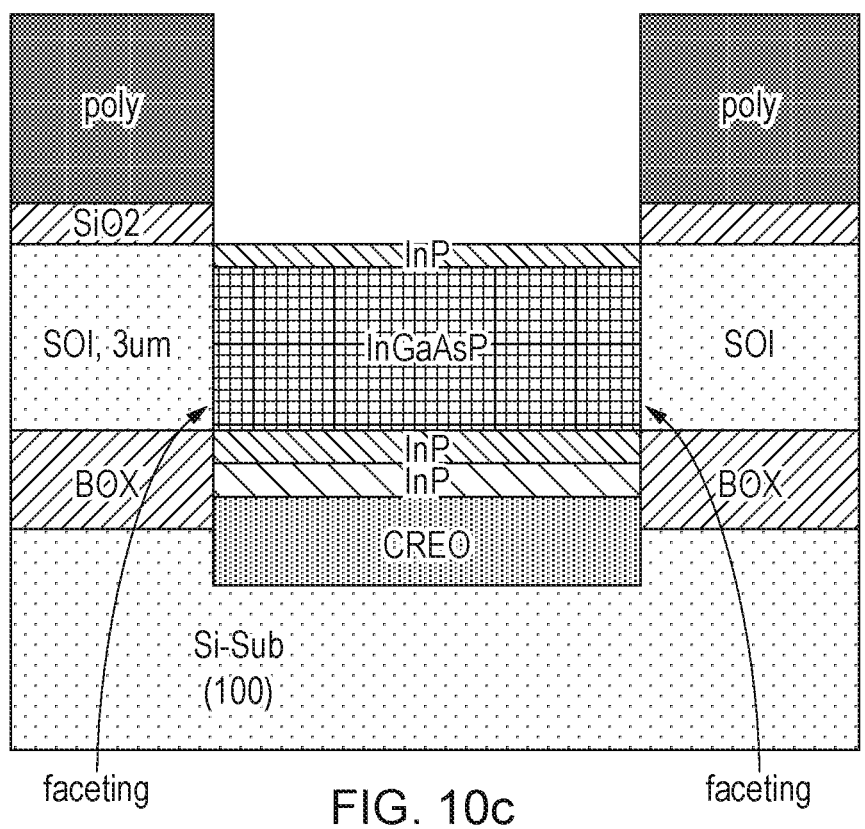
Figure 10D:
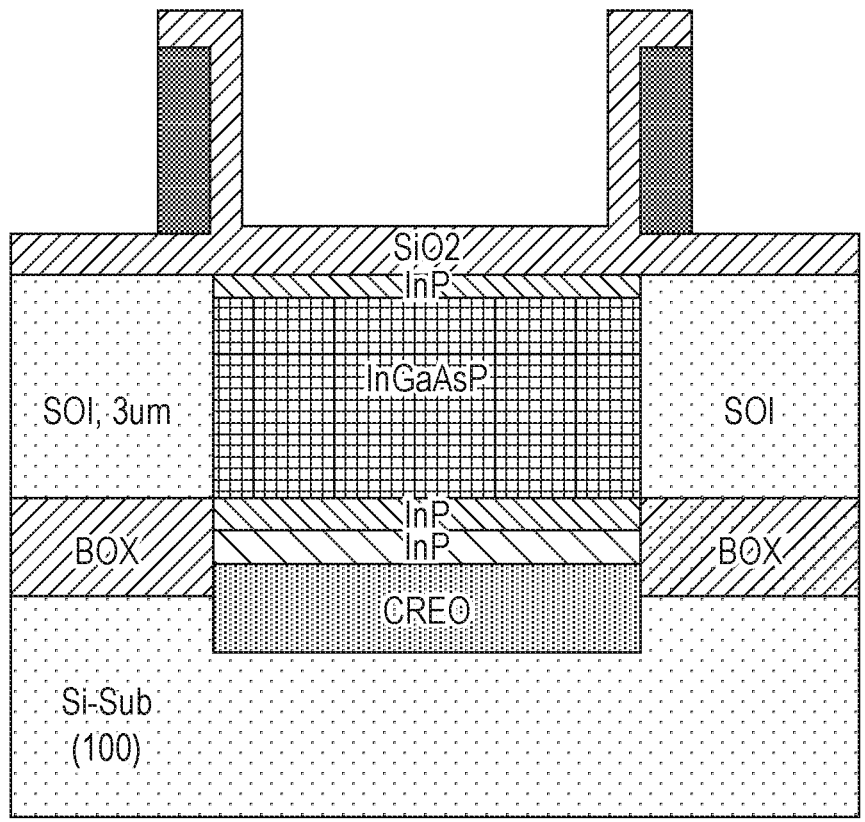
Figure 10E:
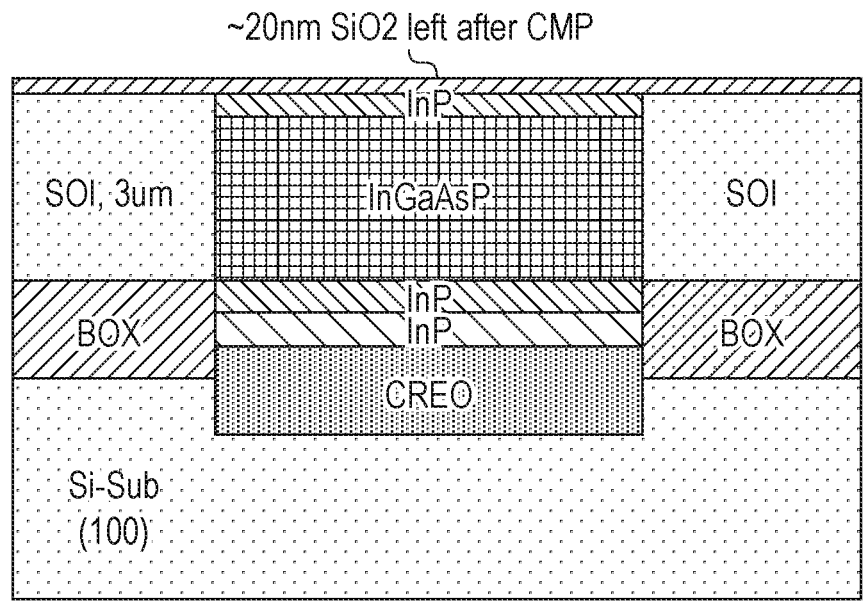
Figure 10F:
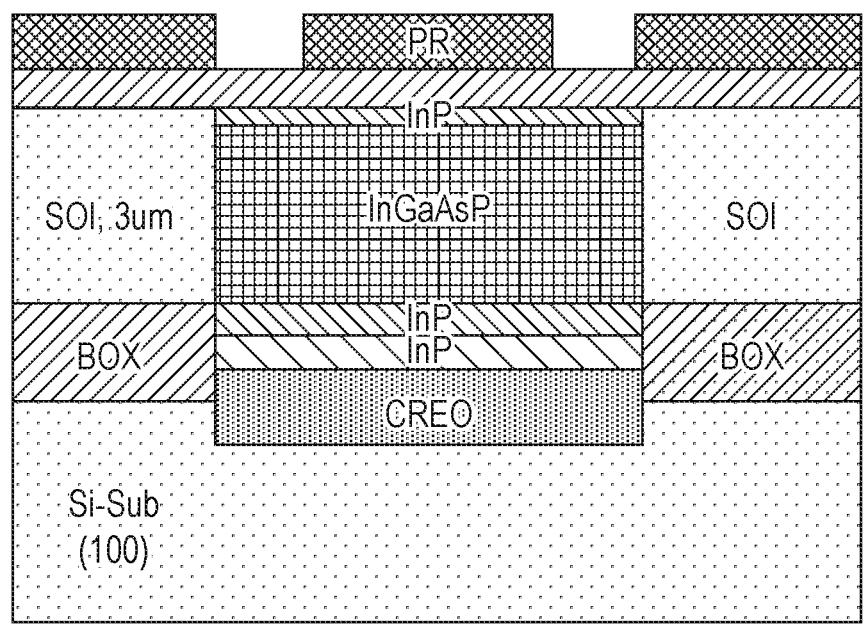
Figure 10G:
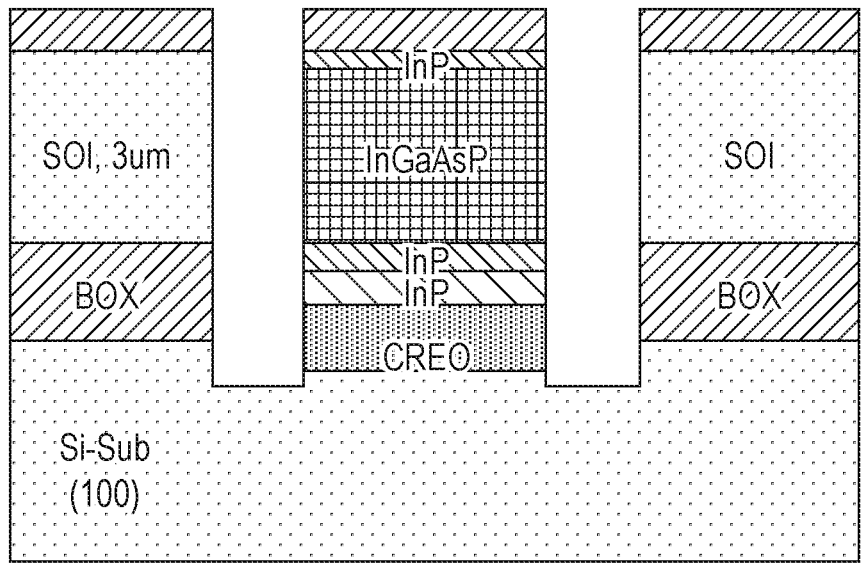
Figure 10H:
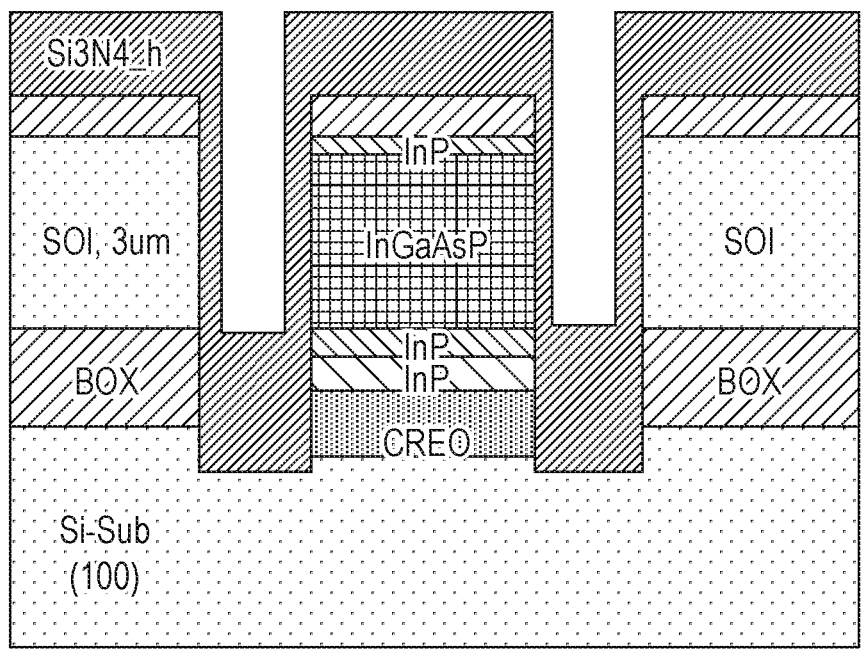
Figure 10I:
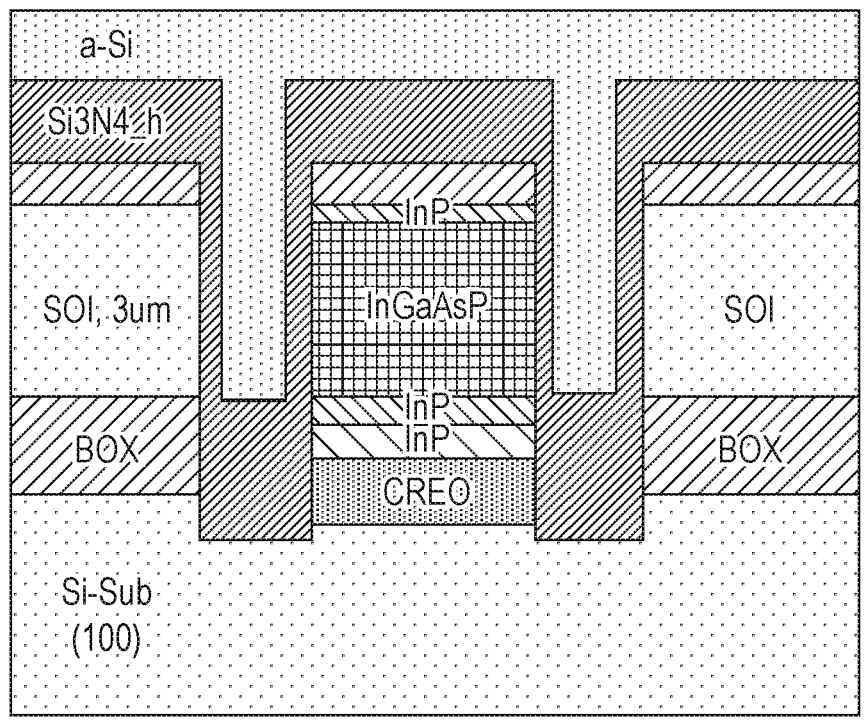
Figure 10J:
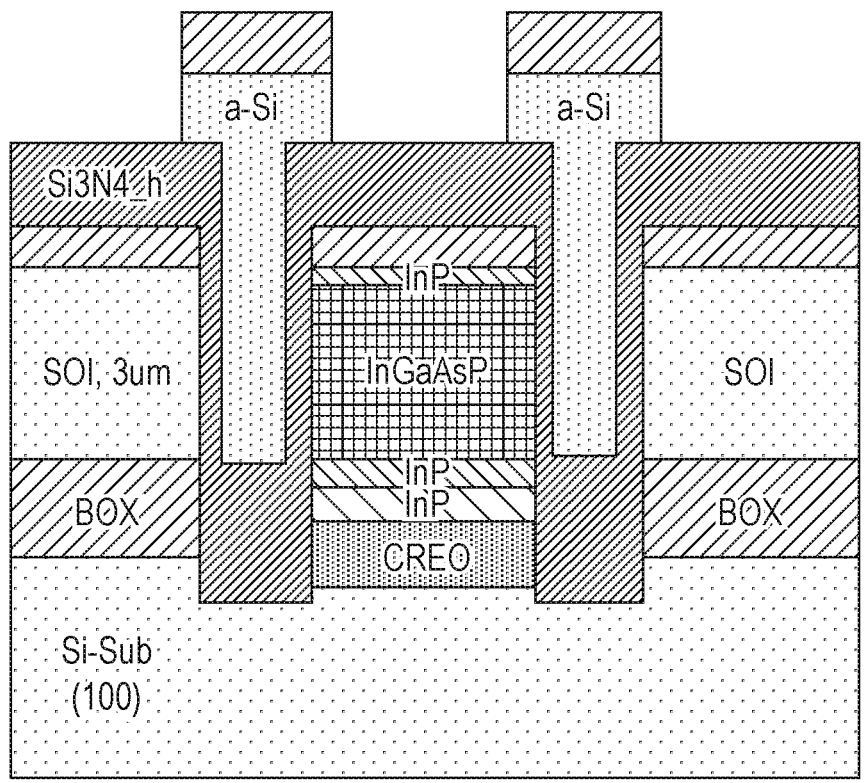
Figure 10K:
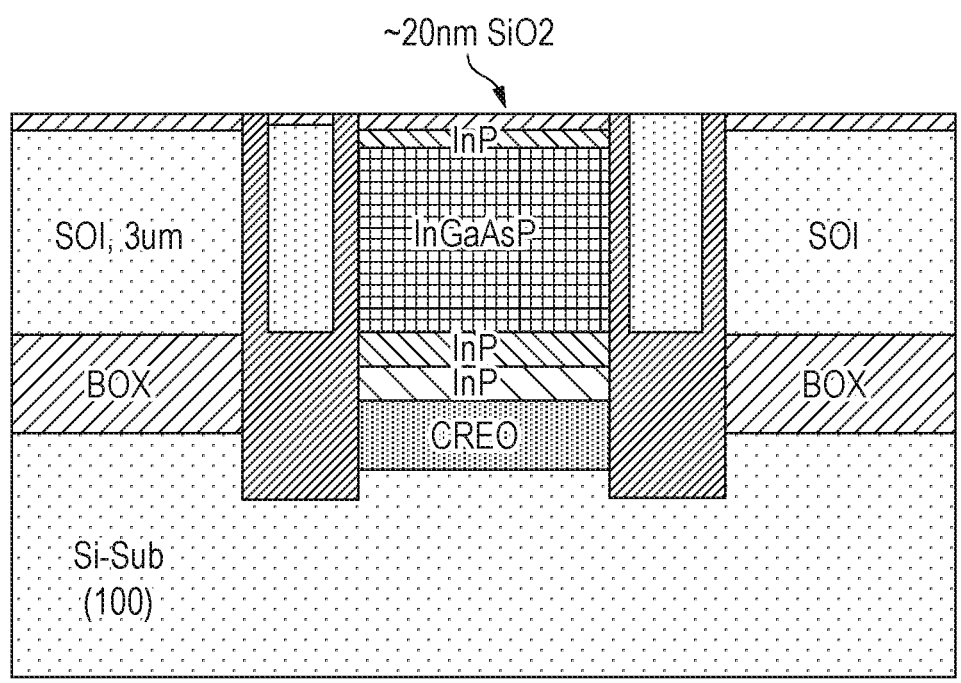
Figure 10N:
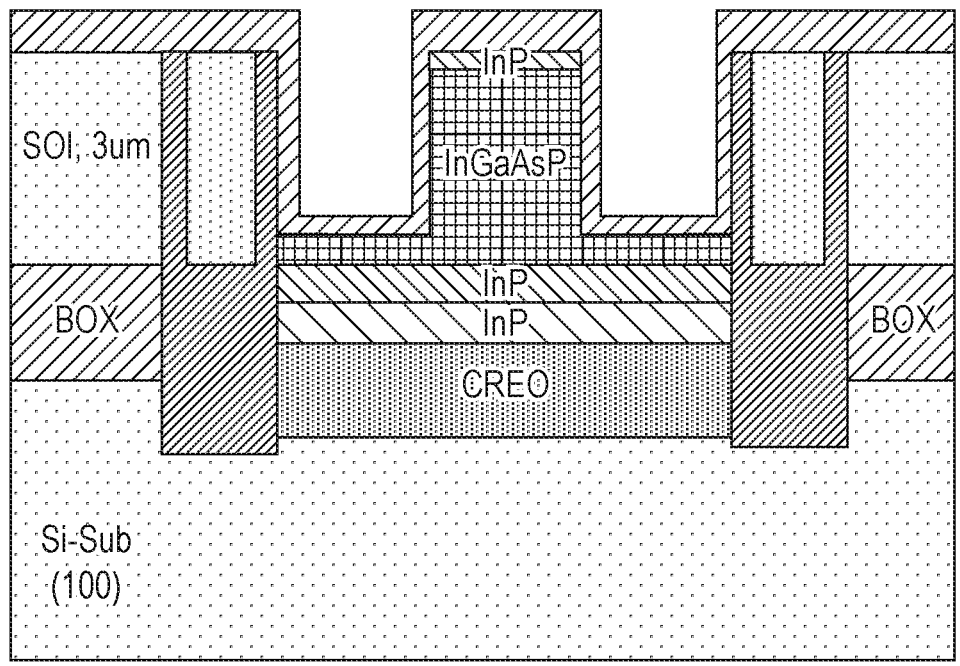
Figure 10O:
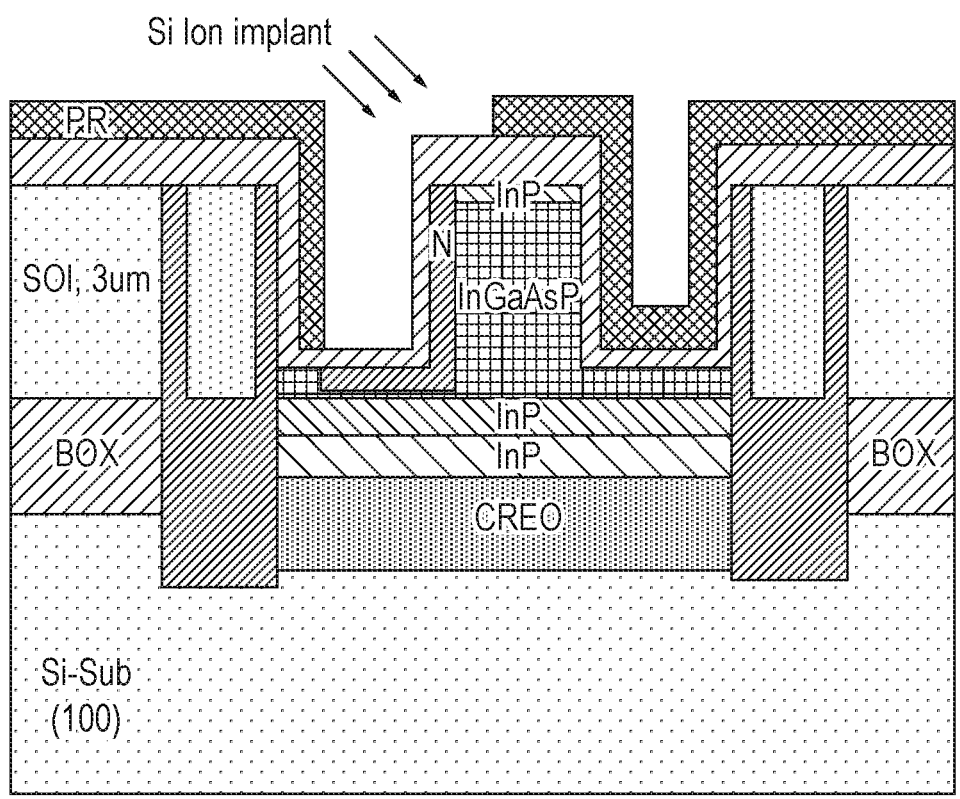
Figure 10P:
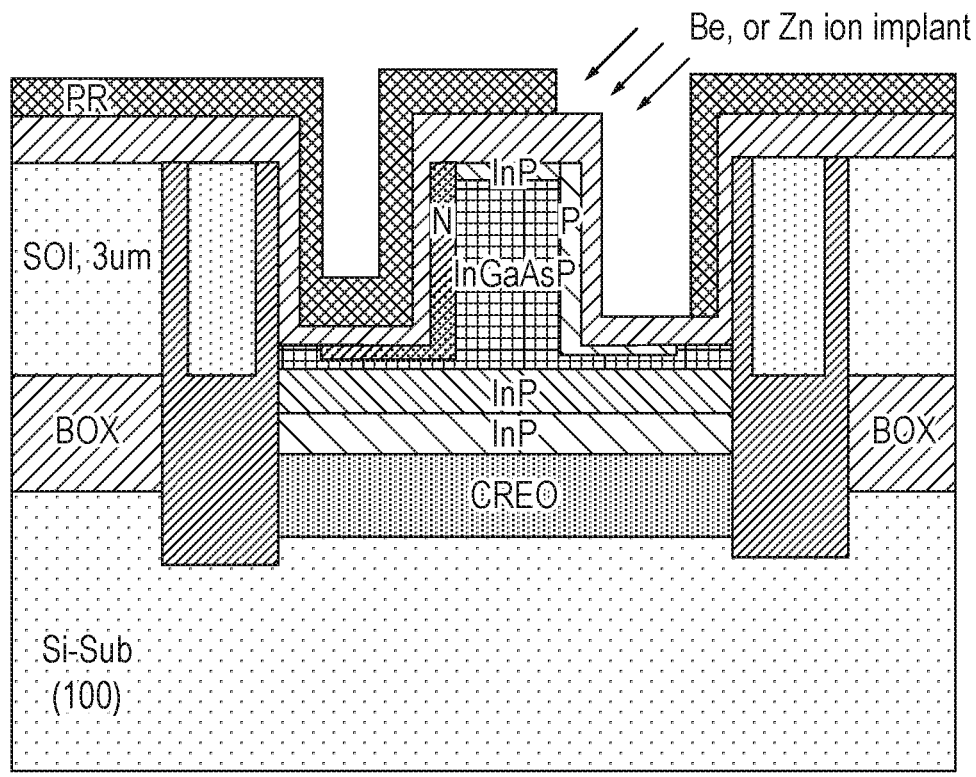
Figure 10Q:
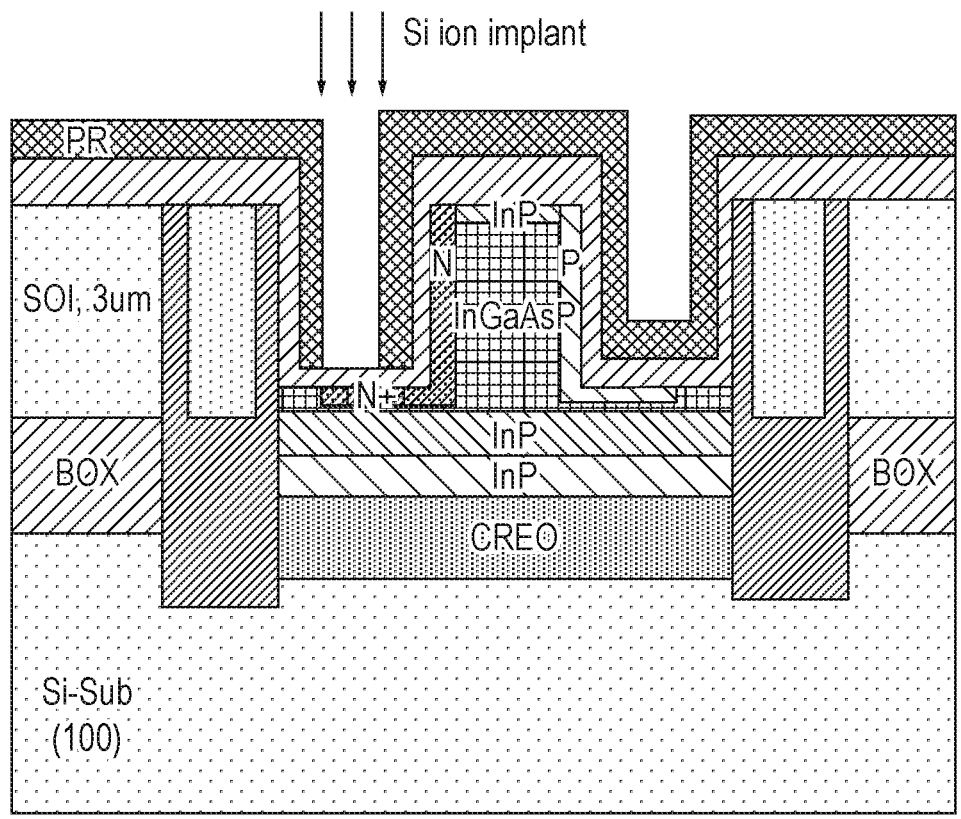
Figure 10R:
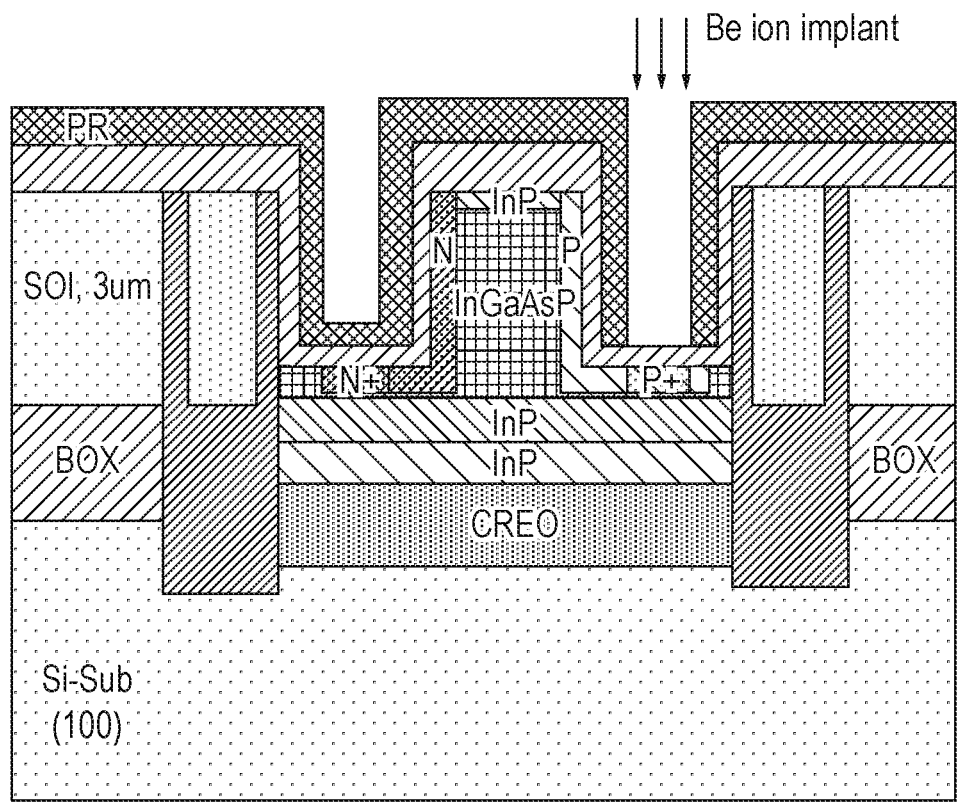
Figure 10S:
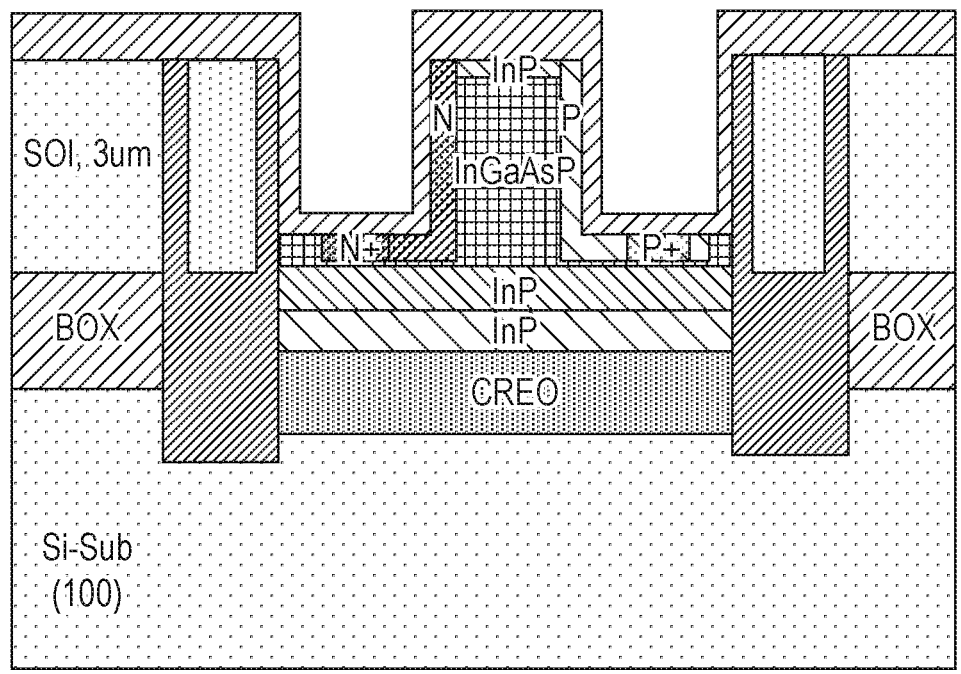
Figure 10T:
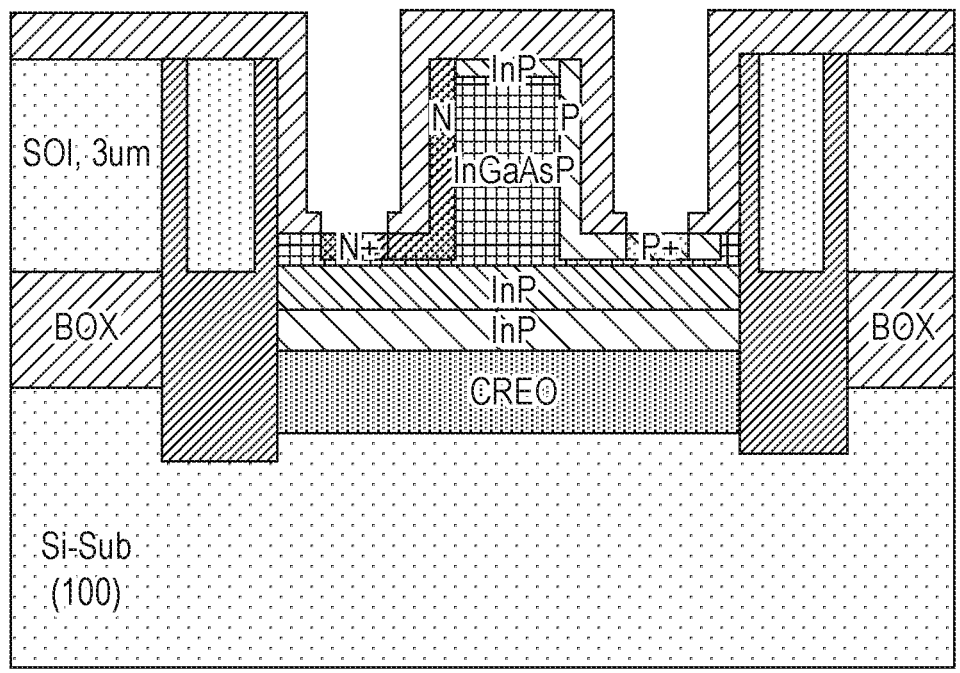
Figure 10U:
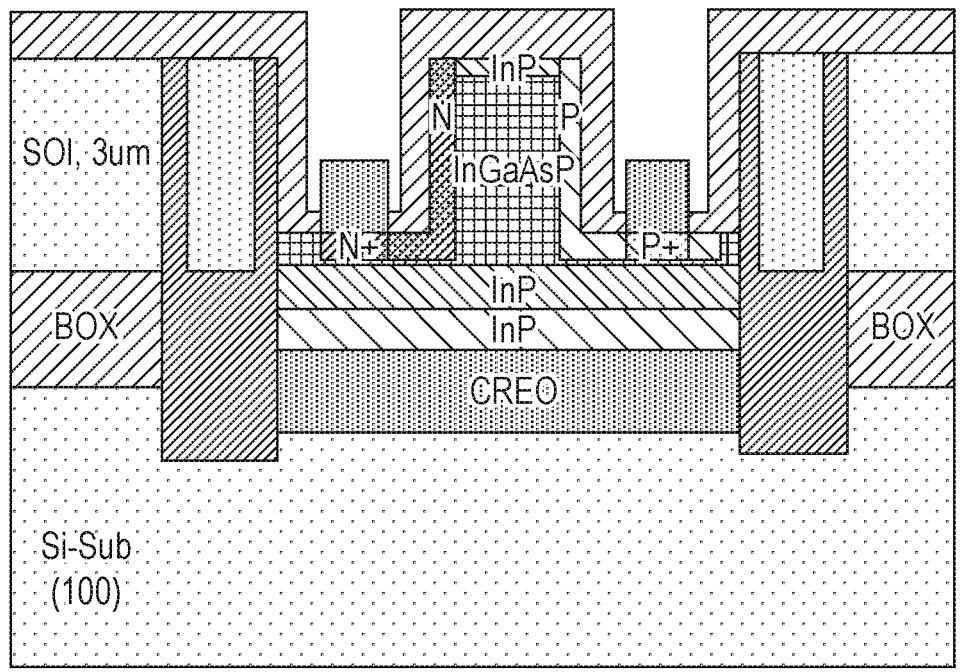

FIGS. 10a-10u demonstrate a variant method of fabrication to produce an electro-absorption modulator (EAM) according to some embodiments of the present invention, on a 3 μm silicon-on-insulator wafer using the Franz-Keldysh effect.

In an initial step, not shown, a silicon-on-insulator wafer is provided with a silicon device layer (also referred to as a silicon-on-insulator or SOI layer) having a height of 3 μm as measured from an uppermost surface of a buried oxide (BOX) layer to an uppermost surface of the device layer. The BOX layer is above a silicon substrate having a (111) crystalline alignment. An optional silicon dioxide layer is disposed over the silicon device layer, such that the silicon device layer is sandwiched between the silicon dioxide layer and the buried oxide layer. The buried oxide layer is, in some examples, formed of silicon dioxide.

Subsequently, in a step shown in FIG. 10a, a portion of the silicon device layer, a portion of the BOX layer below the portion of the silicon device layer, and a portion of the silicon substrate below the portion of the BOX layer are etched away. The result is a cavity as seen in FIG. 10a. The cavity extends from an uppermost surface of the wafer down into a portion of the silicon substrate. The silicon dioxide layer, when present, is also partially etched.

Next, as shown in FIG. 10b, sidewalls of the cavity are lined with a 20 nm lining of silicon nitride via a non-isotropic etch. After this, as shown in FIG. 10c, an optically active stack is epitaxially grown in the cavity. Due to the nature of the epitaxial growth, faceting will be present in the locations indicated at least. The optically active cavity includes, as a layer immediately adjacent to the exposed silicon substrate, a layer of crystalline oxide which is, in some embodiments, crystalline rare earth oxide (CREO). An optically active layer of the optically active stack, in this example an InGaAsP layer, is grown so as to have a bottommost surface which aligns with a bottommost surface of the adjacent silicon on insulator layer/device layer. If the growth of the optically active stack is through blanket growth, a poly layer (e.g. poly-crystalline III-V) is deposited on top of the exposed silicon nitride layer as shown in FIG. 10c; however, if the growth of the optically active stack is through a selective growth process, no poly layer is deposited on top of the exposed silicon nitride layer, and so the step in FIG. 10d is skipped. In the next step, shown in FIG. 10d, a silicon dioxide layer is deposited over an uppermost layer of the optically active stack as a hard mask, and a portion of the poly is etched away near the cavity. This etching releases wafer stress.

The optically active stack may be formed of the following layers, the layer numbering decreasing from an uppermost layer (6) to a lowermost layer (1) of the optically active stack:

TABLE 3

| Layer | R | n/u/p | Material | Thickness (nm) |
|---|---|---|---|---|
| 6 | 1 | uid | InP | 200 |
| 5 | 1 | uid | InGaAsP (or AlInGaAs) | 2800 |
| 4 | 1 | uid | InP | 150 |
| 3 | 1 | uid | InP | 200 |
| 2 | 1 | uid | CREO | 400-4000 or 20-400 |
| 1 | | | Substrate; (111) Si | |

Returning to the method, as shown in FIG. 10e, after the etching has been performed to partially remove the poly, the structure undergoes a chemical-mechanical polish to remove the remaining poly and to leave an approximately 20 nm silicon dioxide layer on the uppermost surface of the structure. Subsequently, as shown in FIG. 10f, a silicon dioxide layer is provided as well as a photoresist which is then patterned. As with FIG. 9f, the photoresist at least partially covers the optically active stack and entirely covers the device silicon layer located either side of the optically active stack.

Following the deposition of this photoresist, an etch is performed to provide trenches which extend down to the silicon substrate. The result of this etch is shown in FIG. 10g. The etching removes the facet defects discussed previously. In contrast to the corresponding etching performed in relation to FIG. 9g, the etching in FIG. 10g passes through all layers of the optically active stack and partially into the silicon substrate below.

After the etching step, in a step shown in FIG. 10h, silicon rich silicon nitride (e.g. $Si_3N_4$) is deposited on the exposed surfaces of the structure. The silicon rich silicon nitride may have a refractive index of around 2.7. The sidewalls of the trenches are coated with silicon nitride to a thickness of between 230 nm and 260 nm. The bed of the trenches are coated with silicon nitride so that an uppermost portion of each silicon nitride bed is aligned with a top surface of the adjacent BOX layer.

In a next step, shown in FIG. 10i, amorphous silicon is bulk deposited over the structure thereby filling the cavity and providing a layer on top of the silicon nitride layer located above the device layer. The amorphous silicon layer is then etched, as shown in FIG. 10j, to leave two discrete regions of amorphous silicon above and within each of the now filled trenches, which releases the wafer stress caused by the amorphous silicon layer.

Next, as shown in FIG. 10k, the structure undergoes a chemical-mechanical polishing process to leave an approximately 20 nm tall silicon dioxide layer on top of the uppermost layer of the optically active stack. This etch also removes the remaining silicon nitride layer above the device layer.

FIGS. 10*l*(i) and 10*l*(ii) show a subsequent fabrication step as viewed along the B-B' and C-C' cross-sections of FIG. 7 respectively. As can be seen, a further silicon dioxide layer is deposited across the exposed upper surface of the structure, and then a photoresist is provided and patterned. The photoresist is provided over a portion of the optically active stack, and over a portion of the silicon device layer adjacent, in a guiding direction, to the optically active stack.

Thus when etched, as shown in FIGS. 10*m*(i) and 10*m*(ii) (respectively cross-sections through B-B' and C-C'), a waveguide structure is provided in the optically active stack as well as in the silicon device layer adjacent to the optically active stack. After this etching, a further silicon dioxide layer is provided with a thickness of between 20 nm and 50 nm, as shown in FIG. 10*c*.

Next, as shown in FIG. 10*0*, a photoresist is provided over a portion of the structure, leaving a gap which exposes a first sidewall of the waveguide in the optically active stack as well as a first lateral region of the optically active stack adjacent to the sidewall. These exposed regions are then doped with an n-type dopant (e.g. silicon or silicon ions), providing an n-doped region which extends from down the first sidewall of the optically active stack and across the first lateral region adjacent thereto. The photoresist is then removed.

A further photoresist is then applied, as shown in FIG. 10*p*, leaving a second sidewall optically active stack and a second lateral region adjacent thereto exposed. These exposed regions of the optically active stack are then doped with a p-type dopant (e.g. Be or Zn), thereby providing a p-doped region which extends down the first sidewall of the optically active stack and across the second lateral region adjacent thereto. This photoresist is then removed.

Another photoresist is then applied, leaving a portion of the first lateral region exposed, as shown in FIG. 10*q*. This exposed region is then doped with further n-type dopants (e.g. silicon or silicon ions) to provide a heavily n doped (n+) region within the first lateral region. That photoresist is then removed. A further photoresist is then applied, leaving a portion of the second lateral region (in some embodiments, equivalent in size to the first) exposed as shown in FIG. 10*r*. This exposed region is then doped with further p-type dopants (e.g. Be) so as to provide a heavily p doped (p+) region within the second lateral region. This photoresist is then removed. The resulting structure is a waveguide in which two opposing side walls are doped with dopants of an opposite polarity, and lateral regions adjacent to each of these side walls which are doped to a higher concentration than the adjacent side wall.

Next, as shown in FIG. 10*s*, a further silicon dioxide layer is provided over the entire device, having, in some embodiments, a thickness of around 500 nm. The structure then undergoes a rapid thermal process annealing at between 700° C. and 850° C.

After the annealing step, contact vias are opened to each of the heavily doped regions through the silicon dioxide layer. This is shown in FIG. 10*t*. Thus, subsequently, a metallization process may be used to provide electrical contacts for each of the heavily doped regions as shown in FIG. 10*u*.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

CLAUSES PERTAINING TO EMBODIMENTS OF THE INVENTION

1. An electro-absorption modulator (EAM), the EAM comprising:
    a silicon-on-insulator (SOI) substrate, the substrate comprising: a silicon support layer; a buried oxide (BOX) layer on top of the silicon support layer; and a silicon device layer on top of the BOX layer;
    a waveguide region, where a portion of the silicon device layer and a portion of the BOX layer underneath the portion of the device layer have been removed, the portion of the BOX layer having been replaced with a layer of silicon and a layer of crystalline oxide on top of the silicon; and
    a waveguide structure located directly on top of the crystalline oxide layer, the waveguide structure including a P doped region, and an N doped region with an intrinsic region in-between, creating a PIN junction across which a bias can be applied to create a modulation region.

2. The EAM of clause 1, wherein the waveguide structure is made of one or more of the following materials:
    SiGeSn, SiGe, InGaAs, AlInGaAs and InGaAsP.

3. The EAM of clause 1 or clause 2, wherein the crystalline oxide layer has a thickness of 20 nm-400 nm.

4. The EAM of any one of clauses 1 to 3, wherein the silicon support layer is Si(111), and the replacement silicon layer is Si(111).

5. The EAM of any one of the preceding clauses, wherein the waveguide structure is a rib waveguide which comprises:
    a waveguide ridge on a slab, with a first slab portion on a first side of the ridge, and a second slab portion on a second side of the ridge; and
    wherein the waveguide ridge, first slab portion and second slab portion are all formed of the same material as one another.

6. The EAM of clause 5, wherein the P doped region is located at the first slab and the N doped region is located at the second slab.

7. The EAM of clause 6, wherein the P doped region extends into a first sidewall of the ridge and/or wherein the N doped region extends into a second sidewall of the ridge.

8. The EAM of clause 6 or clause 7, further comprising a first metal contact at the first slab, in electrical connection with the P doped region and a second metal contact at the second slab portion, in electrical connection with the N doped region.

9. The EAM of any one of the preceding clauses, wherein the SOI substrate is a 3 μm SOI platform.

10. The EAM of clause 1, wherein the waveguide structure is made of one or more of the following materials:
    SiGe multiple quantum well (SiGe MQW), AlInGaAs MQW, InGaAsP MQW and InGaNAs MQW.

11. The EAM of clause 10, wherein the SOI substrate is a 1 μm SOI platform.

12. A method of fabricating an electro-absorption modulator (EAM), the method comprising:
    providing a silicon-on-insulator substrate, the substrate comprising: a silicon support layer; a buried oxide (BOX) layer on top of the silicon support layer; and a silicon device layer on top of the BOX layer;

etching through a portion of the silicon device layer and the BOX layer to create a cavity in the substrate which exposes a portion of the silicon support layer;

epitaxially growing a replacement layer of silicon on top of the exposed portion of the silicon support layer;

epitaxially growing a layer of crystalline oxide on top of the replacement layer of silicon, the replacement layer of silicon and the crystalline oxide layer replacing the portion of the BOX layer that had been etched away;

epitaxially growing a layer of a first material on top of the crystalline oxide layer; and fabricating a waveguide structure within the layer of the first material, the waveguide structure including a P doped region, and an N doped region with an intrinsic region in-between, creating a PIN junction across which a bias can be applied to function as a modulation region.

13. The method of clause 12, wherein the first material is one or more of the following materials:
SiGeSn, SiGe, InGaAs, AlInGaAs, InGaAsP, SiGe multiple quantum well (SiGe MQW), AlInGaAs MQW InGaAsP MQW and InGaNAs MQW.

14. The method of clause 12 or clause 13, wherein the step of fabricating the waveguide structure comprises:
etching the first material layer to form a rib waveguide of the first material, the rib waveguide including a ridge on a slab, the slab comprising a first slab portion on a first side of the ridge, and a second slab portion on a second side of the ridge.

15. The method of clause 14, wherein the P doped region is located at the first slab portion and the N doped region is located at the second slab portion.

16. The method of clause 15, wherein the P doped region extends into a first sidewall of the ridge and/or wherein the N doped region extends into a second sidewall of the ridge.

17. The method of any one of clauses 12 to 16, wherein the silicon support layer is Si(111); and replacement silicon is Si(111).

18. An optoelectronic device, the optoelectronic device comprising:
a silicon-on-insulator (SOI) substrate, the substrate comprising: a silicon support layer; a buried oxide (BOX) layer on top of the silicon support layer; and a silicon device layer on top of the BOX layer;
a waveguide region, where a portion of the silicon device layer and a portion of the BOX layer underneath the portion of the device layer have been removed, the portion of the BOX layer having been replaced with a layer of silicon and a layer of crystalline oxide on top of the silicon; and
a waveguide structure located directly on top of the crystalline oxide layer, the waveguide structure including a P doped region, and an N doped region with an intrinsic region in-between, creating a PIN junction across which a bias can be applied to create a modulation region.

19. The optoelectronic device of clause 18, wherein the optoelectronic device is an EAM or a laser, or a photodetector 20. The optoelectronic device of clause 18 or clause 19, wherein the waveguide device is an AlInGaAs MQW waveguide structure 21. The optoelectronic device of clause 18, wherein the waveguide device is an InGaNAs MQW waveguide structure 22. A method of fabricating an optoelectronic device, the method comprising:
providing a silicon-on-insulator substrate, the substrate comprising: a silicon support layer; a buried oxide (BOX) layer on top of the silicon support layer; and a silicon device layer on top of the BOX layer;
etching through a portion of the silicon device layer and the BOX layer to create a cavity in the substrate which exposes a portion of the silicon support layer;
epitaxially growing a replacement layer of silicon on top of the exposed portion of the silicon support layer;
epitaxially growing a layer of crystalline oxide on top of the replacement layer of silicon, the replacement layer of silicon and the crystalline oxide layer replacing the portion of the BOX layer that had been etched away;
epitaxially growing a layer of a first material on top of the crystalline oxide layer; and
fabricating a waveguide structure within the layer of the first material, the waveguide structure including a P doped region, and an N doped region with an intrinsic region in-between, creating a PIN junction across which a bias can be applied to function as a modulation region.

23. An electro-absorption modulator, EAM, the EAM comprising:
a silicon-on-insulator, SOI, substrate comprising:
a silicon support layer;
a buried oxide, BOX, layer on top of the silicon support layer; and
a silicon device layer on top of the BOX layer;
a waveguide region, where a portion of the silicon device layer, a portion of the BOX layer underneath the portion of the device layer, and a portion of the silicon support layer underneath the portion of the BOX layer have been removed, at least a part of the portion of the silicon support layer having been replaced with a layer of crystalline oxide on top of the remaining silicon support layer; and
a waveguide structure located directly on top of the crystalline oxide layer, the waveguide structure including a P doped region, and an N doped region with an intrinsic region in-between, creating a PIN junction across which a bias can be applied to create a modulation region.

24. The electro-absorption modulator of clause 23, wherein the portion of the silicon support layer and at least a part of the portion of the BOX layer has been replaced with a layer of crystalline oxide.

25. The electro-absorption modulator of either clause 23 or clause 24, wherein a passive waveguide, provided in the silicon device layer and adjacent to the waveguide region, is coupled to the waveguide region by a bridge-waveguide.

26. The electro-absorption modulator of clause 25, wherein the bridge-waveguide comprises a lined channel filled with a filling material with a refractive index similar to that of a material forming a sidewall adjacent to the bridge-waveguide.

27. The electro-absorption modulator of clause 26, wherein the liner is formed of silicon nitride.

28. The electro-absorption modulator of either clause 26 or clause 27, wherein a lowermost surface of the sidewalls of the channel and a top surface of a portion of the liner located in the base of the channel are aligned with a top surface of the buried oxide layer.

29. The electro-absorption modulator of any of clauses 26 to 28, wherein the liner has a thickness of at least 200 nm and no more than 280 nm.

30. The electro-absorption modulator of any of clauses 26 to 29, wherein the filling material is amorphous silicon.

31. The electro-absorption modulator of any of clauses 23 to 30, wherein the waveguide structure is formed of plural layers, at least one being formed from indium phosphide.

32. A method of fabricating an electro-absorption modulator, EAM, the method comprising:
   providing a silicon-on-insulator substrate, the substrate comprising: a silicon support layer; a buried oxide, BOX, layer on top of the silicon support layer, and a silicon device layer on top of the BOX layer;
   etching through a portion of the silicon device layer, the BOX layer, and the silicon support layer, to create a cavity in the substrate which exposes a portion of the silicon support layer;
   epitaxially growing a layer of crystalline oxide, on top of the exposed portion of the silicon support layer, the crystalline oxide layer replacing a part of the portion of the silicon support layer which had been etched away;
   epitaxially growing a layer of a first material on top of the crystalline oxide layer; and
   fabricating a waveguide structure within the layer of the first material, the waveguide structure including a P doped region, and an N doped region with an intrinsic region in-between, creating a PIN junction across which a bias can be applied to function as a modulation region.

33. The method of clause 32, wherein the step of fabricating the waveguide structure includes the sub-steps of:
   etching one or more channels adjacent to the first material, thereby removing any edge defects thereof;
   lining the one or more channels with a liner to provide a lined channel; and
   filling the lined channel with a filling material which has a refractive index which is similar to that of a material forming a sidewall so that the filling material forms a bridge-waveguide in the channel between a passive waveguide in the silicon device layer and the waveguide structure.

34. The method of clause 33, wherein the liner is formed of silicon nitride.

35. The method of either clause 33 or clause 34, wherein the liner has a thickness of at least 200 nm and no more than 280 nm.

36. The method of any of clauses 33 to 35, wherein the filling material that the lined channel is filled with comprises amorphous silicon.

The invention claimed is:

1. An electro-absorption modulator (EAM), the EAM comprising:
   a silicon-on-insulator (SOI) substrate, the substrate comprising: a silicon support layer; a buried oxide (BOX) layer on top of the silicon support layer; and a silicon device layer on top of the BOX layer;
   a waveguide region, where a portion of the silicon device layer and a portion of the BOX layer underneath the portion of the silicon device layer have been removed, the portion of the BOX layer having been replaced with a replacement silicon layer and a crystalline oxide layer on top of the replacement silicon layer; and
   a waveguide structure located directly on top of the crystalline oxide layer, the waveguide structure including a P doped region, and an N doped region with an intrinsic region in-between, creating a PIN junction across which a bias can be applied to create a modulation region.

2. The EAM of claim 1, wherein the waveguide structure is made of one or more of the following materials:
   SiGeSn, SiGe, InGaAs, AlInGaAs and InGaAsP.

3. The EAM of claim 1, wherein the crystalline oxide layer has a thickness of 20 nm-400 nm.

4. The EAM of claim 1, wherein the silicon support layer is Si(111), and the replacement silicon layer is Si(111).

5. The EAM of claim 1, wherein the waveguide structure is a rib waveguide which comprises:
   a waveguide ridge on a slab, with a first slab portion on a first side of the waveguide ridge, and a second slab portion on a second side of the waveguide ridge; and
   wherein the waveguide ridge, first slab portion and second slab portion are all formed of the same material as one another.

6. The EAM of claim 5, wherein the P doped region is located at the first slab portion and the N doped region is located at the second slab portion.

7. The EAM of claim 6, wherein the P doped region extends into a first sidewall of the waveguide ridge and/or wherein the N doped region extends into a second sidewall of the waveguide ridge.

8. The EAM of claim 6, further comprising a first metal contact at the first slab portion, in electrical connection with the P doped region and a second metal contact at the second slab portion, in electrical connection with the N doped region.

9. The EAM of claim 1, wherein the SOI substrate is a 3 μm SOI platform.

10. The EAM of claim 1, wherein the waveguide structure is made of one or more of the following materials:
    SiGe multiple quantum well (SiGe MQW), AlInGaAs MQW, InGaAsP MQW and InGaNAs MQW.

11. The EAM of claim 10, wherein the SOI substrate is a 1 μm SOI platform.

12. A method of fabricating an electro-absorption modulator (EAM), the method comprising:
    providing a silicon-on-insulator substrate, the substrate comprising: a silicon support layer; a buried oxide (BOX) layer on top of the silicon support layer; and a silicon device layer on top of the BOX layer;
    etching through a portion of the silicon device layer and the BOX layer to create a cavity in the substrate which exposes a portion of the silicon support layer;
    epitaxially growing a replacement layer of silicon on top of the exposed portion of the silicon support layer;
    epitaxially growing a crystalline oxide layer on top of the replacement layer of silicon, the replacement layer of silicon and the crystalline oxide layer replacing the portion of the BOX layer that had been etched away;
    epitaxially growing a layer of a first material on top of the crystalline oxide layer; and
    fabricating a waveguide structure within the layer of the first material, the waveguide structure including a P doped region, and an N doped region with an intrinsic region in-between, creating a PIN junction across which a bias can be applied to function as a modulation region.

13. The method of claim 12, wherein the first material is one or more of the following materials:
    SiGeSn, SiGe, InGaAs, AlInGaAs, InGaAsP, SiGe multiple quantum well (SiGe MQW), AlInGaAs MQW InGaAsP MQW and InGaNAs MQW.

14. The method of claim 12, wherein the step of fabricating the waveguide structure comprises:
    etching the layer of the first material to form a rib waveguide of the first material, the rib waveguide including a ridge on a slab, the slab comprising a first slab portion on a first side of the ridge, and a second slab portion on a second side of the ridge.

15. The method of claim 14, wherein the P doped region is located at the first slab portion and the N doped region is located at the second slab portion.

16. The method of claim 15, wherein the P doped region extends into a first sidewall of the ridge and/or wherein the N doped region extends into a second sidewall of the ridge.

17. The method of claim 12, wherein the silicon support layer is Si(111); and the replacement layer of silicon is Si(111).

* * * * *